(12) United States Patent
Hayashi et al.

(10) Patent No.: US 11,745,355 B2
(45) Date of Patent: Sep. 5, 2023

(54) CONTROL DEVICE, CONTROL METHOD, AND NON-TRANSITORY COMPUTER-READABLE STORAGE MEDIUM

(71) Applicant: OMRON Corporation, Kyoto (JP)

(72) Inventors: Kennosuke Hayashi, Tokyo (JP); Yoshihisa Ijiri, Tokyo (JP)

(73) Assignee: OMRON Corporation, Kyoto (JP)

( * ) Notice: Subject to any disclaimer, the term of this patent is extended or adjusted under 35 U.S.C. 154(b) by 301 days.

(21) Appl. No.: 17/270,442

(22) PCT Filed: Oct. 17, 2019

(86) PCT No.: PCT/JP2019/040794
§ 371 (c)(1),
(2) Date: Feb. 23, 2021

(87) PCT Pub. No.: WO2020/110495
PCT Pub. Date: Jun. 4, 2020

(65) Prior Publication Data
US 2021/0252714 A1 Aug. 19, 2021

(30) Foreign Application Priority Data
Nov. 30, 2018 (JP) .................. 2018-225815

(51) Int. Cl.
*B25J 9/16* (2006.01)
*B25J 13/00* (2006.01)

(52) U.S. Cl.
CPC ............ *B25J 9/1697* (2013.01); *B25J 9/163* (2013.01); *B25J 9/1664* (2013.01)

(58) Field of Classification Search
CPC ........ B25J 9/1697; B25J 9/163; B25J 9/1664; B25J 9/10; B25J 13/00; B25J 13/08;
(Continued)

(56) References Cited

U.S. PATENT DOCUMENTS

| | | | | |
|---|---|---|---|---|
| 4,575,304 A | * | 3/1986 | Nakagawa | ............ G06T 1/0014 |
| | | | | 414/730 |
| 8,095,237 B2 | * | 1/2012 | Habibi | .................. B25J 9/1692 |
| | | | | 318/568.13 |

(Continued)

FOREIGN PATENT DOCUMENTS

| | | |
|---|---|---|
| EP | 2546712 | 1/2013 |
| JP | H10111701 | 4/1998 |

(Continued)

OTHER PUBLICATIONS

"Search Report of Europe Counterpart Application", dated Jul. 13, 2022, p. 1-p. 9.

(Continued)

*Primary Examiner* — Jaime Figueroa
(74) *Attorney, Agent, or Firm* — JCIPRNET

(57) ABSTRACT

A control device sets a relative relation amount between a plurality of target objects that are to be final objectives, repeatedly acquires observation data from a sensor and calculates the relative relation amount between the plurality of target objects existing in the environment from the acquired observation data. Further, the control device determines a series of the relative relation amounts in a state that is to be an objective from the relative relation amount at a time point at which control of the behavior starts until the relative relation amount as the final objectives is realized, and repeatedly determines control instructions so as to change the relative relation amount in a present state calculated from the latest observation data into the relative relation amount in a state of an objective to be transitioned to next. Then, the control device outputs the determined control instruction to a robot device.

13 Claims, 26 Drawing Sheets

(58) Field of Classification Search
CPC ........... G05B 2219/36404; G05B 2219/39298; G05B 2219/40607; G05B 19/42
USPC ................. 700/245–264; 318/268.11–568.25
See application file for complete search history.

(56) References Cited

U.S. PATENT DOCUMENTS

| | | | | |
|---|---|---|---|---|
| 8,194,929 B2* | 6/2012 | Koike | ................... | G03B 15/00 |
| | | | | 382/106 |
| 8,559,699 B2* | 10/2013 | Boca | ..................... | B25J 9/1697 |
| | | | | 382/153 |
| 9,089,971 B2* | 7/2015 | Aoba | ..................... | B25J 9/1697 |
| 9,239,234 B2* | 1/2016 | Aoba | ..................... | G01B 11/24 |
| 9,258,550 B1* | 2/2016 | Sieracki | ................... | G06V 20/63 |
| 10,350,752 B2* | 7/2019 | Satou | ....................... | B25J 9/161 |
| 2010/0131235 A1* | 5/2010 | Aoba | ......................... | G06T 7/70 |
| | | | | 356/615 |
| 2012/0259462 A1* | 10/2012 | Aoba | ..................... | B25J 9/1697 |
| | | | | 901/46 |
| 2013/0006423 A1* | 1/2013 | Ito | ......................... | B25J 9/1612 |
| | | | | 901/46 |
| 2013/0054025 A1* | 2/2013 | Ito | .......................... | G05B 19/42 |
| | | | | 700/246 |
| 2013/0141570 A1* | 6/2013 | Saruta | .................. | G06V 10/772 |
| | | | | 348/135 |
| 2013/0151007 A1* | 6/2013 | Valpola | ...................... | B25J 9/00 |
| | | | | 901/9 |
| 2014/0233807 A1* | 8/2014 | Ejima | .................. | G06V 20/653 |
| | | | | 382/106 |
| 2015/0224650 A1* | 8/2015 | Xu | ......................... | B25J 9/1692 |
| | | | | 414/730 |
| 2015/0262012 A1* | 9/2015 | Kim | ..................... | G06V 10/255 |
| | | | | 382/103 |
| 2016/0279809 A1* | 9/2016 | Nakajima | .............. | G06V 20/10 |
| 2017/0028562 A1* | 2/2017 | Yamazaki | ................. | B25J 9/163 |
| 2018/0257225 A1* | 9/2018 | Satou | ..................... | B25J 9/1697 |

FOREIGN PATENT DOCUMENTS

| | | |
|---|---|---|
| JP | 2003089086 | 3/2003 |
| JP | 2013151066 | 8/2013 |
| JP | 2015085450 | 5/2015 |
| JP | 2016068169 | 5/2016 |
| JP | 2016103230 | 6/2016 |
| JP | 2017087325 | 5/2017 |

OTHER PUBLICATIONS

Dmitry Kalashnikov et al., "QT-Opt: Scalable Deep Reinforcement Learning for Vision-Based Robotic Manipulation," 2nd Conference on Robot Learning (CoRL 2018), Nov. 2018, pp. 1-24.

T. Yamashita et al., "Recurrent Neural Network and Rapidly-exploring Random Tree Path Planning Adaptable to Environmental Change," 2018 JSME Conference on Robotics and Mechatronics, Jun. 2-5, 2018, pp. 1-4.

"International Search Report (Form PCT/ISA/210) of PCT/JP2019/040794", dated Dec. 17, 2019, with English translation thereof, pp. 1-4.

"Written Opinion of the International Searching Authority (Form PCT/ISA/237) of PCT/JP2019/040794", dated Dec. 17, 2019, with English translation thereof, pp. 1-8.

* cited by examiner

CONTROL DEVICE, CONTROL METHOD, AND NON-TRANSITORY COMPUTER-READABLE STORAGE MEDIUM

CROSS-REFERENCE TO RELATED APPLICATION

This application is a 371 application of the International PCT application serial no. PCT/JP2019/040794, filed on Oct. 17, 2019, which claims the priority benefits of Japan Patent Application No. 2018-225815, filed on Nov. 30, 2018. The entirety of each of the above-mentioned patent applications is hereby incorporated by reference herein and made a part of this specification.

TECHNICAL FIELD

The present invention relates to a control device, a control method, and a control program.

BACKGROUND ART

Robot devices such as manipulators are used in production lines that produce products. The components of a robot device such as a mechanism, a connector, and end effector have many variations depending on the operation (task) to be performed, and it is difficult to manually create operation procedures for robot devices corresponding to all variations. Therefore, conventionally, a method is adopted in which after determining the type of components such as a mechanism, a connector, and an end effector, the robot device is manually moved to directly teach the operation to be executed while recording the posture in a series of operations to be executed.

However, in this method, the robot device is taught about the operation to be executed whenever a component such as a mechanism, a connector, and an end effector is changed. Therefore, it is too costly to teach a robot device about the operations to be executed. Therefore, in recent years, a method of allowing a robot device to learn the operation to be executed using machine learning has been studied. For example, Non Patent Literature 1 proposes a method of allowing a robot device to learn an operation of grasping an object on the basis of image data obtained from a camera by reinforcement learning. According to this method, it is possible to automate at least a part of a series of processes for teaching the robot device about the operation of grasping the object. Therefore, it is possible to reduce the cost of teaching the robot device about the operation.

CITATION LIST

Patent Literature

[Non Patent Literature 1]
Dmitry Kalashnikov, et al. "QT-Opt: Scalable Deep Reinforcement Learning for Vision-Based Robotic Manipulation" arXiv preprint arXiv: 1806.10293, 2018.

SUMMARY OF INVENTION

Technical Problem

The present inventors have found that the conventional control method of the robot device as described has the following problems. In the conventional control method, time-series control commands provided to the robot device for the operation to be executed are learned. That is, the learned time-series control commands are directly associated with the operation. Therefore, if at least one of the environment for performing the operation and the object changes a little, the details of the operation will also change substantially, and the robot will not be able to appropriately perform the operation unless it is newly learned.

For example, it may be assumed that the operation taught to a robot device is to transport an object C present in a posture B at a point A to a point D. In this case, if the object C is accurately arranged at the point A in the posture B, the robot device can appropriately perform the operation on the basis of the learning results. However, if the object C is placed slightly offset from the point A, or if the object C is placed at the point A but is tilted from the posture B, the position and posture at which the robot device grasps the object C changes. The details of the operation to be executed change due to this reason or the like. That is, in this case, the operation to be executed is to "transport the object C that is offset or tilted from the point A to the point D," which is different from the original operation "to transport the object C that is present in the posture B at the point A to the point D". Then, if the robot device operates on the basis of the learning result, it may not be able to appropriately perform this operation. That is, the conventional control method has a problem that the versatility of the ability to perform the operation to be learned is not sufficient. Due to this problem, in order to operate the robot device for general purposes, control commands are learned for each different operation, and the cost for teaching the robot device about the operation is still high.

In one aspect, the present invention has been made in view of such circumstances, and an objective thereof is to provide a technique for increasing the versatility of the ability to execute the operation to be learned.

Solution to Problem

The present invention employs the following configuration in order to solve the above-mentioned problems.

That is, a control device according to an aspect of the present invention is a control device that generates a control command for controlling an operation of a robot device that operates in an environment where a plurality of objects is present, including: a target setting unit that sets a relative relationship amount between the plurality of objects serving as a final target, the relative relationship amount indicating an attribute related to a relative and physical relationship between the plurality of objects; a data acquisition unit that repeatedly acquires observation data from a sensor that observes the plurality of objects present in the environment; a relationship identifying unit that calculates a relative relationship amount between the plurality of objects from the acquired observation data; an action determination unit that determines a series of relative relationship amounts in a target state of the plurality of objects until a relative relationship amount of the set final target is realized from a relative relationship amount between the plurality of objects at a starting time point of controlling the operation; a command determination unit that repeatedly determines a control command to be provided to the robot device so that a relative relationship amount in a current state calculated from latest observation data acquired from the sensor is changed to a relative relationship amount in a state of a next transition target of the current state, included in the series of relative relationship amounts until the relative relationship amount of the final target is realized; and an output unit that outputs the determined control command to the robot device.

In the above-mentioned configuration, in relation to the execution of the operation (task), the situations and targets of a plurality of objects present under the environment in which the robot device operates are represented by relative relationship amounts, and the control command is determined as the relative relationship amount is changed. The relative relationship amount indicates an attribute related to a relative and physical relationship between the plurality of objects present in the environment, and examples thereof includes relative coordinates (relative positions, relative postures) between the plurality of objects, a force acting between the plurality of objects, and the state between the plurality of objects (for example, whether they are connected or not). That is, in the above-mentioned configuration, the control command is not directly associated with the operation, but is associated with the amount of change in the relative relationship amount. As a result, it is possible to teach the series control commands to be provided to the robot device by changing the relative relationship amount regardless of the details of the operation. That is, even when the details of an operation are changed a little, it is possible to cause a robot device to appropriately execute such an operation as long as the operation can be executed with the same change in the relative relationship amount. Therefore, according to the above-mentioned configuration, it is possible to increase the versatility of the ability to execute the operation to be learned. As a result, it is possible to reduce the cost of teaching the robot device about the operation.

The "object" is an object that is associated with the operation of the robot device, and is, for example, an end effector, a workpiece, an obstacle, or the like. The "environment" is an area in which the object is present and the robot device operates. The type of the robot device may not be particularly limited and may be appropriately selected depending on an embodiment. The robot device may include, for example, an industrial robot such as a manipulator, an automatically movable moving body, and the like. Industrial robots include, for example, the above-mentioned vertical articulated robots, SCARA robots, parallel link robots, Cartesian robots, cooperative robots, and the like. In addition, the automatically movable moving body includes, for example, a drone, a vehicle configured to be driven automatically, a mobile robot, and the like. The present invention may be applied to any type of robot device capable of manipulating an object.

The operation (task) is a job to be executed by the robot device, and the type thereof may not be particularly limited and may be appropriately selected depending on an embodiment. The operation is, for example, parts transportation, parts fitting, screwing, and the like. The operation may be a simple operation such as workpiece grasping or workpiece releasing. The operation may be provided in advance and may be provided by the designation of an operator.

The type of the "sensor" may not be particularly limited as long as it can observe a relative relationship amount, and may be appropriately selected depending on an embodiment. The sensor may be a camera, for example. In this case, the observation data is image data. The "acquiring observation data from a sensor" may include that the control device is connected to the sensor, and the observation data is acquired directly from the sensor, and the observation data is acquired indirectly from the sensor via another device.

The "final target" is an ending point (goal), and is realized when execution of the operation is completed and is set according to the given operation. The "starting time point" is a starting point (start), and is the state before starting the control of the operation of the robot device in relation to the execution of the operation. The "relative relationship amount at the starting time point" may be provided in advance and may be calculated from the observation data acquired before starting the control of the operation of the robot device in relation to execution of the operation.

The "target" includes a final target and is set as appropriate to achieve the execution of the operation. The number of targets set may be one (in this case, only the final target is set), and may be plural. Targets other than the final target are waypoints that are passed until reaching an ending point after starting from a starting point. Therefore, the final target may be simply referred to as a "target (goal)", and a target other than the final target may be referred to as a "subordinate target (sub-goal)".

The "realizing the relative relationship amount of the final target" means that the execution of the operation is completed, and for example, the relative relationship amount calculated from the observation data acquired from the sensor matches the relative relationship amount of the final target. This "match" may include an approximation based on a threshold (an allowable error) as well as an exact match. The "next transition target" is the next aiming state from the current state (a provisional state if the target is other than the final target), and for example, is a target closest to the current state toward the final target. The "latest" is a time point immediately before determining the control command when the operation is controlled by the control command.

The "control command" is related to the control of the operation of the robot device, and for example, is a target control amount, an operation amount, and the like. The "outputting the control command" includes directly controlling the robot device on the basis of the control command, and when the robot device includes a controller, the outputting includes outputting the control command to the controller to cause the controller to control the operation of the robot device.

In the control device according to the aspect, the relative relationship amount may include a relative coordinate between the plurality of objects. In the control device according to the aspect, the sensor may include a camera, the observation data may include image data obtained by the camera, and the relationship identifying unit may match a model of each of the objects with the image data obtained by the camera and calculate a relative coordinate between the plurality of objects on the basis of a result of the matching. According to this configuration, it is possible to easily increase the versatility of the ability to execute the operation to be taught to the robot device on the basis of the relative coordinate. The representation method of the relative coordinates may not be particularly limited as long as the relative positional relationship between the objects can be identified. The relative coordinates may include a relative position and a relative posture, for example.

In the control device according to the aspect, the command determination unit may include a first learned learning model trained to determine a control command for controlling the operation of the robot device so that a relative relationship amount in a first state is changed to a relative relationship amount in a second state with respect to the input of the relative relationship amount in the first state and the relative relationship amount in the second state. The determining of the control command may include: inputting the relative relationship amount in the current state and the relative relationship amount in the state of the next transition target to the first learned learning model; executing arithmetic processing of the first learned learning model; and acquiring an output value output from the first learned learning model as a result of determining the control command. According to this configuration, it is possible to appropriately determine the control command to be provided to the robot device by changing the relative relationship amount using the learning model. Therefore, it is possible to cause the robot device to appropriately execute the operation on the basis of the leaned ability after increasing the versatility of the ability to execute the operation.

The first state is the "current state" for training. The relative relationship amount in the first state may be referred to as a first relative relationship amount. The second state is the "next transition state" for training. The relative relationship amount in the second state may be referred to as a second relative relationship amount. The type of the learning model may not be particularly limited as long as the inference ability for determining the control command can be acquired by machine learning, and may be appropriately selected depending on an embodiment. The type of the machine learning may not be particularly limited and may be appropriately selected depending on an embodiment. The machine learning is typically supervised learning or reinforcement learning. When supervised learning is employed as the machine learning, the learning model may be configured as a neural network such as, for example, a fully-coupled neural network or a recursive neural network including a long short-term memory (LSTM) block. Hereinafter, the long short-term memory block is sometimes referred to as an "LSTM block". Moreover, when reinforcement learning is employed as the machine learning, the learning model may be configured as a value function such as, for example, a state value function or an action value function.

In the control device according to the aspect, the robot device may include an observation sensor that observes an attribute of the robot device, the first learned learning model may be configured to further receive the input of attribute data obtained by the observation sensor, and the determining of the control command may include further inputting the attribute data obtained by the observation sensor to the first learned learning model. According to this configuration, the control command to be provided to the robot device can be determined more appropriately by further using the attribute data.

The type of "observation sensor" may not be particularly limited as long as it observes some attribute of the robot device and may be appropriately selected depending on an embodiment. The observation sensor may be, for example, a proximity sensor, a tactile sensor, a force sensor, an encoder, or the like. In this case, the attribute data may be, for example, measurement data of a proximity sensor, a tactile sensor, a force sensor, an encoder, or the like, or a feature amount calculated from the measurement data. The observation sensor may be configured as a plurality of sensors. The time point at which the attribute data to be input to the first learned learning model is obtained is a time point at which the operation is controlled by the control command and is immediately before determining the control command, for example.

In the control device according to the aspect, the action determination unit may retain map information indicating an arrangement space in which a plurality of nodes each corresponding to relative relationship amounts in candidate states for the target state are disposed, the arrangement space representing a set of relative relationship amounts between the plurality of objects. The determining of the series of relative relationship amounts may include: searching for a route from a node corresponding to the relative relationship amount in the state of the starting time point to a node corresponding to the relative relationship amount in the state of the final target by selecting a waypoint node from the plurality of nodes in the arrangement space indicated by the map information; and generating the series of relative relationship amounts using the relative relationship amount corresponding to the node included in the searched route. According to this configuration, it is possible to easily and appropriately determine a series of relative relationship amounts (that is, an action plan) that serves as a guideline for determining the control command. Therefore, it is possible to cause the robot device to easily and appropriately execute the operation on the basis of the leaned ability after increasing the versatility of the ability to execute the operation.

Each node (nodal point, vertex) corresponds to one state of the plurality of objects and indicates a relative relationship amount in the one state. Each node may be appropriately set by random sampling, manual input, or the like. An edge may be appropriately set between the nodes. That is, the map information may have a graph structure composed of nodes and edges. An edge (branch, side) connects two nodes and indicates that it is possible to transition from a state corresponding to one node to a state corresponding to the other node. A method for determining a combination of two nodes for setting an edge may not be particularly limited and may be appropriately selected depending on an embodiment. For example, the combination of two nodes for setting an edge may be determined on the basis of a known method such as the nearest neighbor method. A route is composed of edges connected to a selected node. For the route search, a known search method such as Dijkstra's algorithm may be used, for example. Further, constraint conditions such as, for example, passing through a designated node may be imposed on the route search. The constraint conditions may be appropriately determined depending on an embodiment.

The arrangement space represents a set of relative relationship amounts. A free region and a restricted region may be set in the arrangement space. A node corresponding to a state (a feasible relative relationship amount) that can be taken as a relative relationship between the plurality of objects belongs to the free region. On the other hand, a node corresponding to a state (an infeasible relative relationship amount) that cannot be taken as the relative relationship between the plurality of objects belongs to the restricted region. In this case, each node is arranged in the free region. Moreover, an edge is appropriately set so as not to enter the restricted region.

In the control device according to the aspect, the action determination unit may include a second learned learning model trained to determine a relative relationship amount in the state of the next transition target of a current state for training with respect to the input of a relative relationship amount in a final target for training and a relative relationship amount in the current state for training. The determining of the series of relative relationship amounts may include repeatedly executing: inputting the relative relationship amount in the current state and the relative relationship amount in the set final target to the second learned learning model; executing arithmetic processing of the second learned learning model; and acquiring an output value output from the second learned learning model as a result of determining the relative relationship amount in the state of the next transition target. According to this configuration, it is possible to improve the accuracy of determining the target state from the starting point to the final target using the learning model. Therefore, it is possible to appropriately determine the control command to be provided to the robot device on the basis of the target determined with high accuracy. As a result, it is possible to cause the robot device to appropriately execute the operation.

In the control device according to the aspect, the second learned learning model may be configured to further receive the input of the observation data acquired from the sensor, and the determining of the series of relative relationship amounts may further include inputting the latest observation data to the second learned learning model. According to this configuration, it is possible to further increase the accuracy of determining the target state by further using the latest observation data. Therefore, it is possible to cause the robot device to execute the operation more appropriately.

In the control device according to the aspect, the relationship identifying unit may include a third learned learning model trained to calculate a relative relationship amount between the plurality of objects appearing in observation data for training with respect to the input of the observation data for training. The calculating of the relative relationship amount may include: inputting the acquired observation data to the third learned learning model; executing arithmetic processing of the third learned learning model; and acquiring an output value output from the third learned learning model as a result of calculating the relative relationship amount. According to this configuration, it is possible to increase the accuracy of deriving the relative relationship amount from the observation data obtained from the sensor using the learning model. Therefore, it is possible to appropriately determine the control command to be provided to the robot device by changing the relative relationship amount. As a result, it is possible to cause the robot device to execute the operation appropriately.

In the control device according to the aspect, the robot device may further include an observation sensor that observes an attribute of the robot device, the third learned learning model may be configured to further receive the input of attribute data obtained by the observation sensor, and the calculating of the relative relationship amount may include further inputting the attribute data obtained by the observation sensor to the third learned learning model. According to this configuration, it is possible to further increase the accuracy of deriving the relative relationship amount by further using the attribute data. Therefore, it is possible to cause the robot device to execute the operation more appropriately.

In the control device according to the aspect, the robot device may be a manipulator including an end effector, the plurality of objects may include the end effector, the command determination unit may determine a control command related to the end effector, and the output unit may output the determined control command to the manipulator. According to this configuration, it is possible to increase the versatility of the ability to execute the operation to be taught to the manipulator. As a result, it is possible to reduce the cost of teaching the manipulator about the operation. The end effector is attached to the tip end of the manipulator, and the type thereof may not be particularly limited and may be appropriately selected depending on an embodiment. The end effector may be, for example, a gripper, a suction device, a screwdriver, or the like.

As another form of the control device according to the embodiment, an aspect of the present invention may be an information processing method for realizing the above-mentioned respective configurations, may be a program, and a storage medium readable by a computer or the like, storing the program. Here, the storage medium readable by the computer or the like is a medium that accumulates information such as a program by an electrical, magnetical, optical, mechanical, or chemical action.

For example, a control method according to an aspect of the present invention is an information processing method for generating a control command for controlling an operation of a robot device that operates in an environment where a plurality of objects is present, the information processing method causing a computer to execute: setting a relative relationship amount between the plurality of objects serving as a final target, the relative relationship amount indicating an attribute related to a relative and physical relationship between the plurality of objects; repeatedly acquiring observation data from a sensor that observes the plurality of objects present in the environment; calculating a relative relationship amount between the plurality of objects from the acquired observation data; determining a series of relative relationship amounts in a target state of the plurality of objects until a relative relationship amount of the set final target is realized from a relative relationship amount between the plurality of objects at a starting time point of controlling the operation; repeatedly determining a control command to be provided to the robot device so that a relative relationship amount in a current state calculated from latest observation data acquired from the sensor is changed to a relative relationship amount in a state of a next transition target of the current state, included in the series of relative relationship amounts until the relative relationship amount of the final target is realized; and outputting the determined control command to the robot device.

For example, a control program according to an aspect of the present invention is a program for generating a control command for controlling an operation of a robot device that operates in an environment where a plurality of objects is present, the program causing a computer to execute: setting a relative relationship amount between the plurality of objects serving as a final target, the relative relationship amount indicating an attribute related to a relative and physical relationship between the plurality of objects; repeatedly acquiring observation data from a sensor that observes the plurality of objects present in the environment; calculating a relative relationship amount between the plurality of objects from the acquired observation data; determining a series of relative relationship amounts in a target state of the plurality of objects until a relative relationship amount of the set final target is realized from a relative relationship amount between the plurality of objects at a starting time point of controlling the operation; repeatedly determining a control command to be provided to the robot device so that a relative relationship amount in a current state calculated from latest observation data acquired from the sensor is changed to a relative relationship amount in a state of a next transition target of the current state, included in the series of relative relationship amounts until the relative relationship amount of the final target is realized; and outputting the determined control command to the robot device.

Advantageous Effects of Invention

According to the present invention, it is possible to increase the versatility of the ability to execute the operation to be learned.

DESCRIPTION OF EMBODIMENTS

Hereinafter, embodiments according to one aspect of the present invention (hereinafter, also referred to as "the present embodiments") will be described with reference to the drawings. However, the present embodiments described below are merely examples of the present invention in all respects. Naturally, various improvements and modifications can be made without departing from the scope of the present invention. That is, in realizing the present invention, a specific configuration according to an embodiment may be appropriately adopted. Although the data appearing in the present embodiment may be described in a natural language, more specifically, the data is designated in a pseudo language, commands, parameters, a machine language, or the like which is recognizable by a computer.

§ 1 Application Example

Figure 1:
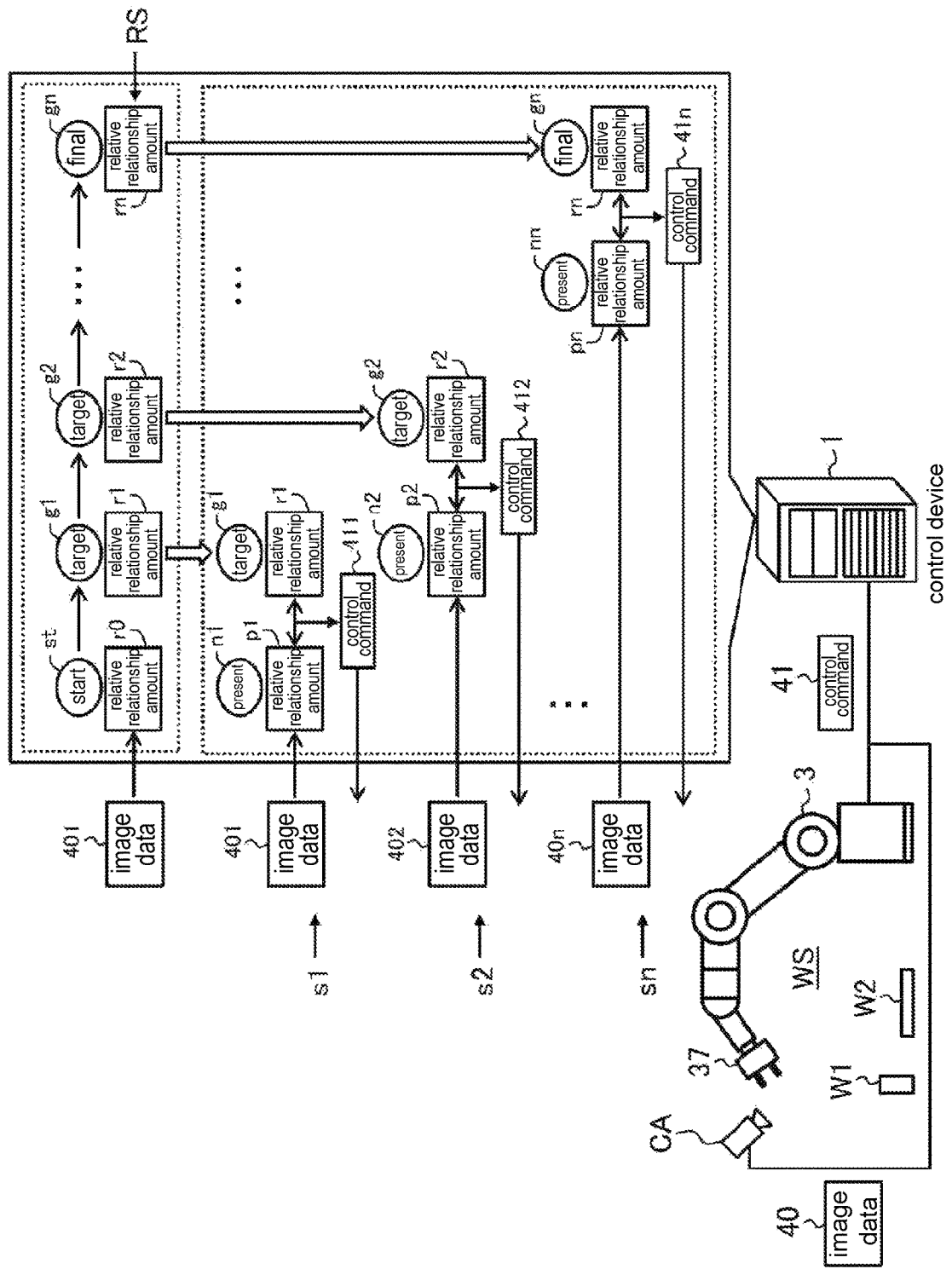
FIG. 1 schematically illustrates an example of a scene in which the present invention is applied.

First, an example of a situation in which the present invention is applied will be described with reference to FIG. 1. FIG. 1 schematically illustrates an example of an application scene of a control device 1 according to the present embodiment. The example of FIG. 1 illustrates a situation in which the operation of a vertical articulated manipulator 3 provided with a gripper 37 is controlled. The manipulator 3 is an example of a "robot device" of the present invention, and the gripper 37 is an example of an "end effector" of the present invention. However, the application target of the present invention may not be limited to such an example, and may be applied to any scene where the operation of some robot device is controlled.

As illustrated in FIG. 1, the control device 1 according to the present embodiment is a computer that generates a control command 41 for controlling the operation of a robot device (the manipulator 3) operating under an environment WS in which a plurality of objects is present. The environment WS is an area where an object is present and a robot device operates. The object is an object that is associated with the operation of the robot device, and is, for example, an end effector, a workpiece, an obstacle, or the like. The object may include components of the robot device. In the present embodiment, the gripper 37, a first workpiece W1, and a second workpiece W2 are present in the environment WS as examples of the objects.

The control device 1 repeatedly acquires observation data from sensors that observe a plurality of objects present in the environment WS, and calculates relative relationship amounts between the plurality of objects from the acquired observation data. The relative relationship amounts indicate attributes related to a relative and physical relationship between a plurality of objects. The relative relationship amounts are, for example, relative coordinates (a relative position and a relative posture) between a plurality of objects, forces acting between the plurality of objects, and the mutual state between the plurality of objects (for example, whether they are connected or not). In the present embodiment, a camera CA is used as an example of the sensor. Further, in the present embodiment, as will be described later, the relative relationship amount includes the relative coordinates between a plurality of objects. Therefore, the control device 1 acquires the image data 40 from the camera CA as observation data, and calculates the relative relationship amount including the relative coordinates from the acquired image data 40.

The control device 1 sets the relative relationship amount between a plurality of objects serving as a final target. The final target is determined according to the operation (task) to be performed by the manipulator 3. The control device 1 plans the transition of the relative relationship amount until the final target is achieved from the starting time point of the operation control, and determines the control command 41 to be provided to the manipulator 3 according to the planned transition of the relative relationship amount. The "starting time point" is the starting point (start) of the plan, and is the state before starting the control of the operation of the robot device (the manipulator 3) in relation to the execution of the operation. The "final target" is the ending point (goal) of the plan, and is realized when execution of the operation is completed and is set according to the given operation.

Specifically, the control device 1 determines the series of relative relationship amounts in a target state of a plurality of objects until the relative relationship amount of the final target set from the relative relationship amount between the plurality of objects at the starting time point of the operation control is realized. The control device 1 repeatedly determines the control command 41 to be provided to the manipulator 3 so that the relative relationship amount in the current state calculated from the latest observation data acquired from the sensors is changed to the relative relationship amount in the state of the next transition target of the current state, included in the series of relative relationship amounts until the relative relationship amount of the final target is realized.

The control device 1 outputs the determined control command 41 to the manipulator 3. The control command 41 is related to control of the operation of the robot device (the manipulator 3), and is, for example, a target control amount, an operation amount, and the like. Further, outputting of the control command 41 means directly controlling the robot device on the basis of the control command 41, and when the robot device includes a controller, providing the control command 41 to the controller to cause the controller to control the operation of the robot device. In the present embodiment, the control device 1 controls the operation of the manipulator 3 on the basis of the control command 41 as the output process of the control command 41. As a result, the operation of the manipulator 3 is controlled such that a given operation is performed.

A specific example of operation control by the control device 1 will be described with reference to FIGS. 2A to 2F. FIG. 1 and FIGS. 2A to 2F schematically illustrate, as an example of the operation to be executed by the manipulator 3, the operation of grasping the first workpiece W1 disposed at a place away from the second workpiece W2 using the gripper 37 and transporting the grasped first workpiece W1 onto the second workpiece W2. FIG. 1 illustrates a scene in which, as a result of the plan, the series RS of relative relationship amounts is determined so that the operation of transporting the parts from the starting time point st to the final target gn is executed in n (n is a natural number) steps. FIGS. 2A to 2F schematically illustrate the process of causing the manipulator 3 to execute the operation of arranging the first workpiece W1 on the second workpiece W2.

However, the operation to be executed by the manipulator 3 is not limited to such transportation of parts, and may be appropriately selected depending on an embodiment. In addition to parts transportation, the operation may be, for example, fitting or screwing of parts, and the like. The operation may be a simple operation such as workpiece grasping or workpiece releasing. Further, the number of steps for executing a series of operations, that is, the number of relative relationship amounts included in the series RS is not limited to such an example, and may be appropriately selected depending on an embodiment. Further, in the example of FIG. 1, targets (g1, g2, and the like) other than the final target gn are set between the starting time point st of the operation control and the final target gn. However, the example of the process of determining the series of relative relationship amounts may not be limited to such an example, and the final target gn may be set later than the starting time point st. In other words, the series of relative relationship amounts may be determined so that there is no target other than the final target gn.

Figure 2A:
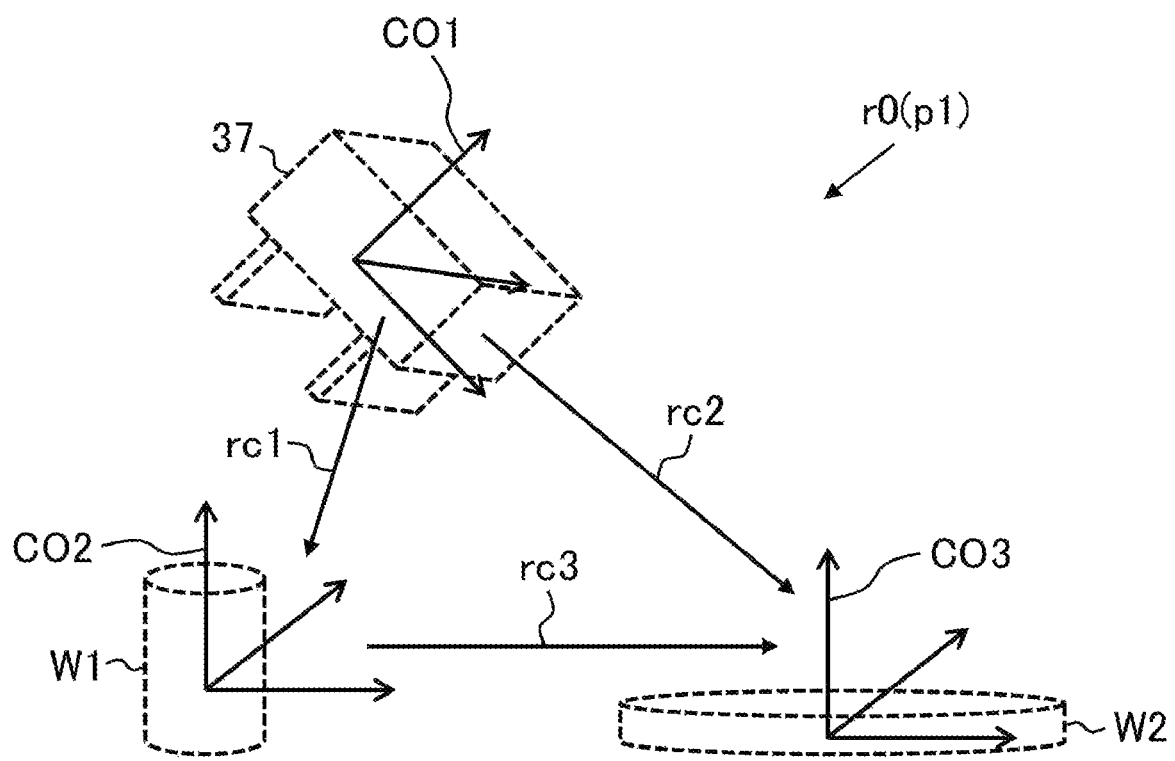
FIG. 2A schematically illustrates an example of a relative relationship amount according to an embodiment.

First, an example of the relative relationship amount will be described. As illustrated in FIG. 2A, the relative relationship amount according to the present embodiment includes relative coordinates (rc1, rc2, rc3). The relative coordinate rc1 represents a local coordinate system CO2 of the first workpiece W1 as seen from a local coordinate system CO1 of the gripper 37, and indicates the relative position and posture relationship between the gripper 37 and the first workpiece W1. The relative coordinate rc2 represents a local coordinate system CO3 of the second workpiece W2 as seen from the local coordinate system CO1 of the gripper 37, and indicates the relative position and posture relationship between the gripper 37 and the second workpiece W2. The relative coordinate rc3 represents the local coordinate system CO3 of the second workpiece W2 as seen from the local coordinate system CO2 of the first workpiece W1, and indicates the relative position and posture relationship between the first workpiece W1 and the second workpiece W2.

In the present embodiment, each of the sets of relative coordinates (rc1, rc2, rc3) includes a relative position represented using three axes (front-back, left-right, up-down; relative position) in a three-dimensional space and a relative posture represented by rotation (roll, pitch, yaw) of each axis. Each set of relative coordinates (rc1, rc2, rc3) is an example of the "relative coordinates between a plurality of objects" of the present invention. However, the representation of the relative coordinates may not be limited to such an example, and may be appropriately determined depending on an embodiment. The relative coordinates may be set to include only one of the relative position and the relative posture, for example. Further, the method of providing the relative coordinates may not be limited to such an example, and may be appropriately determined depending on an embodiment. For example, the relationship of the relative coordinates (rc1, rc2, rc3) may be reversed such that the relative coordinate rc1 represents the local coordinate system CO1 of the gripper 37 as seen from the local coordinate system CO2 of the first workpiece W1.

Next, an example of the process of determining the control command 41 on the basis of this relative relationship amount will be described. In the present embodiment, each state in a series of operations of parts transportation is represented by a relative relationship amount including the relative coordinates (rc1, rc2, rc3). As illustrated in FIG. 2A, at the starting time point st of the operation control, the first workpiece W1 is arranged away from the second workpiece W2, and the gripper 37 is arranged in a tilted state at a position away from the first workpiece W1 and the second workpiece W2. Each relative coordinate (rc1, rc2, rc3) included in the relative relationship amount r0 at the starting time point st indicates the relative position and posture relationship between the gripper 37, the first workpiece W1 and the second workpiece W2 in this state. In the present embodiment, each of the relative coordinates (rc1, rc2, rc3) of the relative relationship amount r0 is calculated from the image data 401 acquired before (the starting time point st) starting the control of the operation of the manipulator 3 in relation to the execution of the operation.

Figure 2B:
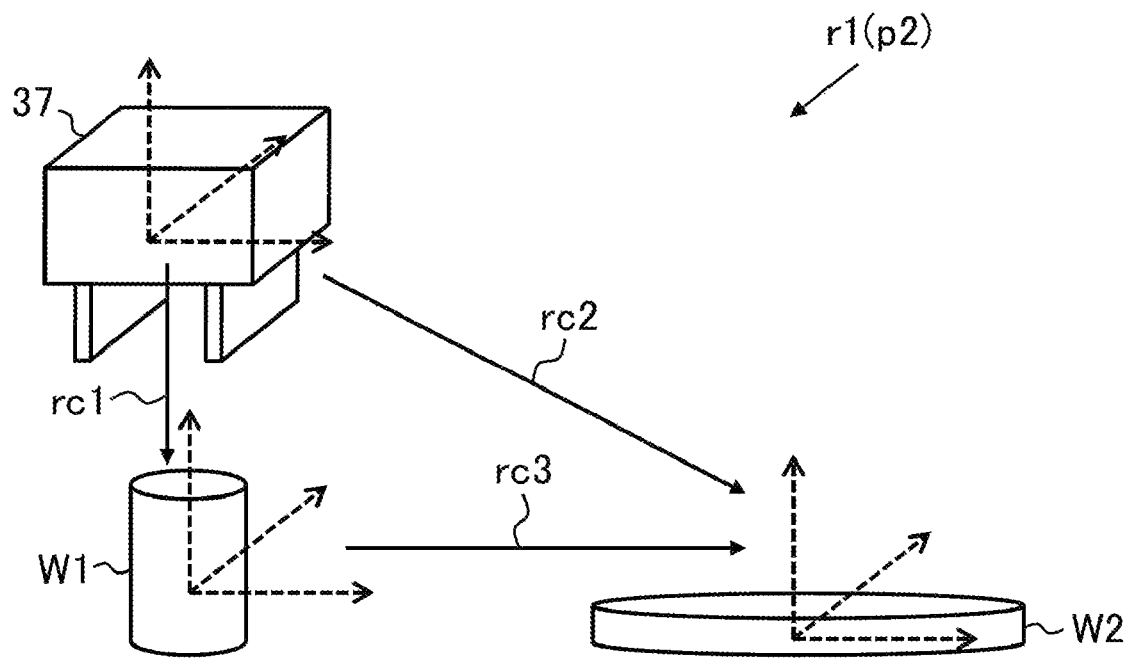
FIG. 2B schematically illustrates an example of a relative relationship amount according to an embodiment.
Figure 2C:
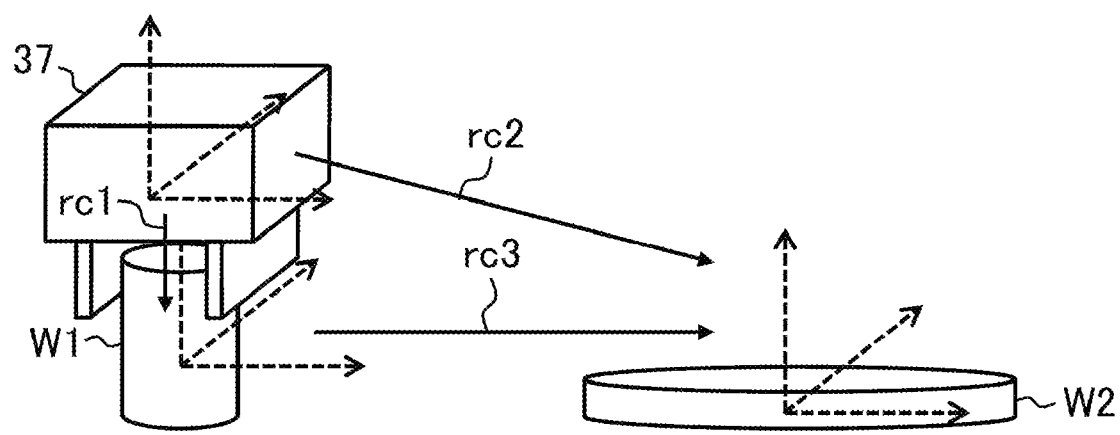
FIG. 2C schematically illustrates an example of a relative relationship amount according to an embodiment.
Figure 2D:
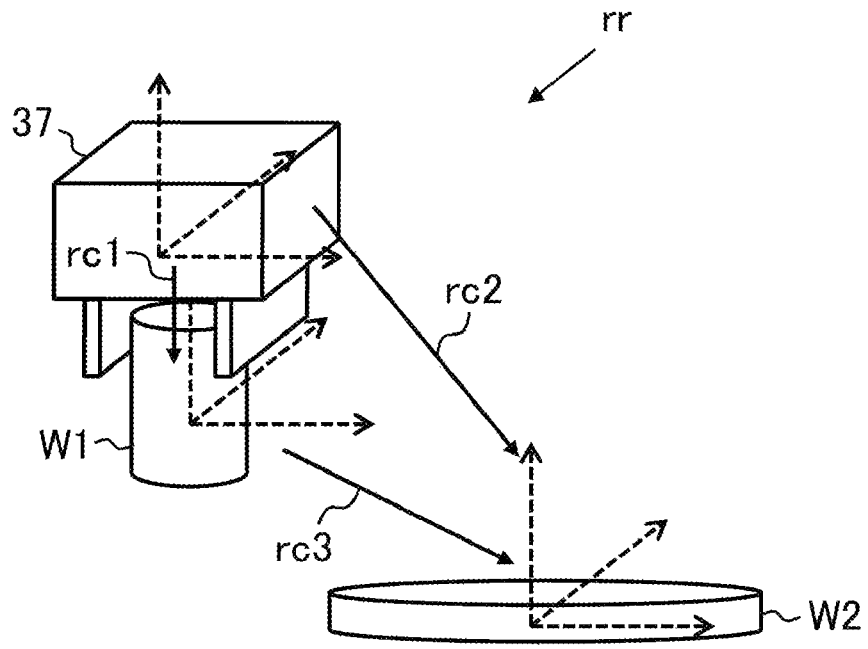
FIG. 2D schematically illustrates an example of a relative relationship amount according to an embodiment.
Figure 2E:
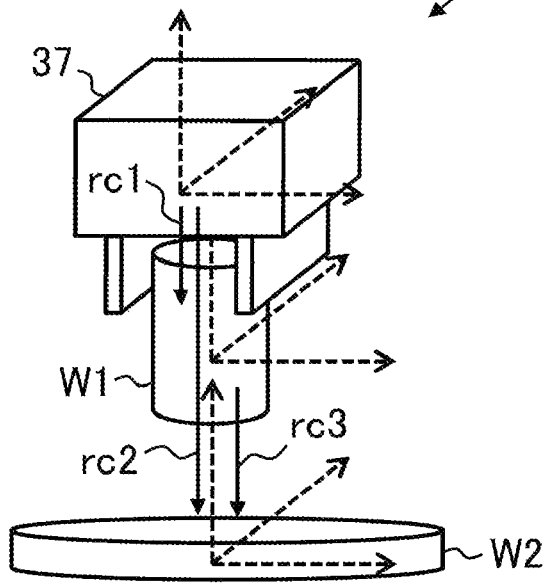
FIG. 2E schematically illustrates an example of a relative relationship amount according to an embodiment.
Figure 2F:
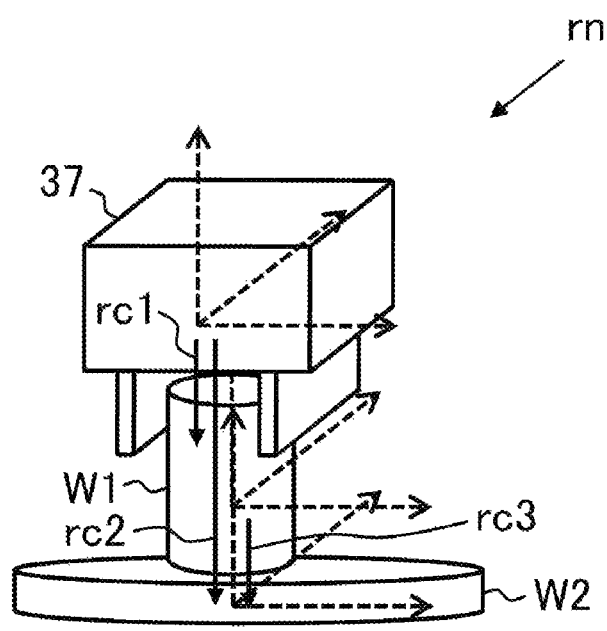
FIG. 2F schematically illustrates an example of a relative relationship amount according to an embodiment.

On the other hand, as illustrated in FIG. 2F, the final target gn in this example of the operation is that the gripper 37 grasps the upper part of the first workpiece W1 and the grasped first workpiece W1 is placed on the second workpiece W2. Each relative coordinate (rc1, rc2, rc3) included in the relative relationship amount rn in the final target gn indicates the relative position and posture relationship between the gripper 37, the first workpiece W1 and the second workpiece W2 in this state. This relative relationship amount rn is appropriately given depending on the operation to be executed by the manipulator 3.

The control device 1 determines the series RS of relative relationship amounts in the target state of the plurality of objects until the relative relationship amount rn of the final target gn is realized from the relative relationship amount r0 at the starting time point st. The "target" includes the final target gn and is set as appropriate to achieve the execution of the operation. The number of targets set may be one or may be plural. In the example of FIG. 1, n targets (g1, g2, and the like) including the final target gn are set. Targets (g1, g2, and the like) other than the final target gn are waypoints (corresponding to the intermediate states) that are passed until reaching the ending point after starting from the starting point. Therefore, the final target gn may be simply referred to as a "target (goal)", and a target other than the final target gn may be referred to as a "subordinate target (sub-goal)".

FIGS. 2B to 2E schematically illustrate an example of targets (g1, g2, and the like) in the intermediate state that has been established as a result of determining the series RS of relative relationship amounts. Specifically, in the example of FIG. 2B, it is established that the posture of the gripper 37 is changed so that the first workpiece W1 can be grasped and the gripper 37 is placed above the first workpiece W1 as the next transition target g1 of the starting time point st. The relative coordinates (rc1, rc2, rc3) included in the relative relationship amount r1 in the target g1 are set to indicate the relative position and posture relationship between the gripper 37, the first workpiece W1, and the second workpiece W2 in this state. In the example of FIG. 2C, it is established that the gripper 37 is lowered and the upper part of the first workpiece W1 is grasped by the gripper 37 as the next transition target g2 of the target g1. The relative coordinates (rc1, rc2, rc3) included in the relative relationship amount r2 in the target g2 are set to indicate the relative position and posture relationship between the gripper 37, the first workpiece W1, and the second workpiece W2 in this state.

In this way, the relative relationship amount in each target is appropriately determined so as to correspond to one time point (that is, an intermediate state) in the process in which the relative relationship amount r0 at the starting time point st transitions to the relative relationship amount rn in the final target gn. In the example of FIG. 2D, a scene in which the gripper 37 grasping the first workpiece W1 approaches the second workpiece W2 is illustrated as a target established between the target g2 and the final target gn. The relative coordinates (rc1, rc2, rc3) included in the relative relationship amount rr in this target are set to indicate the relative position and posture relationship between the gripper 37, the first workpiece W1, and the second workpiece W2 in this state. In the example of FIG. 2E, a scene in which the gripper 37 grasping the first workpiece W1 is located above the second workpiece W2 is illustrated as a target immediately before the final target gn. The relative coordinates (rc1, rc2, rc3) included in the relative relationship amount r(n−1) in this target are set to indicate the relative position and posture relationship between the gripper 37, the first workpiece W1 and the second workpiece W2 in this state.

The control device 1 repeatedly determines the control command 41 to be provided to the manipulator 3 so that the relative relationship amount in the current state calculated from the latest image data 40 acquired from the camera CA is changed to the relative relationship amount in the state of the next transition target of the current state included in the series RS of relative relationship amounts until the relative relationship amount rn of the final target gn is realized. In the first step s1 of this repetition, the initial state at the starting time point st is the current state n1. That is, the relative relationship amount p1 in the current state n1 calculated from the latest image data 401 is the same as the relative relationship amount r0 at the starting time point st. The "latest" is when the operation is controlled by the control command and is a time point immediately before the control command is determined. The "next transition target" is the next target state from the current state (a provisional state if the target is other than the final target), and for example, is a target closest to the current state toward the final target. Therefore, the next transition target of the current state n1 is the target g1. Therefore, in step s1, the control device 1 determines the control command 411 so that the relative relationship amount p1 (FIG. 2A) in the current state n1 calculated from the latest image data 401 is changed to the relative relationship amount r1 (FIG. 2B) in the state of the target g1. The operation of the manipulator 3 is controlled on the basis of the determined control command 411.

When the operation control of the manipulator 3 based on the control command 411 is appropriately completed, the gripper 37, the first workpiece W1, and the second workpiece W2 are in the state illustrated in FIG. 2B. That is, in the next step s2, the relative relationship amount p2 in the current state n2 calculated from the latest image data 402 matches or approximates the relative relationship amount r1 of the target g1 achieved before step s2 is executed. The next transition target of the current state n2 is the target g2 set subsequently to the target g1. Therefore, in step s2, the control device 1 determines the control command 412 so that the relative relationship amount p2 (FIG. 2B) in the current state n2 calculated from the image data 402 is changed to the relative relationship amount r2 (FIG. 2C) in the state of the target g2. The operation of the manipulator 3 is controlled on the basis of the determined control command 412.

The determination of the control command 41 and the control of the operation of the manipulator 3 based on the determined control command 41 are repeatedly executed. By this repetition, the states of the gripper 37, the first workpiece W1, and the second workpiece W2 transition from the state at the starting time point st to the state of the final target gn. At the time point of step sn immediately before the final target gn is realized, the relative relationship amount pn in the current state nn calculated from the latest image data 40n matches or approximates the relative relationship amount r(n−1) of the target achieved before the final target gn. In this step sn, the control device 1 determines the control command 41n so that the relative relationship amount pn (FIG. 2E) in the current state nn calculated from the image data 40n is changed to the relative relationship amount rn (FIG. 2F) in the state of the final target gn. The operation of the manipulator 3 is controlled on the basis of the determined control command 41n.

When the control operation in step sn is completed, the relative relationship amount rn of the final target gn, that is, the state in which the first workpiece W1 grasped by the gripper 37 is placed on the second workpiece W2 is realized. Realizing the relative relationship amount rn of the final target gn means that the execution of the operation is completed. For example, it means that the relative relationship amount calculated from the image data 40 acquired from the camera CA matches the relative relationship amount rn of the final target gn. This "match" may include an approximation based on a threshold (an allowable error) as well as an exact match. By executing the above-mentioned repeated process until the final target gn is reached, control is performed such that the manipulator 3 executes a series of operations of gripping the first workpiece W1 disposed at a location away from the second workpiece W2 using the gripper 37 and transporting the grasped first workpiece W1 onto the second workpiece W2.

As described above, in the present embodiment, in relation to the execution of the operation, the situations and targets of a plurality of objects present under the environment WS in which the manipulator 3 operates are represented by relative relationship amounts, and the control command 41 is determined as the relative relationship amount is changed. The relative relationship amount indicates an attribute related to a relative and physical relationship between the plurality of objects (the gripper 37, the first workpiece W1, and the second workpiece W2) present in the environment WS, and in the present embodiment, the relative relationship amount includes the relative coordinates (rc1, rc2, rc3). That is, in the present embodiment, the control command 41 is not directly associated with the operation, but is associated with the amount of change in the relative relationship amount. As a result, it is possible to teach the time-series control command 41 to be provided to the manipulator 3 by changing the relative relationship amount regardless of the details of the operation. Therefore, according to the present embodiment, it is possible to increase the versatility of the ability to execute the operation to be learned. As a result, it is possible to reduce the cost of teaching the manipulator 3 about the operation.

§ 2 Configuration Example
[Hardware Configuration]
<Control Device>

Figure 3:
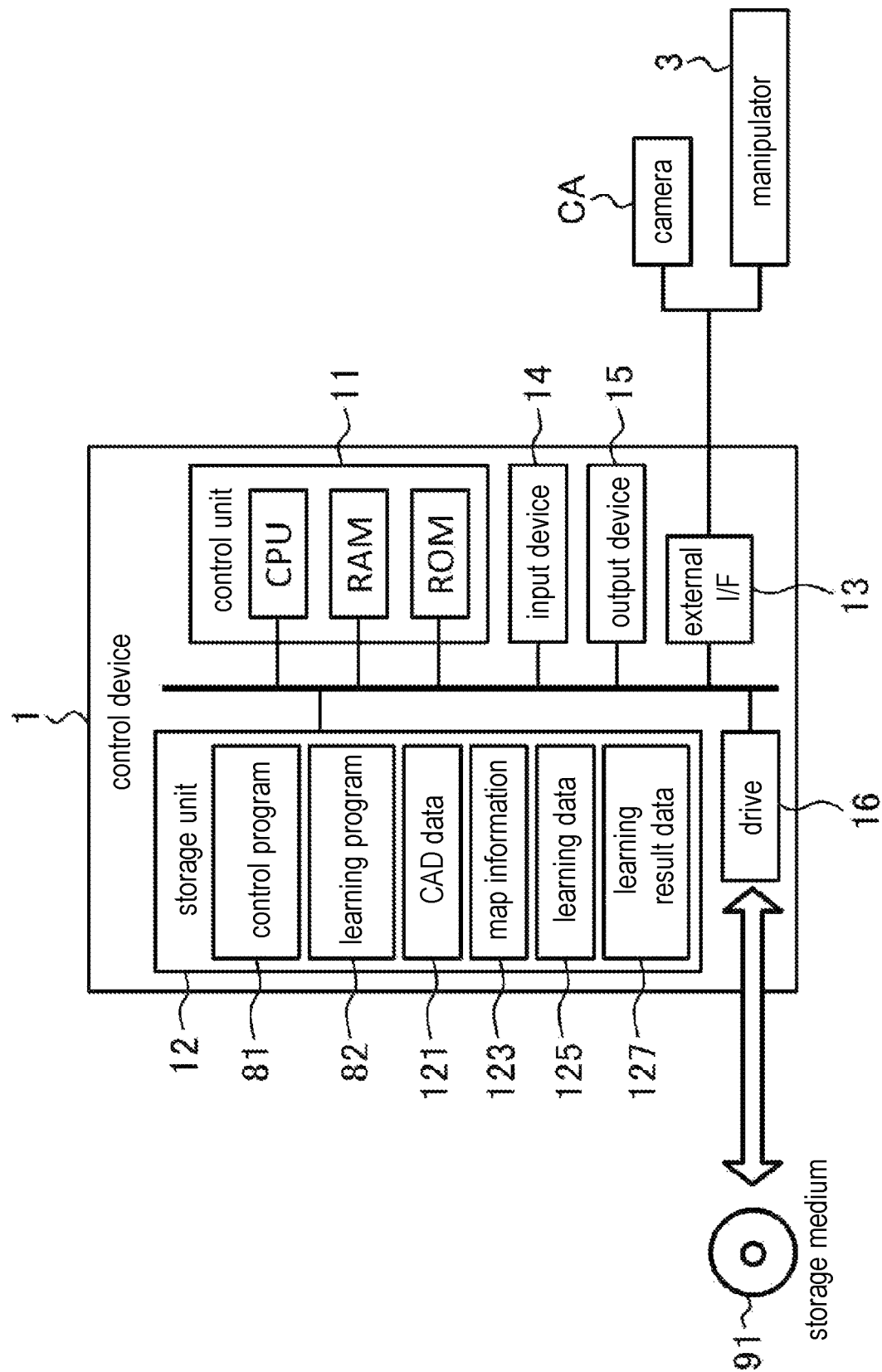
FIG. 3 schematically illustrates an example of the hardware configuration of a control device according to the embodiment.

Next, an example of the hardware configuration of the control device 1 according to the present embodiment will be described with reference to FIG. 3. FIG. 3 schematically illustrates an example of the hardware configuration of the control device 1 according to the present embodiment.

As illustrated in FIG. 3, the control device 1 according to the present embodiment is a computer in which a control unit 11, a storage unit 12, an external interface 13, an input device 14, an output device 15, and a drive 16 are electrically connected. In FIG. 3, the external interface is described as an "external I/F".

The control unit 11 includes a central processing unit (CPU) which is a hardware processor, a random access memory (RAM), a read only memory (ROM), and the like, and is configured to execute information processing on the basis of programs and various pieces of data. The storage unit 12 is an example of a memory, and is composed of, for example, a hard disk drive, a solid state drive, or the like. In the present embodiment, the storage unit 12 stores various pieces of information such as a control program 81, a learning program 82, computer-aided design (CAD) data 121, map information 123, learning data 125, and learning result data 127.

The control program 81 is a program for causing the control device 1 to execute information processing (FIGS. 9A and 9B) related to the control of the manipulator 3, which will be described later. The control program 81 includes a series of commands for this information processing. The learning program 82 is a program for causing the control device 1 to execute information processing (FIGS. 6 and 8) related to the construction of a learned learning model (a neural network 51 described later) used for determining the map information 123 and the control command 41 used for determining the series RS of relative relationship amounts. The learning program 82 includes a series of commands for this information processing. The CAD data 121 includes a model of each object present in the environment WS. The map information 123 and the learning result data 127 are generated as the execution result of the learning program 82. The map information 123 is an arrangement space that represents a set of relative relationship amounts between the plurality of objects, and indicates an arrangement space in which a plurality of nodes corresponding to the relative relationship amounts in the states that are candidates for the target state are arranged. The learning data 125 is used for machine learning of the learning model. The learning result data 127 is data for setting a learned learning model constructed by machine learning. The details will be described later.

The external interface 13 is, for example, a universal serial bus (USB) port, a dedicated port, or the like, and is an interface for connecting to an external device. The type and number of external interfaces 13 may be appropriately selected depending on the type and number of connected external devices. In the present embodiment, the control device 1 is connected to the manipulator 3 and the camera CA via the external interface 13.

The camera CA is appropriately arranged so as to observe each object (the gripper 37, the first workpiece W1, and the second workpiece W2) present in the environment WS in which the manipulator 3 operates. The type of the camera CA may not be particularly limited and may be appropriately determined depending on an embodiment. As the camera CA, for example, a known camera such as a digital camera or a video camera may be used. The control device 1 can acquire the image data 40 from the camera CA via the external interface 13. The image data 40 is an example of the "observation data" of the present invention. In the examples of FIGS. 1 and 3, the camera CA is provided separately from the manipulator 3. However, the configuration of the camera CA may not be limited to such an example. The camera CA may be provided integrally with the manipulator 3.

The input device 14 is, for example, a device for inputting information such as a mouse, a keyboard, or the like. The output device 15 is, for example, a device for outputting information such as a display, a speaker, or the like. An operator can operate the control device 1 using the input device 14 and the output device 15.

The drive 16 is, for example, a CD drive, a DVD drive, or the like, and is a drive device for reading a program stored in the storage medium 91. The type of the drive 16 may be appropriately selected depending on the type of the storage medium 91. At least one of the control program 81, the learning program 82, the CAD data 121, and the learning data 125 may be stored in the storage medium 91.

The storage medium 91 is a medium that accumulates information such as a program recorded therein by an electrical, magnetical, optical, mechanical, or chemical action so that a device, a machine, or the like in addition to a computer can read the information of the program or the like. The control device 1 may acquire at least one of the control program 81, the learning program 82, the CAD data 121, and the learning data 125 from the storage medium 91.

Here, FIG. 3 illustrates a disc-type storage medium such as a CD or a DVD as an example of the storage medium 91. However, the type of the storage medium 91 may not be limited to the disc-type medium, and may be other than the disc-type medium. Examples of storage media other than the disk-type medium include semiconductor memories such as flash memories.

Regarding the specific hardware configuration of the control device 1, the components may be omitted, replaced, or added as appropriate depending on an embodiment. For example, the control unit 11 may include a plurality of hardware processors. The hardware processor may be composed of a microprocessor, a field-programmable gate array (FPGA), a digital signal processor (DSP), or the like. The storage unit 12 may be composed of a RAM and a ROM included in the control unit 11. At least one of the external interface 13, the input device 14, the output device 15, and the drive 16 may be omitted. The control device 1 may be composed of a plurality of computers. In this case, the hardware configurations of the computers may or may not match. Further, the control device 1 may be a general-purpose information processing device such as a personal computer (PC), a controller such as a programmable logic controller (PLC), or the like, in addition to an information processing device designed exclusively for a provided service.

<Manipulator>

Figure 4:
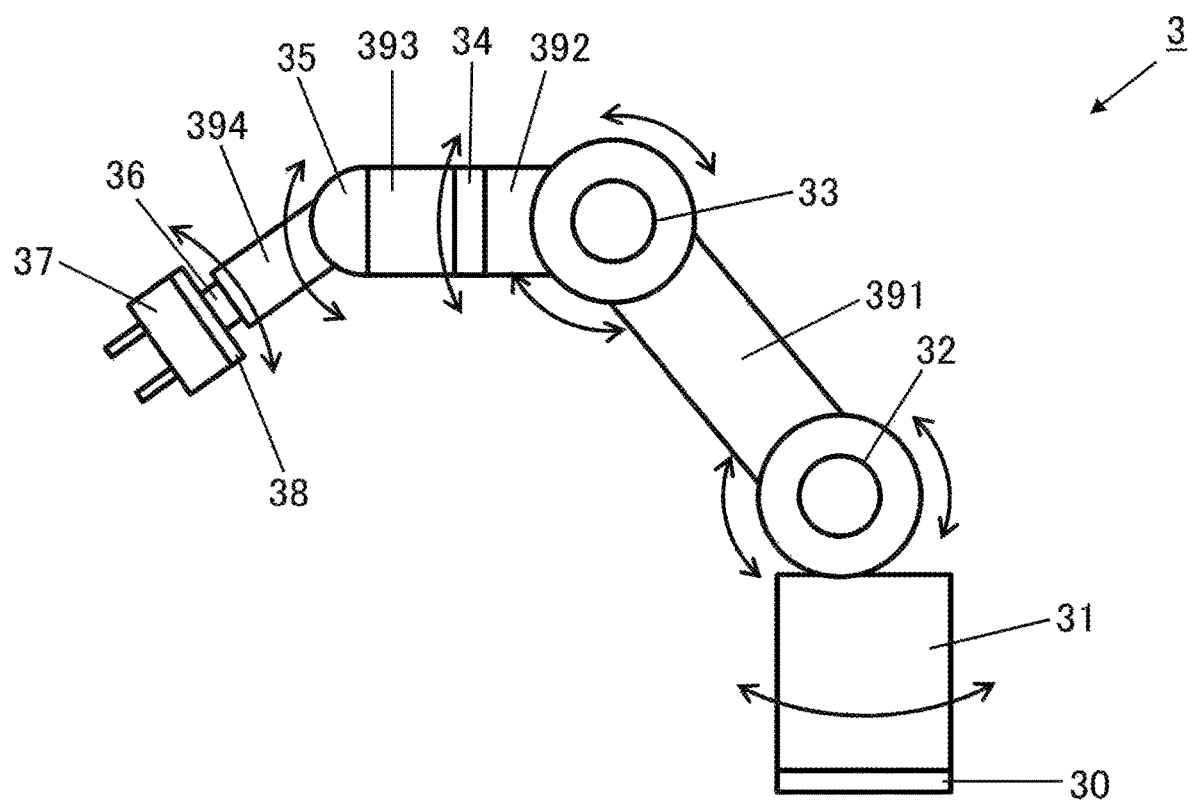
FIG. 4 schematically illustrates an example of a robot device according to an embodiment.

Next, an example of the hardware configuration of the manipulator 3 according to the present embodiment will be described with reference to FIG. 4. FIG. 4 schematically illustrates an example of the hardware configuration of the manipulator 3 according to the present embodiment.

The manipulator 3 according to the present embodiment is a 6-axis vertical articulated industrial robot, and includes a pedestal portion 30 and six joint portions 31 to 36. Each of the joint portions 31 to 36 has a built-in servomotor (not illustrated) so that the joint portions 31 to 36 can rotate around each axis. The first joint portion 31 is connected to the pedestal portion 30, and the portion on the distal end side is rotated around the shaft of the pedestal. The second joint portion 32 is connected to the first joint portion 31 and the portion on the distal end side is rotated in the front-rear direction. The third joint portion 33 is connected to the second joint portion 32 via a link 391, and the portion on the distal end side is rotated in the vertical direction. The fourth joint portion 34 is connected to the third joint portion 33 via a link 392, and the portion on the distal end side is rotated around the shaft of the link 392. The fifth joint portion 35 is connected to the fourth joint portion 34 via a link 393, and the portion on the distal end side is rotated in the vertical direction. The sixth joint portion 36 is connected to the fifth joint portion 35 via a link 394, and the portion on the distal end side is rotated around the shaft of the link 394. The gripper 37 is attached to the distal end side of the sixth joint portion 36 together with a force sensor 38.

An encoder (not illustrated) is further built in the joint portions 31 to 36. The encoder is configured to be able to measure the angle (control amount) of each of the joint portions 31 to 36. The measurement data of the encoder is used for controlling the angle of each of the joint portions 31 to 36. Further, the force sensor 38 is configured to detect a force and a moment in the 6-axis direction acting on the gripper 37. The measurement data of the force sensor 38 may be used for adjusting the grasping force of the gripper 37 and detecting whether an abnormal force is acting on the gripper 37.

The hardware configuration of the manipulator 3 may not be limited to such an example. Regarding the specific hardware configuration of the manipulator 3, the components may be omitted, replaced, and added as appropriate depending on an embodiment. For example, the manipulator 3 may include a sensor other than the encoder and the force sensor 38 in order to observe the control amount or other attributes of the manipulator 3. The number of axes of the manipulator 3 may not be limited to six. Further, a known industrial robot may be adopted as the manipulator 3.

[Software Configuration]

(A) Control Process

Figure 5A:
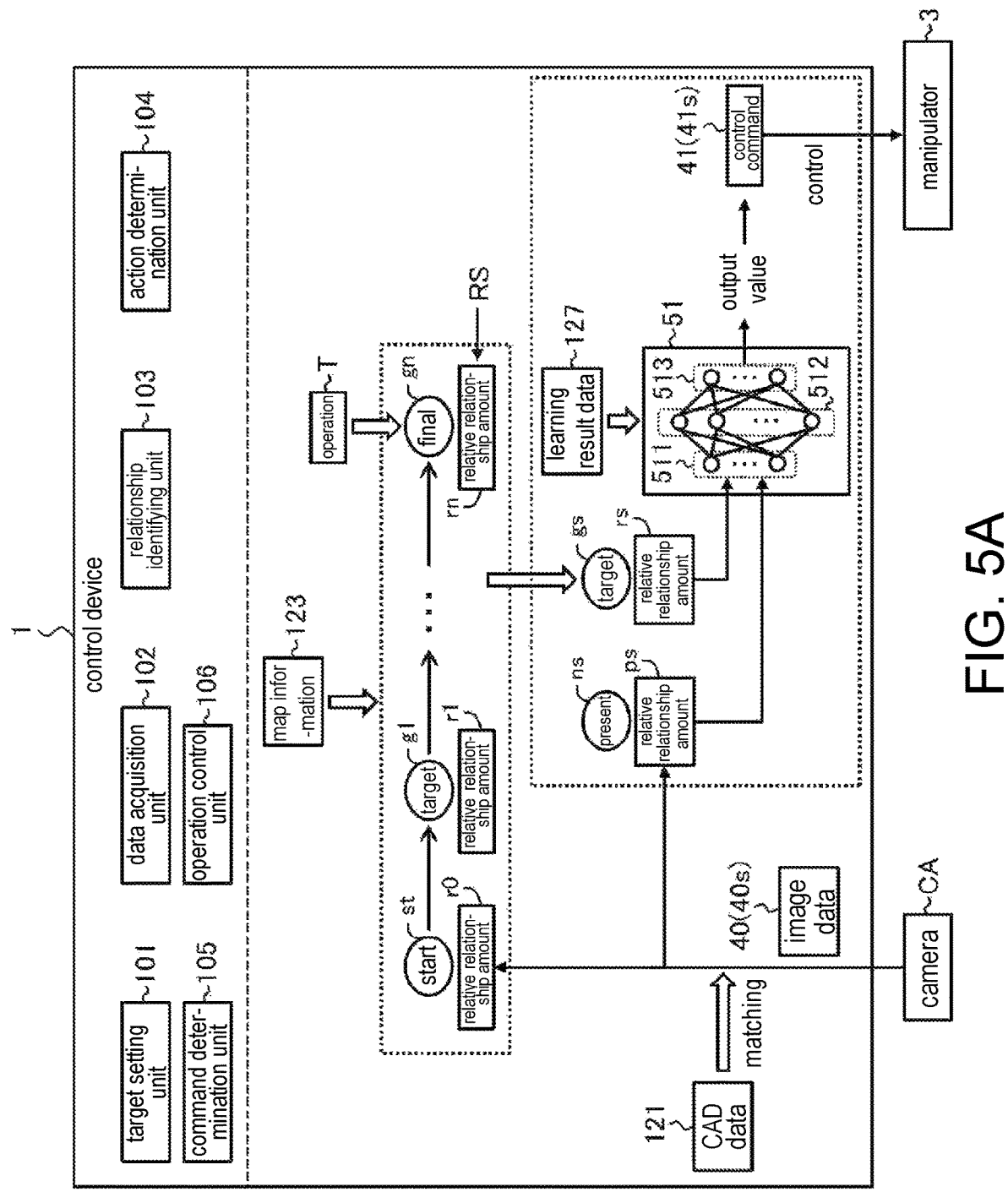
FIG. 5A schematically illustrates an example of the software configuration related to a control process of a control device according to an embodiment.

Next, an example of the software configuration related to the control process of the control device 1 according to the present embodiment will be described with reference to FIG. 5A. FIG. 5A schematically illustrates an example of the software configuration related to the control processing of the control device 1 according to the present embodiment.

The control unit 11 of the control device 1 loads the control program 81 stored in the storage unit 12 onto the RAM. The control unit 11 interprets and executes the control program 81 loaded onto the RAM with the aid of the CPU to control each component. As a result, as illustrated in FIG. 5A, the control device 1 according to the present embodiment operates as a computer that includes a target setting unit 101, a data acquisition unit 102, a relationship identifying unit 103, an action determination unit 104, a command determination unit 105, and an operation control unit 106 as software modules. That is, in the present embodiment, the software modules of the control device 1 related to the control process are realized by the control unit 11 (CPU).

The target setting unit 101 sets the relative relationship amount rn between a plurality of objects serving as the final target gn. The relative relationship amount rn of the final target gn is set according to the given operation T, as illustrated in FIG. 2F. The relative relationship amount rn of the final target gn may be provided by a simulator such as CAD, or may be provided by the operator's designation.

The data acquisition unit 102 repeatedly acquires observation data from sensors that observe the plurality of objects present in the environment WS. The relationship identifying unit 103 calculates the relative relationship amount between the plurality of objects from the acquired observation data. In the present embodiment, the relative relationship amount includes the relative coordinate between the plurality of objects. Further, the sensor includes the camera CA, and the observation data includes the image data 40 obtained by the camera CA. Therefore, in the present embodiment, the data acquisition unit 102 repeatedly acquires the image data 40 as observation data from the camera CA. The relationship identifying unit 103 calculates the relative relationship amount including the relative coordinate between the plurality of objects from the acquired image data 40.

A method of calculating the relative coordinate from the image data 40 may not be particularly limited, and may be appropriately selected depending on an embodiment. In the present embodiment, the relationship identifying unit 103 calculates the relative coordinate between the objects using the model of each object. Specifically, the relationship identifying unit 103 matches the model of each object indicated by the CAD data 121 with respect to the image data 40 obtained by the camera CA. The relationship identifying unit 103 calculates the relative coordinate between the plurality of objects on the basis of the result of this matching.

The action determination unit 104 determines the series RS of relative relationship amounts in the state of the target (g1 or the like) of the plurality of objects until the relative relationship amount rn of the set final target gn is realized from the relative relationship amount r0 at the starting time point st of the operation control. In the present embodiment, the relative relationship amount r0 at the starting time point st is calculated from the image data 40 acquired at the time point immediately before starting the control of the operation of the manipulator 3 in relation to the execution of the operation. Further, in the present embodiment, the action determination unit 104 retains the map information 123. This map information 123 is used for determining the series RS of relative relationship amounts. Specifically, the action determination unit 104 searches for a route from a node corresponding to the relative relationship amount r0 in the state of the starting time point st to a node corresponding to the relative relationship amount rn in the state of the final target gn by selecting a waypoint node from a plurality of nodes in the arrangement space indicated by the map information 123. Then, the action determination unit 104 generates the series RS of relative relationship amounts by the relative relationship amount (r1 and the like) corresponding to the node included in the searched route.

The command determination unit 105 repeatedly determines the control command 41 to be provided to the manipulator 3 so that the relative relationship amount in the current state calculated from the latest image data 40 acquired from the camera CA is changed to the relative relationship amount in the next transition target of the current state, included in the series RS of relative relationship amounts until the relative relationship amount rn of the final target gn is realized. In the example of FIG. 5A, a scene in which the current state ns transitions to the state of the next target gs is illustrated as the s-th processing of this repetition. In this scene, the command determination unit 105 determines the control command 41s so that the relative relationship amount ps in the current state ns calculated from the latest image data 40s is changed to the relative relationship amount rs in the next transition target gs.

The method for determining the control command 41 may not be particularly limited, and may be appropriately selected depending on an embodiment. In the present embodiment, the command determination unit 105 includes a learned neural network 51 by retaining the learning result data 127. The learned neural network 51 is an example of a "first learned learning model" of the present invention. The command determination unit 105 determines the control command 41 using the learned neural network 51. Specifically, the command determination unit 105 inputs the relative relationship amount ps in the current state ns and the relative relationship amount rs in the state of the next transition target gs to the neural network 51, and executes the arithmetic processing of the neural network 51. As a result, the command determination unit 105 acquires the output value output from the neural network 51 as a result of determining the control command 41s.

The operation control unit 106 outputs the determined control command 41 to the manipulator 3. The operation control unit 106 is an example of an "output unit" of the present invention. In the present embodiment, the operation control unit 106 controls the operation of the manipulator 3 on the basis of the control command 41 as the output process of the control command 41. By repeating the processing of the command determination unit 105 and the operation control unit 106 until the relative relationship amount rn of the final target gn is realized, the manipulator 3 is controlled so as to execute a series of operations related to execution of the given operation T, for example, as illustrated in FIGS. 2A to 2F.

(Neural Network)

Next, the neural network 51, which is an example of the learning model, will be described. As illustrated in FIG. 5A, the neural network 51 according to the present embodiment is a multi-layered neural network used for so-called deep learning, and includes an input layer 511, an intermediate (hidden) layer 512, and an output layer 513 in order from the input side. In the example of FIG. 5A, the neural network 51 includes one intermediate layer 512, the output of the input layer 511 is input to the intermediate layer 512, and the output of the intermediate layer 512 is input to the output layer 513. However, the number of intermediate layers 512 may not be limited to such an example. The neural network 51 may include two or more intermediate layers.

The number of neurons included in each of the layers 511 to 513 may be appropriately selected depending on an embodiment. Neurons in adjacent layers are appropriately coupled, and a weight (coupling load) is set for each coupling. A threshold is set for each neuron, and basically, the output of each neuron is determined depending on whether the sum of the products of each input and each weight exceeds the threshold. The weight of the coupling between neurons included in each of the layers 511 to 513 and the threshold of each neuron are examples of arithmetic parameters of the learning model.

The command determination unit 105 inputs the relative relationship amount ps in the current state ns and the relative relationship amount rs in the state of the next transition target gs to the input layer 511, and determines the firing of each neuron included in each of the layers 511 to 513 in order from the input side as the arithmetic processing of the neural network 51. As a result, the command determination unit 105 acquires the output value output from the output layer 513 as a result of determining the control command 41s.

In the present embodiment, the configuration of such a learned neural network 51 (for example, the number of layers of the neural network, the number of neurons in each layer, the coupling relationship between neurons, and the transfer function of each neuron), and information indicating the arithmetic parameters (for example, the weight of the coupling between neurons and the threshold of each neuron) are included in the learning result data 127. The command determination unit 105 sets the learned neural network 51 used for the process of determining the control command 41 from the current state and the next transition target with reference to the learning result data 127.

(B) Learning Process

Figure 5B:
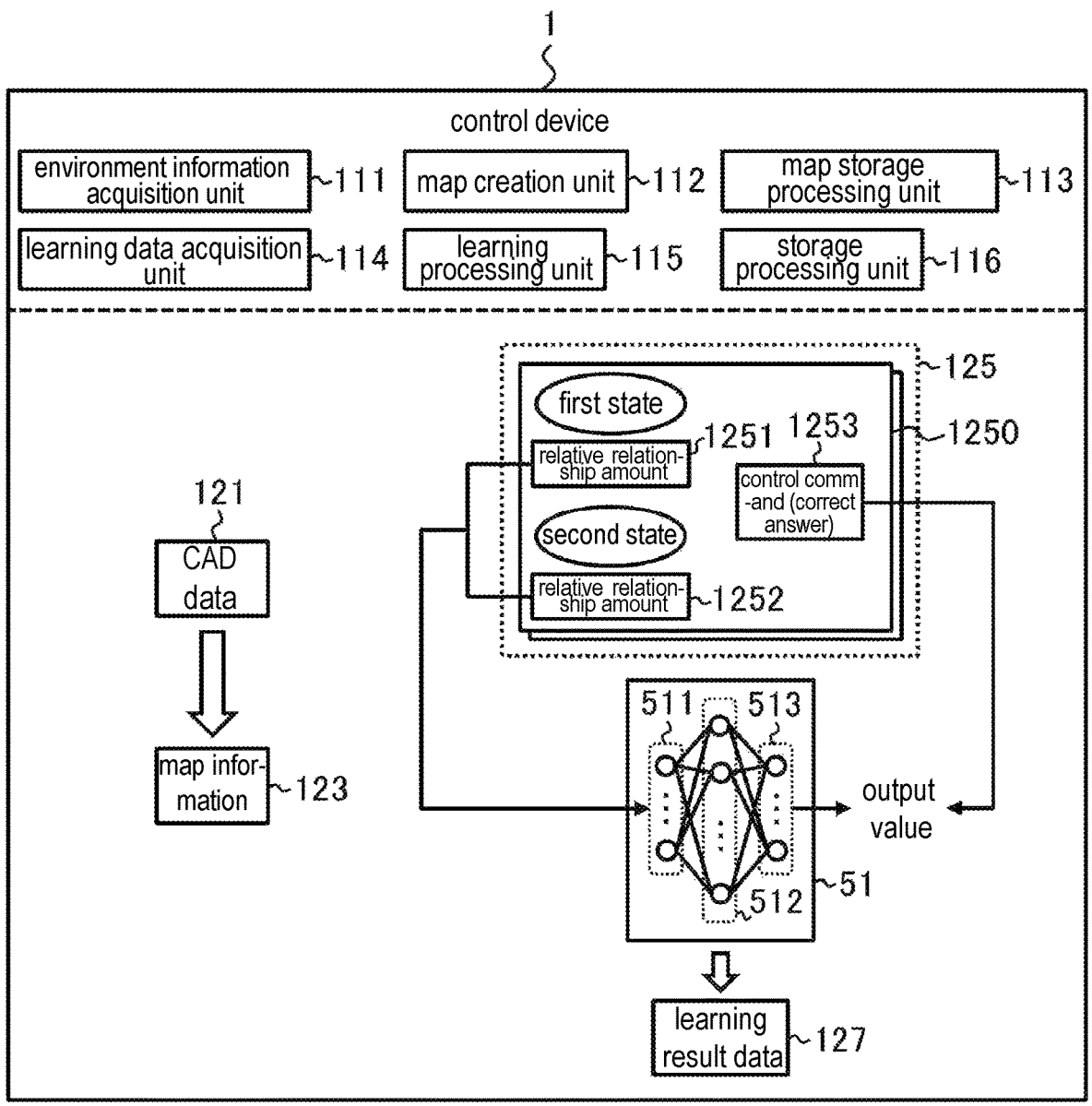
FIG. 5B schematically illustrates an example of the software configuration related to a learning process of a control device according to an embodiment.

Next, an example of the software configuration related to the learning process of the control device 1 according to the present embodiment will be described with reference to FIG. 5B. FIG. 5B schematically illustrates an example of the software configuration related to the learning process of the control device 1 according to the present embodiment.

The control unit 11 of the control device 1 loads the learning program 82 stored in the storage unit 12 onto the RAM. Then, the control unit 11 interprets and executes the learning program 82 loaded onto the RAM with the aid of the CPU to control each component. As a result, as illustrated in FIG. 5B, the control device 1 according to the present embodiment operates as a computer that includes an environment information acquisition unit 111, a map creation unit 112, a map storage processing unit 113, a learning data acquisition unit 114, a learning processing unit 115, and a storage processing unit 116 as software modules. That is, in the present embodiment, the software modules of the control device 1 related to the learning process are realized by the control unit 11 (CPU).

The environment information acquisition unit 111 acquires environment information (for example, CAD data 121) regarding each object present in the environment WS where the operation T is executed. The map creation unit 112 creates map information 123 indicating the arrangement space using the acquired environment information. The map storage processing unit 113 stores the created map information 123 in a predetermined storage area. The predetermined storage area may be, for example, a RAM in the control unit 11, the storage unit 12, an external storage device, a storage medium, or a combination thereof.

The storage medium may be, for example, a CD, a DVD, or the like, and the control unit 11 may store the map information 123 in the storage medium via the drive 16. The external storage device may be, for example, a data server such as a network attached storage (NAS). In this case, the control device 1 may further include a communication interface such as a wired local area network (WAN) module or a wireless LAN module, and the control unit 11 uses the communication interface to store the map information 123 in the data server via a network. Further, the external storage device may be, for example, an externally attached storage device connected to the control device 1.

The learning data acquisition unit 114 acquires the learning data 125 used for machine learning of the neural network 51. The learning data 125 includes, for example, a plurality of learning data sets 1250, each composed of a combination of a relative relationship amount 1251 in a first state and a relative relationship amount 1252 in a second state and a control command 1253 for controlling the operation of the manipulator 3 so that the relative relationship amount 1251 is changed to the relative relationship amount 1252. The first state corresponds to the "current state" for training. The second state corresponds to the "next transition state" for training. Therefore, the relative relationship amount 1251 may be referred to as a "first relative relationship amount", and the relative relationship amount 1252 may be referred to as a "second relative relationship amount". The relative relationship amount 1251 in the first state and the relative relationship amount 1252 in the second state are used as training data (input data). On the other hand, the control command 1253 is used as teacher data (correct answer data).

The learning processing unit 115 performs machine learning of the neural network 51 using the acquired learning data 125. That is, the learning processing unit 115 trains the neural network 51 by machine learning so as to determine the control command (the control command 1253) for controlling the operation of the manipulator 3 so that the relative relationship amount between the objects is changed from the relative relationship amount 1251 to the relative relationship amount 1252 with respect to the input of the relative relationship amount 1251 and the relative relationship amount 1252. As a result, the learned neural network 51 is constructed. The storage processing unit 116 stores information on the constructed learned neural network 51 in a predetermined storage area.

(C) Others

The software modules of the control device 1 will be described in detail in an operation example described later. In the present embodiment, an example in which all the software modules of the control device 1 are realized by a general-purpose CPU is described. However, some or all of the software modules may be implemented by one or more dedicated processors. Further, regarding the software configuration of the control device 1, the software modules may be omitted, replaced, or added as appropriate depending on an embodiment.

§ 3 Operation Example

Next, an operation example of the control device 1 will be described. The control device 1 according to the present embodiment executes two processes including a process of creating the map information 123 and a process of constructing the learned neural network 51 as the learning process. Further, the control device 1 according to the present embodiment executes a process for controlling the operation of the manipulator 3. An example of each processing procedure will be described below. However, the processing procedures described below are only an example, and each step may be changed as much as possible. Further, regarding the processing procedures described below, steps may be omitted, replaced, and added as appropriate depending on an embodiment.

(3-1) Creation of Map Information

Figure 6:
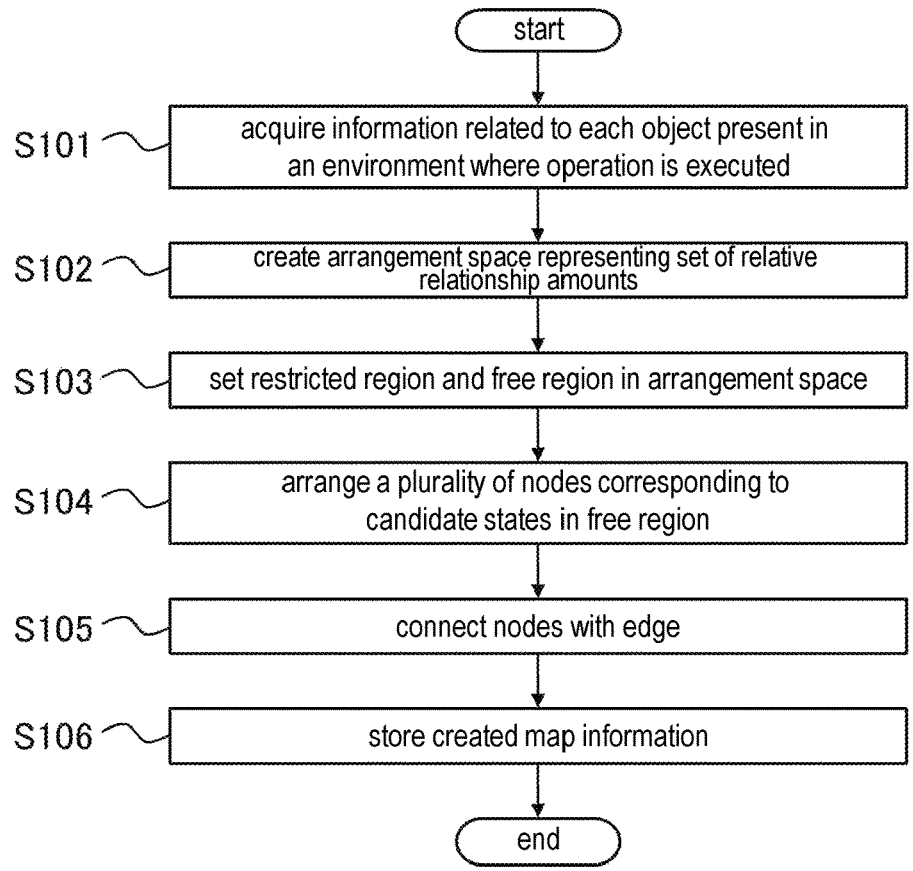
FIG. 6 illustrates an example of a processing procedure for creating map information by the control device according to the embodiment.
Figure 7A:
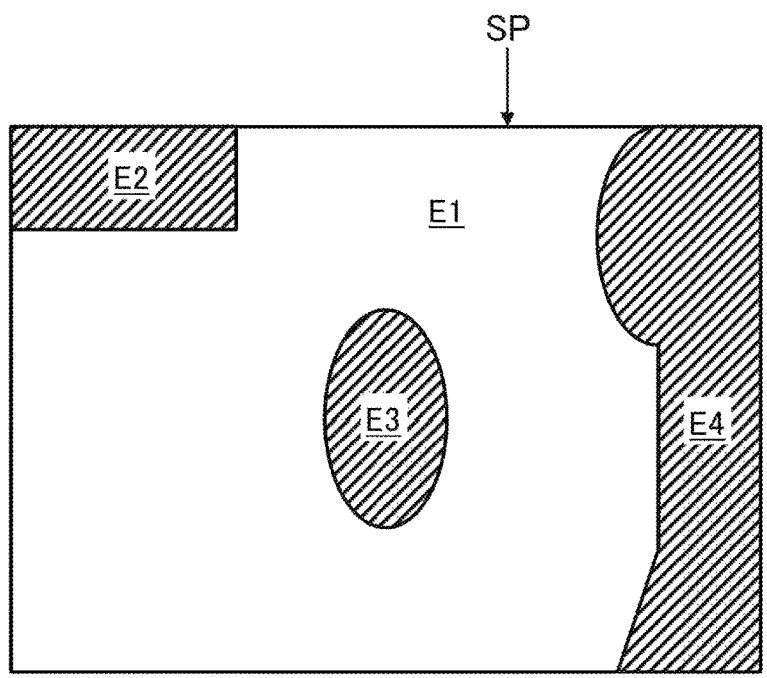
FIG. 7A schematically illustrates an example of a process of creating map information according to an embodiment.
Figure 7B:
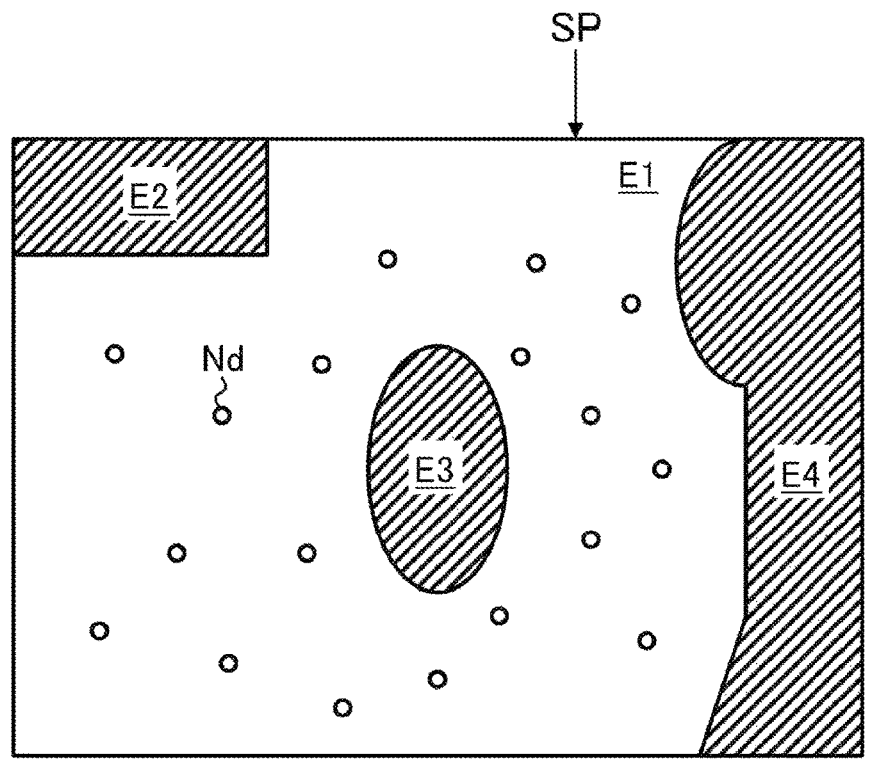
FIG. 7B schematically illustrates an example of a process of creating map information according to an embodiment.
Figure 7C:
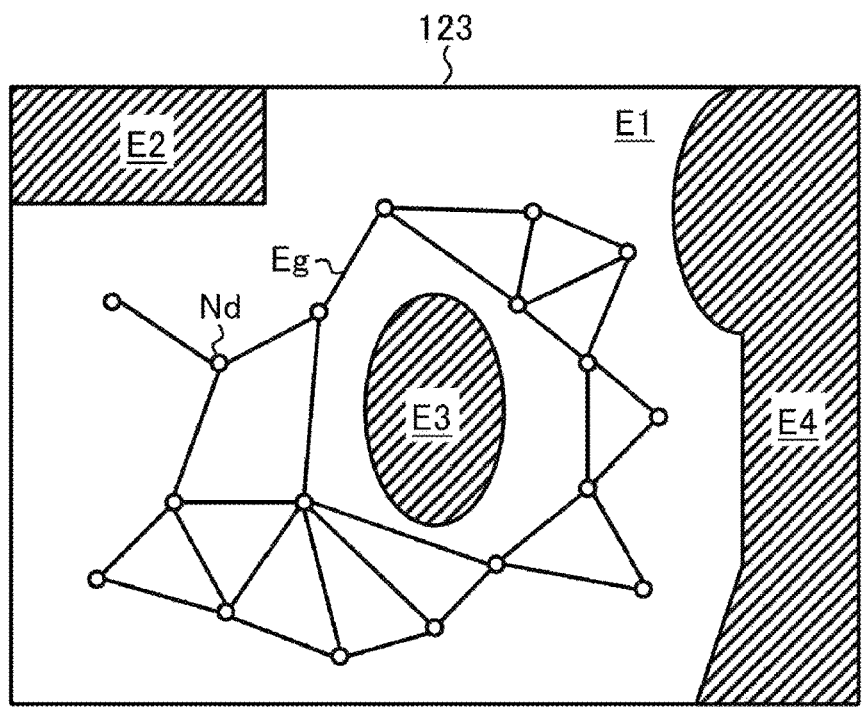
FIG. 7C schematically illustrates an example of a process of creating map information according to an embodiment.

First, an example of a processing procedure related to the creation of the map information 123 will be described with reference to FIGS. 6 and 7A to 7C. FIG. 6 is a flowchart illustrating an example of a processing procedure for creating the map information 123 by the control device 1 according to the present embodiment. Further, FIGS. 7A to 7C schematically illustrate an example of the process of creating the map information 123.

(Step S101)

In step S101, the control unit 11 operates as the environment information acquisition unit 111 and acquires the environment information about each object present in the environment WS where the operation T is executed. The format and type of the environment information may not be particularly limited as long as it can simulate the relative relationship amount between the objects, and may be appropriately selected depending on an embodiment. The control unit 11 may acquire CAD data 121 as the environment information, for example. The CAD data 121 includes configuration information indicating a physical configuration such as a model (for example, a 3D model) of each object. The CAD data 121 may be generated by known software. When the environment information is acquired, the control unit 11 proceeds to the next step S102.

(Steps S102 and S103)

In step S102 and step S103, the control unit 11 operates as the map creation unit 112 to create and set the arrangement space. Specifically, in step S102, the control unit 11 uses the acquired environment information to create an arrangement space that represents a set of relative relationship amounts between a plurality of objects (in the present embodiment, the gripper 37, the first workpiece W1, and the second workpiece W2). In the next step S103, a free region and a restricted region are set in the created arrangement space.

FIG. 7A schematically illustrates an example of the created arrangement space SP. In FIG. 7A, the arrangement space SP is represented in two dimensions for convenience of explanation. However, since the dimension of the arrangement space SP depends on the relative relationship amount, the dimension is not necessarily two-dimensional. The same applies to FIGS. 7B and 7C described later. The nodes (points) belonging to the arrangement space SP correspond to the relative relationship amount between a plurality of objects.

Since each object has a physical configuration, a feasible relative relationship amount and an infeasible relative relationship amount are present as the relative relationship amount of each object. For example, as illustrated in FIG. 2A and the like, a state in which the gripper 37, the first workpiece W1 and the second workpiece W2 are separated within a movable range is a state that can be taken as a relative relationship between the objects, and the relative relationship amount in this state is feasible. On the other hand, for example, a state in which one of the first workpiece W1 and the second workpiece W2 penetrates the other even if they cannot penetrate each other is a state that cannot be taken as a relative relationship between the objects, and the relative relationship amount in this state is not feasible. Further, for example, the range and angle in which the gripper 37 can move are restricted depending on the configuration of the manipulator 3. Therefore, a state in which the gripper 37 is moving in a range in which it cannot move in relation to other objects is a state that cannot be taken as a relative relationship between the objects, and the relative relationship amount in this state is not feasible.

Therefore, the control unit 11 refers to the CAD data 121 after creating the arrangement space SP that represents the set of relative relationship amounts, and sets the free region to which the node corresponding to the feasible relative relationship amount belongs and the restricted region to which the node corresponding to the infeasible relative relationship amount belongs according to the physical configuration of each object. In the example of FIG. 7A, a region E1 is the free region, and the other regions E2 to E4 are restricted regions. When the setting of the free region and the restricted region is completed, the control unit 11 proceeds to the next step S104.

(Step S104)

In step S104, the control unit 11 operates as the map creation unit 112, and arranges a plurality of nodes corresponding to the relative relationship amounts in the respective states that can be taken as the relative relationship between the objects in the free region of the arrangement space. Each node corresponds to, for example, a relative relationship amount in a state that is a candidate for the state of a target (g1, and the like).

FIG. 7B schematically illustrates a scene in which each node Nd is arranged in the free region (the region E1) of the arrangement space SP. Each node Nd corresponds to one state of the relative relationship between a plurality of objects, and indicates the relative relationship amount in the one state (in the present embodiment, the relative coordinates rc1 to rc3). Each node Nd may be set by a known method such as random sampling. Further, each node Nd may be set by the operator's designation via the input device 14, for example.

The control unit 11 may set a node (starting point) corresponding to the candidate of the starting time point st and a node (ending point) corresponding to the candidate of the final target gn, and may appropriately search for a route from the set starting point to the ending point. A known method may be used for this route search. Further, this route search may be performed by simulation or may be performed by driving the manipulator 3. Then, in this route search, the control unit 11 may extract nodes having a high transition probability, for example, nodes whose appearance frequency is equal to or higher than a threshold, and may set the extracted nodes as the node Nd.

Each node Nd to be set may include nodes corresponding to the candidates for each of the starting time point st and the final target gn. When the setting of each node Nd is completed, the control unit 11 proceeds to the next step S105.

(Step S105)

In step S105, the control unit 11 operates as the map creation unit 112 and connects nodes by an edge.

FIG. 7C schematically illustrates a scene in which the nodes Nd are connected by an edge Eg. The edge Eg connects between two nodes Nd and indicates that it is possible to transition from the state corresponding to one node Nd to the state corresponding to the other node Nd. Therefore, the edge Eg is set so as not to enter the restricted region (the regions E2 to E4 in the example of FIG. 7C).

The method of determining the combination of two nodes Nd for setting the edge Eg may be appropriately selected depending on an embodiment. For example, the combination of two nodes Nd for setting the edge Eg may be determined on the basis of a known method such as the nearest neighbor method. Further, for example, the combination of the two nodes Nd for setting the edge Eg may be determined by the designation of the operator via the input device 14. As a result, when the edge Eg is set, the creation of the map information 123 is completed. That is, in the present embodiment, the map information 123 has a graph structure composed of the nodes Nd and the edge Eg. When the creation of the map information 123 is completed, the control unit 11 proceeds to the next step S106.

(Step S106)

In step S106, the control unit 11 operates as the map storage processing unit 113, and stores the created map information 123 in a predetermined storage area. The predetermined storage area may be, for example, a RAM in the control unit 11, the storage unit 12, an external storage device, a storage medium, or a combination thereof. In this way, the control unit 11 ends the series of processes related to the creation of the map information 123.

(3-2) Machine Learning of Neural Network

Figure 8:
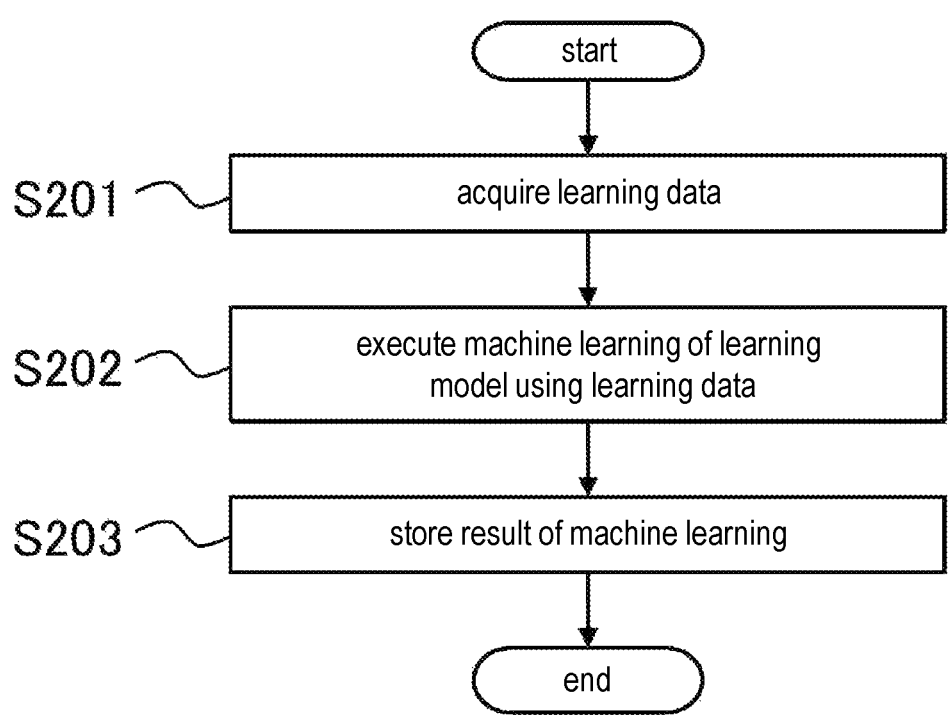
FIG. 8 illustrates an example of a processing procedure related to machine learning of a learning model by a control device according to an embodiment.

Next, an example of a processing procedure related to the construction of the learned neural network 51 used for the process of determining of the control command 41 will be described with reference to FIG. 8. FIG. 8 is a flowchart illustrating an example of a processing procedure related to the construction of the learned neural network 51 by the control device 1 according to the present embodiment.

(Step S201)

In step S201, the control unit 11 operates as the learning data acquisition unit 114 and acquires the learning data 125 used for machine learning of the neural network 51. In the present embodiment, the learning data 125 includes a plurality of learning data sets 1250 each composed of a combination of the relative relationship amount 1251, the relative relationship amount 1252, and the control command 1253.

The method for acquiring the learning data sets 1250 may not be particularly limited, and may be appropriately selected depending on an embodiment. For example, a simulator-based virtual environment or a real environment is prepared, and under the prepared environment, a combination of a first state and a second state is provided under various conditions, and the manipulator 3 is driven so that the relative relationship between a plurality of objects transitions from the first state to the second state. Then, the control command 1253 when the manipulator 3 was driven so that the first state appropriately transitioned to the second state is combined with the relative relationship amount 1251 in the first state and the relative relationship amount 1252 in the second state. As a result, the learning data sets 1250 can be generated.

The learning data sets 1250 may be automatically generated by the operation of a computer, or may be manually generated by the operation of an operator via the input device 14. Further, the learning data sets 1250 may be generated by the control device 1 or by a computer other than the control device 1. When the control device 1 generates the learning data sets 1250, the control unit 11 executes the series of processes automatically or manually by the operation of the operator to acquire the learning data 125 including the plurality of learning data sets 1250. On the other hand, when the learning data sets 1250 is generated by another computer, the control unit 11 acquires the learning data 125 including the plurality of learning data sets 1250 generated by the other computer via, for example, a network, a storage medium 91, and the like.

The number of learning data sets 1250 to be acquired may not be particularly limited, and may be appropriately selected depending on an embodiment. When the learning data 125 is acquired, the control unit 11 proceeds to the next step S202.

(Step S202)

In step S202, the control unit 11 operates as the learning processing unit 115, and uses the acquired learning data 125 to perform machine learning of the neural network 51.

Specifically, first, the control unit 11 prepares the neural network 51 to be processed. In the configuration of the prepared neural network 51, the initial value of the weight of the coupling between neurons and the initial value of the threshold of each neuron may be provided by a template or by input of an operator. Further, when performing re-learning, the control unit 11 may prepare the neural network 51 on the basis of the learning result data obtained by performing machine learning in the past.

Subsequently, the control unit 11 executes the learning process of the neural network 51 using the relative relationship amount 1251 and the relative relationship amount 1252 included in the learning data sets 1250 acquired in step S201 as input data and using the corresponding control command 1253 as teacher data. A stochastic gradient descent method or the like may be used for this learning process.

For example, in the first step, the control unit 11 inputs the relative relationship amount 1251 and the relative relationship amount 1252 to the input layer 511 for each of the learning data sets 1250, and performs the firing judgment of each neuron included in each layer (511 to 513) in order from the input side. As a result, the control unit 11 acquires, from the output layer 513, an output value corresponding to the result of determining the control command to be provided to the manipulator 3 in order to change the relative relationship amount 1251 to the relative relationship amount 1252. In the second step, the control unit 11 calculates an error between the acquired output value and the corresponding control command 1253. In the third step, the control unit 11 calculates the error of the coupling weight between neurons and the error of the threshold of each neuron using the error of the output value calculated by the error back propagation method. In the fourth step, the control unit 11 updates the coupling weight between neurons and the threshold of each neuron on the basis of the calculated errors.

By repeating the first to fourth steps, when the relative relationship amount 1251 and the relative relationship amount 1252 are input to the input layer 511 for each of the learning data sets 1250, the control unit 11 adjusts the value of the arithmetic parameter of the neural network 51 so that the output value that matches the corresponding control command 1253 is output from the output layer 513. For example, the control unit 11 repeatedly adjusts the value of the arithmetic parameter according to the first to fourth steps for each of the learning data sets 1250 until the sum of the errors between the output value obtained from the output layer 513 and the control command 1253 is equal to or less than the threshold. The threshold may be appropriately set according to the embodiment. As a result, the control unit 11 can construct a learned neural network 51 trained so that an output value that matches the corresponding control command 1253 is output with respect to the inputs of the relative relationship amount 1251 and the relative relationship amount 1252. When the machine learning using the learning data 125 is completed, the control unit 11 proceeds to the next step S203.

(Step S203)

In step S203, the control unit 11 operates as the storage processing unit 116 and stores the information about the learned neural network 51 in a predetermined storage area. In the present embodiment, the control unit 11 generates information indicating the configuration and arithmetic parameters of the learned neural network 51 constructed by the machine learning in step S202 as the learning result data 127. Then, the control unit 11 stores the generated learning result data 127 in a predetermined storage area. The predetermined storage area may be, for example, a RAM in the control unit 11, the storage unit 12, an external storage device, a storage medium, or a combination thereof. As described above, the control unit 11 ends the series of processes related to the construction of the learned neural network 51.

(3-3) Control Process

Figure 9A:
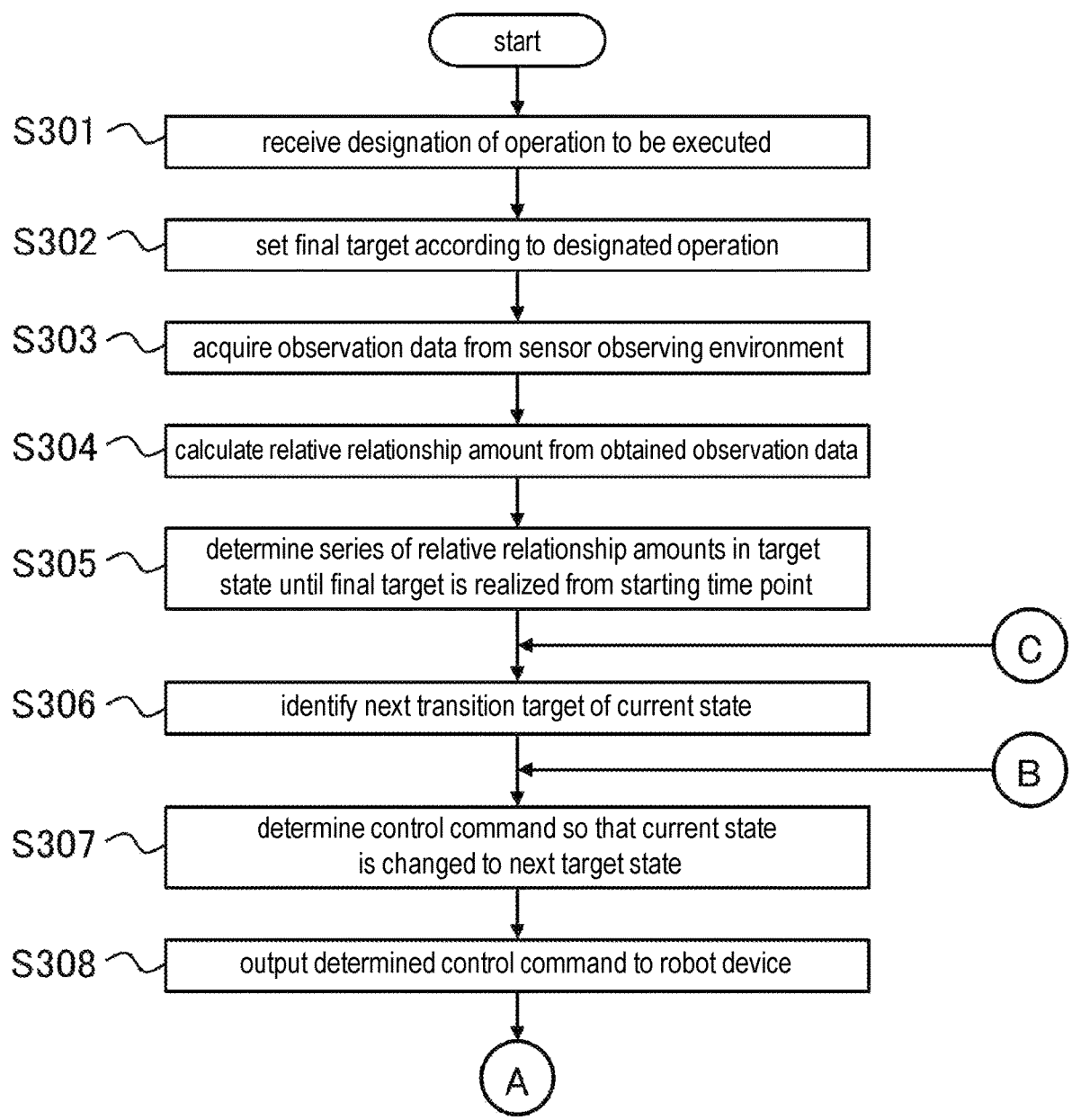
FIG. 9A illustrates an example of a processing procedure related to control of a robot device by the control device according to the embodiment.
Figure 9B:
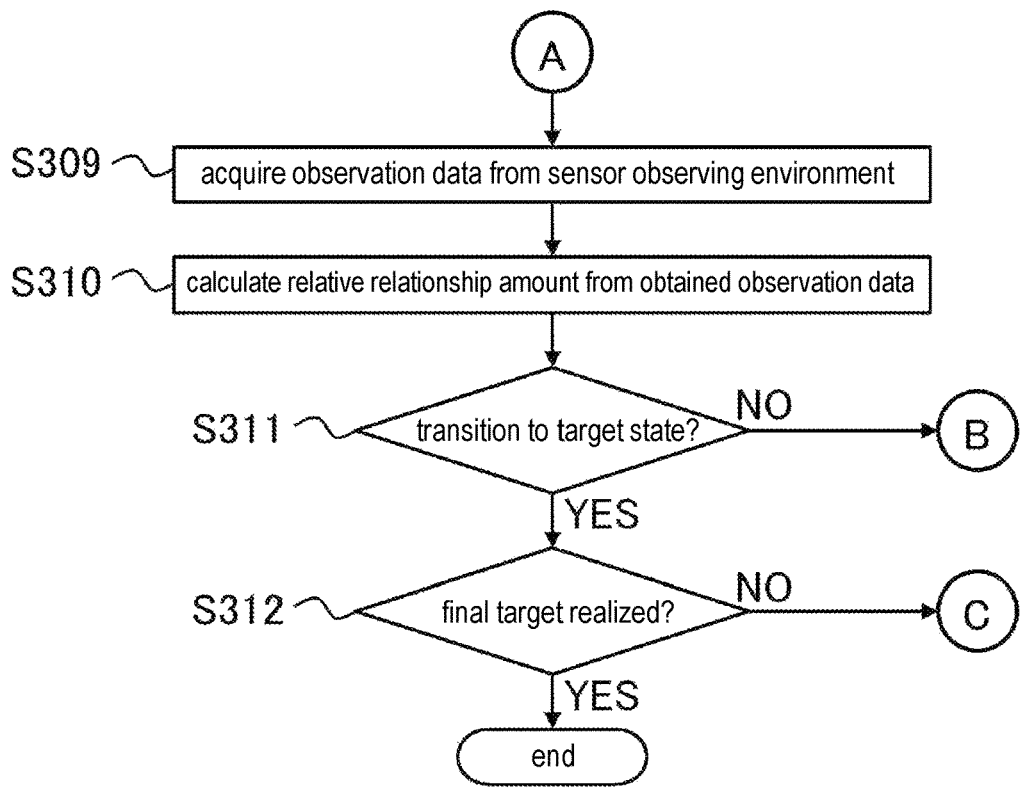
FIG. 9B illustrates an example of a processing procedure related to control of a robot device by the control device according to the embodiment.

Next, an example of a processing procedure related to operation control of the manipulator 3 will be described with reference to FIGS. 9A and 9B. FIGS. 9A and 9B are flowcharts illustrating an example of a processing procedure related to operation control of the manipulator 3 by the control device 1 according to the present embodiment. The processing procedure described below is an example of a "control method" of the present invention.

(Steps S301 and S302)

In step S301, the control unit 11 receives the designation of the operation T to be executed. The method of receiving the designation of the operation T may not be particularly limited, and may be appropriately selected depending on an embodiment. For example, the control unit 11 may receive the designation of the operation T to be executed by inputting the name of the operation T via the input device 14. Further, for example, the control unit 11 may receive the designation of the operation T to be executed by outputting a list indicating the candidates for the operation T to be executed to the output device 15 and causing the operator to select the operation T to be executed from the list.

In the next step S302, the control unit 11 operates as the target setting unit 101, and sets the relative relationship amount rn serving as the final target gn according to the designated operation T. The relative relationship amount rn of the final target gn may be provided by a simulator such as CAD, or may be provided by the operator's designation. When the relative relationship amount of the final target gn is set, the control unit 11 proceeds to the next step S303.

(Steps S303 and S304)

In step S303, the control unit 11 operates as the data acquisition unit 102 and acquires observation data from sensors that observe the plurality of objects present in the environment WS. In the next step S304, the control unit 11 operates as the relationship identifying unit 103, and calculates the relative relationship amount between the plurality of objects from the acquired observation data.

In the present embodiment, the control unit 11 acquires the image data 40 from the camera CA. Then, the control unit 11 matches the model of each object (the gripper 37, the first workpiece W1, and the second workpiece W2) indicated by the CAD data 121 with the acquired image data 40. The control unit 11 calculates the relative coordinates rc1 to rc3 (relative relationship amounts) between the objects on the basis of the result of this matching. A known image processing method may be used for the matching method and the derivation of the relative coordinates rc1 to rc3.

The time point for processing steps S303 and S304 is a time point immediately before starting operation control (that is, the starting time point st). The image data 40 acquired in step S303 is the latest at this time point. Therefore, the relative relationship amount calculated in step S304 is used as the relative relationship amount r0 at the starting time point st and the relative relationship amount p1 in the current state n1. When the calculation of the relative relationship amount is completed, the control unit 11 proceeds to the next step S305.

(Step S305)

In step S305, the control unit 11 operates as the action determination unit 104, and determines the series RS of relative relationship amounts in the state of the target (g1 or the like) of the plurality of objects until the relative relationship amount rn of the final target gn is realized from the relative relationship amount r0 at the starting time point st of operation control.

In the present embodiment, the control unit 11 uses the map information 123 to determine the series RS of relative relationship amounts. Specifically, the control unit 11 searches for a route from a node corresponding to the relative relationship amount r0 in the state of the starting time point st to a node corresponding to the relative relationship amount rn in the state of the final target gn by selecting a waypoint node from a plurality of nodes in the arrangement space indicated by the map information 123. Then, the control unit 11 generates the series RS of relative relationship amounts by the relative relationship amount corresponding to the node included in the searched route.

Figure 10:
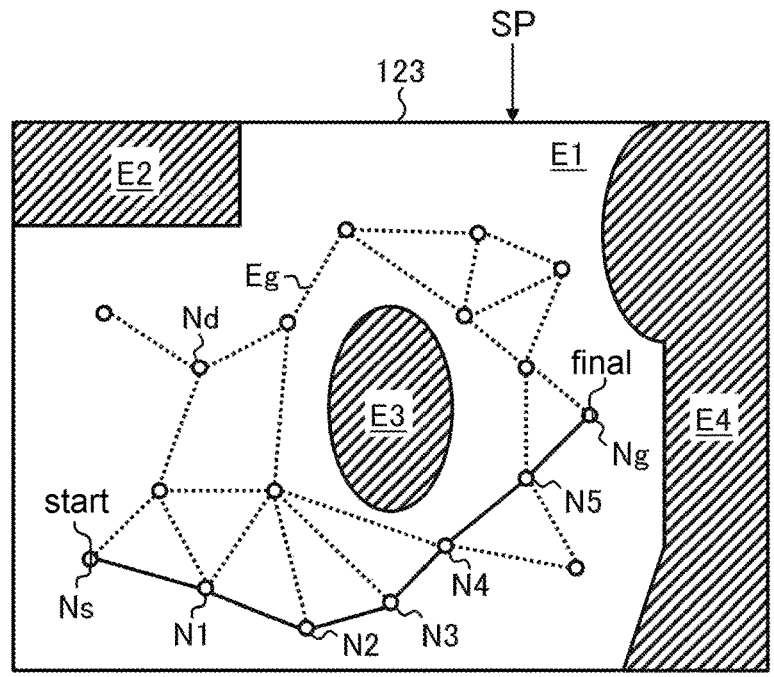
FIG. 10 schematically illustrates an example of an action plan by the control device according to an embodiment.

FIG. 10 schematically illustrates a scene in which nodes N1 to N5 are selected as a waypoint node of a route from the node Ns corresponding to the relative relationship amount r0 at the starting time point st to the node Ng corresponding to the relative relationship amount rn of the final target gn as a result of the route search (action plan). In the example of FIG. 10, for convenience of explanation, the route passes through five nodes N1 to N5 from the node Ns to the node Ng (that is, n is 6), but the number of waypoint nodes may not be limited to such an example.

When the node Ns corresponding to the starting time point st and the node Ng corresponding to the final target gn are already set as the nodes Nd, the control unit 11 uses the corresponding nodes Nd as each node (Ns, Ng). On the other hand, when each node (Ns, Ng) is not set as the node Nd, the control unit 11 sets each node (Ns, Ng) in the arrangement space SP. Then, the control unit 11 searches for a route from the node Ns to the node Ng by selecting a waypoint node from the plurality of nodes Nd set in the arrangement space SP. For the route search, for example, a known search method such as Dijkstra's algorithm may be used. In the example of FIG. 10, the route from the node Ns to the node Ng is composed of the edges Eg connected to the selected nodes N1 to N5. In this case, the control unit 11 generates the series RS of relative relationship amounts from the relative relationship amounts corresponding to the nodes (N1 to N5, Ng) included in this route.

Constraint conditions may be imposed on the route search. In this case, the control unit 11 searches for a route from the node Ns to the node Ng so as to satisfy the constraint conditions. The type of constraint condition may not be particularly limited and may be appropriately selected depending on an embodiment. The constraint condition may be, for example, that the route should pass through the node Nd designated by the operator or the like. In this case, the control unit 11 searches for a route from the node Ns to the node Ng so as to pass through the designated node Nd.

Further, as constraint conditions, for example, a weight may be set for each edge Eg. This weight may be appropriately set or changed according to the prioritizing item in the route search. For example, it is assumed that the prioritizing item is the shortest route. In this case, the weight of each edge Eg may be set according to the distance for driving the gripper 37. Further, for example, it is assumed that the prioritizing item is to transport the first workpiece W1 to be separated from the second workpiece W2 by a predetermined distance. In this case, the weight of each edge Eg may be set so that, during the transportation of the first workpiece W1, the edge Eg passing through the node corresponding to the relative relationship amount in which the distance between the first workpiece W1 and the second workpiece W2 is within the predetermined distance is not prioritized, but the edge Eg passing through the other nodes is prioritized. The control unit 11 may use this weight to search for a route.

When the series RS of relative relationship amounts is determined, the control unit 11 proceeds to the next step S306.

(Step S306)

In step S306, the control unit 11 operates as the action determination unit 104, and identifies the relative relationship amount in the state of the next transition target of the current state among the series RS of relative relationship amounts. The relative coordinates rc1 to rc3 of the relative relationship amount in the current state are calculated from the latest image data 40 acquired from the camera CA. The next transition target is, for example, the target closest to the current state towards the final target gn. By following the route searched in step S305, the control unit 11 can identify the relative relationship amount in the state of the next transition target of the current state.

For example, at the stage where step S306 is first executed, the image data 40 acquired in step S303 is the latest, and the relative coordinates rc1 to rc3 calculated from the image data 40 are the relative relationship amount p1 in the current state n1. Therefore, at this stage, the control unit 11 identifies the relative relationship amount r1 of the target g1 as the relative relationship amount to be transitioned next from the series RS of relative relationship amounts. In the example of FIG. 10, the relative relationship amount p1 in the current state n1 corresponds to the starting node Ns. Therefore, the relative relationship amount in the state of the next transition target corresponds to the node N1 that is reached from the starting node Ns toward the final node Ng via one edge Eg (that is, adjacent to the starting node Ns).

When the relative relationship amount in the state of the next transition target is identified, the control unit 11 proceeds to the next step S307.

(Step S307)

In step S307, the control unit 11 operates as a command determination unit 105 and determines the control command 41 to be provided to the manipulator 3 so as to change the relative relationship amount in the current state to the relative relationship amount in the state of the next transition target.

In the present embodiment, the control unit 11 determines the control command 41 using the learned neural network 51. Specifically, the control unit 11 sets the learned neural network 51 with reference to the learning result data 127. Subsequently, the control unit 11 inputs the relative relationship amount in the current state and the relative relationship amount in the state of the next transition target to the input layers 511 of the neural network 51. Then, as the arithmetic processing of the neural network 51, the control unit 11 determines the firing of each neuron included in each of the layer 511 to 513 in order from the input side. As a result, the control unit 11 acquires an output value corresponding to the result of determining the control command 41 from the output layer 513.

The format of the output value of the neural network 51 may not be particularly limited, and may be appropriately selected depending on an embodiment. For example, the output value of the neural network 51 may directly correspond to the control command 41. In this case, the control unit 11 can regard the output value of the neural network 51 as it is as the control command 41. Further, for example, the output value of the neural network 51 may indicate an index (for example, a class) for determining the control command 41. In this case, the control device 1 may retain reference information (not illustrated) such as a table format in which the output value and the control command are associated with each other in the storage unit 12. The control unit 11 can determine the control command 41 from the output value of the neural network 51 on the basis of this reference information. When the control command 41 is determined, the control unit 11 proceeds to the next step S308.

(Step S308)

In step S308, the control unit 11 operates as the operation control unit 106 and outputs the determined control command 41 to the manipulator 3. In the present embodiment, the control unit 11 controls the operation of the manipulator 3 on the basis of the control command 41 as the output process of the control command 41.

The method of controlling the operation of the manipulator 3 may be appropriately selected depending on the format of the control command 41. For example, the control command 41 may directly indicate the amount of operation of each of the joint portions 31 to 36. The operation amount of each of the joint portions 31 to 36 is, for example, a torque command value, a voltage command value, or the like. In this case, the control unit 11 controls the operation of the manipulator 3 by directly providing the obtained control command 41 to the servomotors of the joint portions 31 to 36 as it is.

For example, the control command 41 may indicate a target value of the control amount of each of the joint portions 31 to 36. The control amount of each of the joint portions 31 to 36 is, for example, an angle of each of the joint portions 31 to 36. In this case, the control unit 11 acquires the measured value (measurement data) of the control amount of each of the joint portions 31 to 36 from the encoder built in each of the joint portions 31 to 36. The timing of acquiring the measured value from the encoder may not be particularly limited as long as it is immediately before controlling the operation of the manipulator 3, and may be appropriately selected depending on an embodiment. For example, the timing of acquiring the measured value from the encoder may be the same as the timing of acquiring the image data 40. Subsequently, the control unit 11 calculates the operation amount of each of the joint portions 31 to 36 from the difference (deviation) between the target value of the control amount of each of the joint portions 31 to 36 indicated by the control command 41 and the measured value acquired from the encoder. A conventional control method such as proportional integral differential (PID) control may be used for calculating the operation amount. The control unit 11 controls the operation of the manipulator 3 by providing the calculated operation amounts to the servomotors of the joint portions 31 to 36.

The control command 41 may be related to an end effector. For example, the control command 41 may indicate a target value of a control amount in a working coordinate system of the gripper 37. The control amount of the working coordinate system is, for example, the position, posture, and the like of the gripper 37. In this case, the control unit 11 calculates the target value of the control amount of a joint coordinate system of each of the joint portions 31 to 36 from the target value of the control amount of the working coordinate system indicated by the control command 41 on the basis of the inverse kinematics. Subsequent processing may be the same as in the above example. That is, the control unit 11 acquires the measured value of the control amount of each of the joint portions 31 to 36 from the encoder built in each of the joint portions 31 to 36. Subsequently, the control unit 11 calculates the operation amount of each of the joint portions 31 to 36 from the difference (deviation) between the target value of the control amount of each of the joint portions 31 to 36 indicated by the control command 41 and the measured value acquired from the encoder. The control unit 11 controls the operation of the manipulator 3 by providing the calculated operation amounts to the servomotors of the joint portions 31 to 36.

When the operation of the manipulator 3 is controlled on the basis of the control command 41, the control unit 11 proceeds to the next step S309.

(Steps S309 and S310)

Steps S309 and step S310 are the same as steps S303 and S304. In step S309, the control unit 11 operates as the data acquisition unit 102 and acquires the image data 40 from the camera CA. In step S310, the control unit 11 operates as the relationship identifying unit 103, and matches the model of each object (the gripper 37, the first workpiece W1, and the second workpiece W2) indicated by the CAD data 121 with respect to the acquired image data 40. The control unit 11 calculates the relative coordinates rc1 to rc3 (relative relationship amount) between the objects on the basis of the result of this matching. When the calculation of the relative relationship amount is completed, the control unit 11 proceeds to the next step S311.

(Step S311)

In step S311, the control unit 11 determines whether the relative relationship amount between the plurality of objects has transitioned to the target state identified in step S306 as a result of the control in step S308.

The method for determining whether the state has transitioned to the target state may be appropriately determined depending on an embodiment. For example, the control unit 11 may determine whether the relative relationship amount calculated in step S310 matches the relative relationship amount in the target state identified in step S306. This match may include an approximation based on a threshold (an allowable error) as well as an exact match. When the relative relationship amount calculated in step S310 matches the relative relationship amount in the target state identified in step S306, the control unit 11 may determine that the relative relationship amount between the plurality of objects has transitioned to the target state. On the other hand, if this is not the case, the control unit 11 may determine that the relative relationship amount between the plurality of objects has not transitioned to the target state.

When it is determined that the relative relationship amount between the plurality of objects has not transitioned to the target state, the control unit 11 returns the process to step S307 and repeats the series of processes of steps S307 to S310. In this repeated process, the image data 40 acquired in step S309 before returning to step S307 is the latest. Therefore, in this repeated process, the control unit 11 regards the relative relationship amount calculated in step S310 before returning to step S307 as the relative relationship amount in the current state. On the other hand, when it is determined that the relative relationship amount between the plurality of objects has transitioned to the target state, the control unit 11 proceeds to the next step S312.

(Step S312)

In step S312, the control unit 11 determines whether the relative relationship amount rn of the final target gn has been realized. When the target identified in step S306 is the final target gn, the relative relationship amount rn of the final target gn is realized from the result of the determination in step S311. Therefore, in this case, it is determined that the relative relationship amount rn of the final target gn has been realized, and the control unit 11 ends the series of processes related to the operation control of the manipulator 3.

When the target identified in step S306 is a target other than the final target gn, the relative relationship amount rn of the final target gn has not yet been realized. In this case, the control unit 11 returns the process to step S306. As a result, the control unit 11 repeatedly executes the series of processes of steps S306 to S311 until the relative relationship amount rn of the final target gn is realized. As in step S311 above, in this repeated process, the image data 40 acquired in step S309 before returning to step S306 is the latest. Therefore, in this repeated process, the control unit 11 regards the relative relationship amount calculated in step S310 before returning to step S306 as the relative relationship amount in the current state.

For example, when the series of processes of steps S306 to S311 are executed for the s-th time, in step S306, the control unit 11 identifies the relative relationship amount rs in the state of the next transition target gs of the current state ns calculated from the latest image data 40s among the series RS of relative relationship amounts. In step S307, the control unit 11 determines the control command 41s so as to change the relative relationship amount ps in the current state ns to the relative relationship amount rs in the state of the next transition target gs. Then, in step S308, the control unit 11 outputs the determined control command 41s to the manipulator 3. By repeating this series of processes until the relative relationship amount rn of the final target gn is realized, the manipulator 3 is controlled to execute a series of operations related to the operation T such as parts transportation illustrated in FIGS. 2A to 2F, for example.

[Features]

As described above, in the present embodiment, the current states and targets of a plurality of objects (the gripper 37, the first workpiece W1, and the second workpiece W2) present under the environment WS in which the manipulator 3 operates are represented by a relative relationship amount including the relative coordinates rc1 to rc3, and the control command 41 is determined as the relative relationship amount is changed. That is, in the present embodiment, the control command 41 is not associated with the operation T itself taught to the manipulator 3, but is associated with the amount of change in the relative relationship amount. As a result, it is possible to teach the time-series control command 41 to be provided to the manipulator 3 by changing the relative relationship amount regardless of the details of the operation.

Figure 11A:
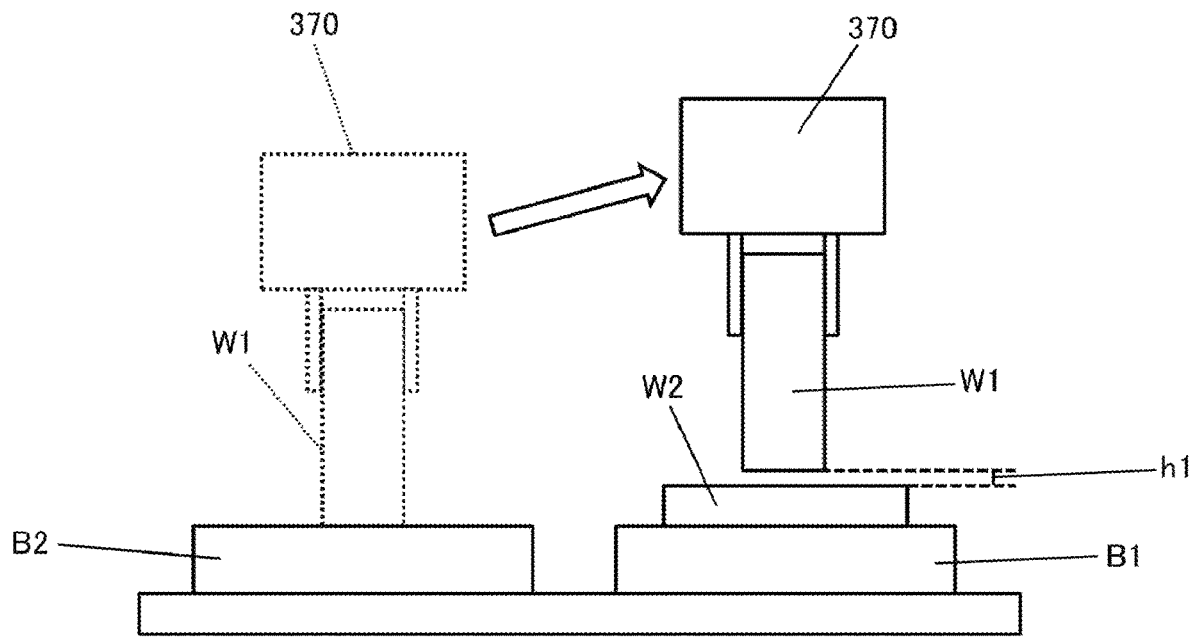
FIG. 11A is a diagram for explaining a problem of a conventional control method.
Figure 11B:
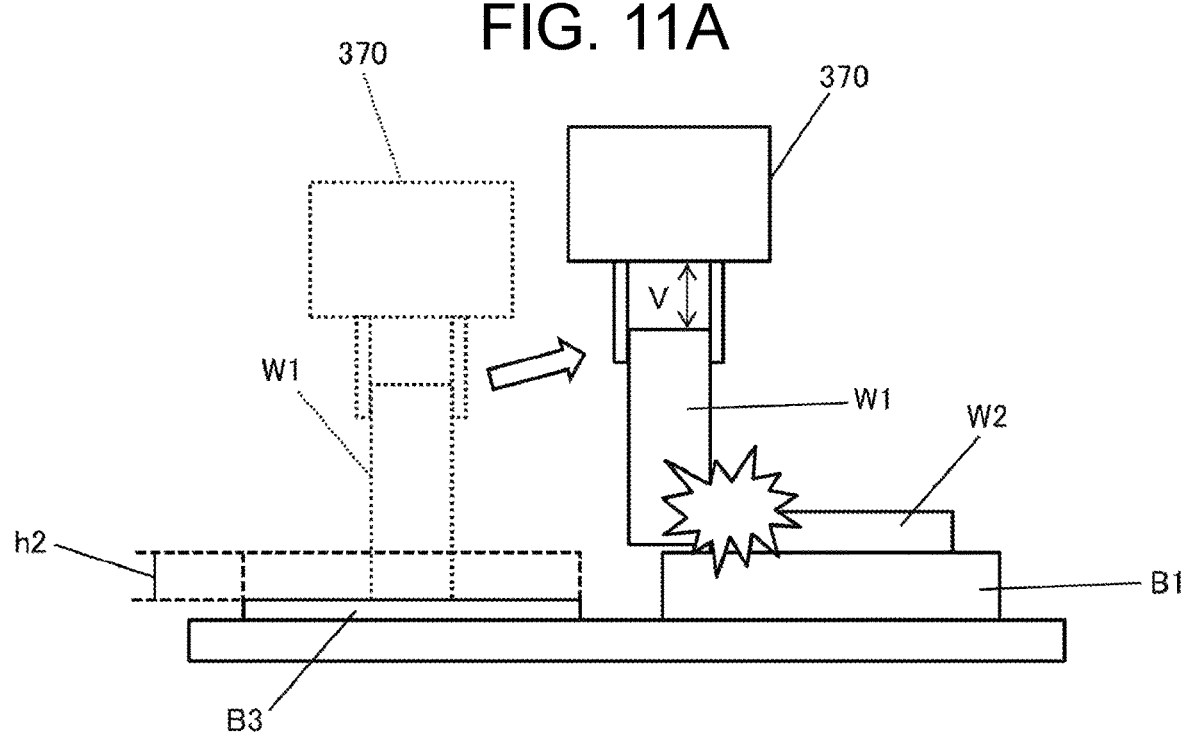
FIG. 11B is a diagram for explaining a problem of a conventional control method.
Figure 12:
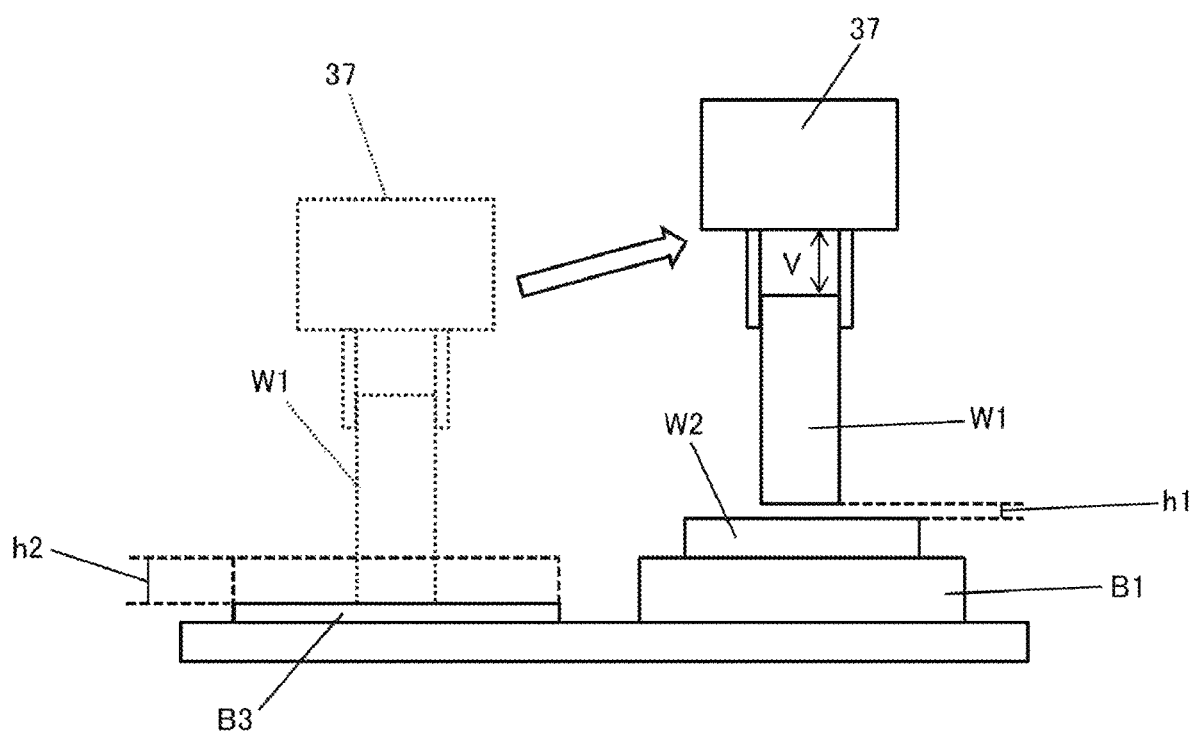
FIG. 12 is a diagram for explaining the features of a control method according to the embodiment.

This will be described in detail with reference to FIGS. 11A, 11B and 12. FIGS. 11A and 11B are diagrams for explaining the problems of the conventional control method. On the other hand, FIG. 12 is a diagram for explaining the above-mentioned features of the control method according to the present embodiment. In each figure, for convenience of explanation, an operation of transporting the first workpiece W1 onto the second workpiece W2 using a gripper (37, 370) as an example of the operation to be taught to the manipulator as in FIGS. 2A to 2F is illustrated.

As illustrated in FIG. 11A, when teaching the operation, it is assumed that the first workpiece W1 is placed on a table B2, and the second workpiece W2 is placed on a table B1 having the same height as the table B2. Under this condition, it is assumed that the manipulator is taught to execute a series of operations of grasping the first workpiece W1 by the gripper 370, moving the grasped first workpiece W1 horizontally near the height h1 above the second workpiece W2, and lowering the gripper 370 so that the first workpiece W1 is placed on the second workpiece W2 according to a conventional method.

It is assumed that after the teaching of this operation is completed, at least one of the states of the first workpiece W1 and the second workpiece W2 is changed due to circumstances such as changing of the place where the operation is executed. In the example of FIG. 11B, a scene in which the first workpiece W1 is placed on a table B3, which is lower than the table B2 by the height h2, is illustrated.

In the conventional method, the time-series control commands acquired by the teaching are associated with the operation itself to be taught. Therefore, the manipulator attempts to transport the first workpiece W1 to the second workpiece W2 according to the same control command as described above. As a result, the position at which the gripper 370 grasps the first workpiece W1 is changed by the height h2 by which the table B3 is lower than the table B2. Specifically, the gripper 370 grasps the upper end side of the first workpiece W1 as compared with the scene of FIG. 11A, and the gap V between the gripper 370 and the first workpiece W1 is widened by the height h2.

Therefore, if the height h2 is larger than the height h1, when the manipulator attempts to horizontally move the first workpiece W1 grasped by the gripper 370 over the second workpiece W2, the lower part of the first workpiece W1 may collide with the second workpiece W2. Therefore, in the conventional method, even when such a small change occurs, the manipulator may not be able to appropriately execute the operation unless the details of the operation are newly taught.

On the other hand, in the present embodiment, when the operation is taught to the manipulator 3 as in FIG. 11A, the learned control command is associated with the amount of change in the relative relationship amount rather than the operation itself. Therefore, in step S305, the series RS of relative relationship amounts can be determined so as to include the target that the first workpiece W1 is arranged at the height h1 above the second workpiece W2. Then, in step S307, the control command 41 can be determined so as to realize the relative relationship amount in which the first workpiece W1 is arranged at the height h1 above the second workpiece W2. Therefore, as illustrated in FIG. 12, even when the first workpiece W1 is placed on the table B3 which is lower than the table 2B by the height h2, and the gap V between the gripper 37 and the first workpiece W1 is widened by the height h2, the operation of the manipulator 3 can be controlled so that the first workpiece W1 is horizontally moved near the height h1 above the second workpiece W2.

In the present embodiment, it is possible to teach the time-series control command 41 to be provided to the manipulator 3 by changing the relative relationship amount regardless of the details of the operation. Therefore, according to the present embodiment, it is possible to increase the versatility of the ability to execute the operation to be learned. In this way, it is possible to reduce the cost of teaching the operation to the manipulator 3.

§ 4 Modified Example

Although the embodiment of the invention has been described in detail, the description is merely illustrative of the invention in all respects. Naturally, various improvements and modifications can be made without departing from the scope of the invention. For example, the following changes can be made. Hereinafter, the same components as those in the embodiment will be denoted by the same reference numerals, and description of the same points as those in the embodiment will be omitted as appropriate. The following modified examples can be combined with each other as appropriate.

<4.1>

In the embodiment, the vertical articulated manipulator 3 is illustrated as the robot device to be controlled. However, the type of the robot device may not be limited to such an example, and may be appropriately selected depending on an embodiment. The robot device may include, for example, an industrial robot, an automatically movable moving body, and the like. Industrial robots include, for example, the above-mentioned vertical articulated robots, SCARA robots, parallel link robots, Cartesian robots, cooperative robots, and the like. In addition, the automatically movable moving body includes, for example, a drone, a vehicle configured to be driven automatically, a mobile robot, and the like. The present invention may be applied to any type of robot device capable of manipulating an object. When the present invention is applied to a moving body that can move automatically and is equipped with a global positioning system (GPS) measuring device, the GPS information measured by the GPS measuring device may be used for identifying a relative relationship amount (for example, the relative coordinate) with respect to a position. In this case, the GPS measuring device provided in each object is an example of the sensor, and the GPS information obtained from each GPS measuring device is an example of the observation data. The sensor and the observation data may be appropriately selected depending on the type of the robot device. Further, in the embodiment, the gripper 37 is illustrated as an end effector included in the manipulator. However, the type of end effector may not be limited to the gripper, and may be appropriately selected depending on an embodiment. The end effector may be, for example, a suction device, a screwdriver, or the like, in addition to the gripper.

<4.2>

In the embodiment, the camera CA is illustrated as a sensor for observing a plurality of objects present in the environment WS. The image data 40 is illustrated as observation data acquired from the sensor. Further, in the embodiment, the relative coordinates rc1 to rc3 are calculated as the relative relationship amount from the image data 40 acquired by the camera CA. However, the types of the sensor and the relative relationship amount may not be limited to such an example, and may be appropriately selected depending on an embodiment. The observation data may not be limited to the image data, and may be appropriately selected depending on the type of sensor to be adopted.

The sensor may be, for example, a depth sensor, a stereo camera, or the like, in addition to the general camera. In addition to the relative coordinate, the relative relationship amount may be, for example, a force acting between a plurality of objects, a state between a plurality of objects (for example, whether they are connected or not), and the like. When the force acting between a plurality of objects is adopted as the relative relationship amount, a sensor that can detect a force such as, for example, the force sensor 38, a tactile sensor, a pressure sensor, a load cell, or the like may be adopted as the sensor for observing the plurality of objects.

In the embodiment, the control device 1 is connected to the camera CA to directly acquire observation data from the camera CA. However, acquiring observation data from a sensor may not be limited to directly acquiring observation data from such a sensor, and may include indirectly acquiring observation data from a sensor via another device. In the embodiment, the control device 1 may acquire the image data 40 from the camera CA via another device.

<4.3>

The processing procedures according to the above-described embodiment are only an example, and each step may be changed as much as possible. Further, regarding the processing procedures according to the above-described embodiment, steps may be omitted, replaced, and added as appropriate depending on an embodiment.

For example, in the embodiment, the control unit 11 receives the designation of the operation to be executed in step S301. However, the method of providing the operation to be executed may not be limited to such an example. For example, the operation to be executed may be provided in advance. In this case, step S301 may be omitted.

Further, for example, in the embodiment, the control unit 11 calculates the relative relationship amount r0 at the starting time point st in steps S303 and S304. However, the method of providing the relative relationship amount r0 at the starting time point st may not be limited to such an example. For example, the relative relationship amount r0 may be provided in advance or may be provided by a simulator or the like. In this case, steps S303 and S304 may be omitted.

<4.4>

In the embodiment, the control device 1 controls the operation of the manipulator 3 on the basis of the control command 41 in step S308. However, the output process of the control command 41 may not be limited to such an example. For example, when the manipulator 3 includes a controller, the output process of the control command 41 may be simply transmitting the control command 41 to the controller.

Figure 13:
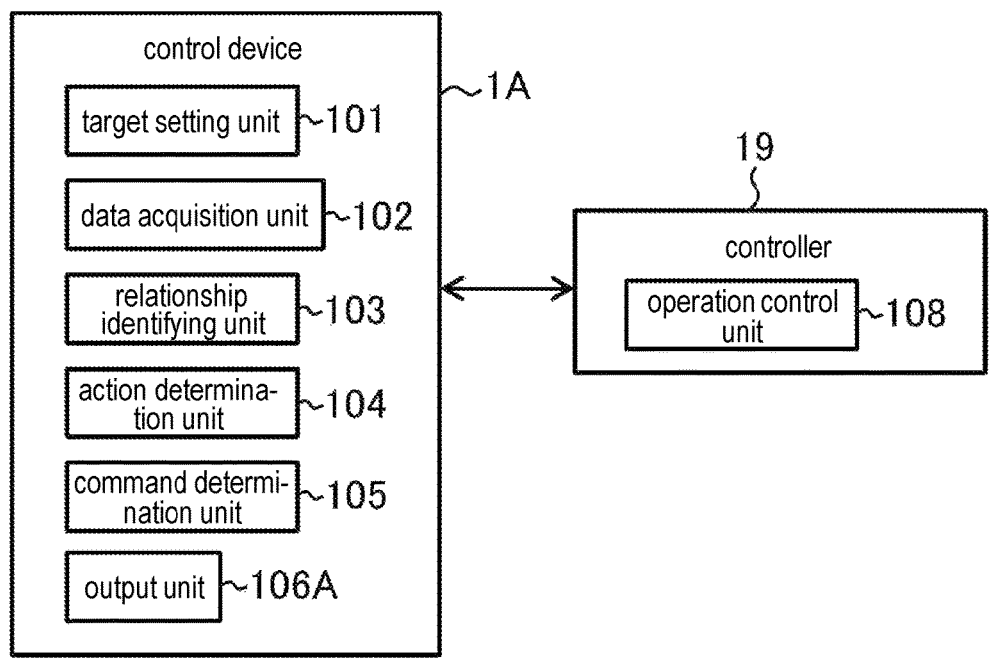
FIG. 13 schematically illustrates an example of the software configuration of a control device according to a modified example.

FIG. 13 schematically illustrates an example of the software configuration of a control device 1A according to the present modified example. The present modified example is the same as the embodiment except that the operation control unit 106 is replaced with the output unit 106A in the software module. That is, except for this point, the hardware configuration and software configuration of the control device 1A are the same as those of the control device 1 according to the above-described embodiment. Further, the controller 19 includes a hardware processor such as a CPU and a memory such as a RAM, and is appropriately configured to control the operation of the manipulator 3. The hardware configuration of the controller 19 may be the same as that of the control device 1 according to the above-described embodiment.

In the present modified example, in step S308, the control unit 11 of the control device 1A operates as the output unit 106A and transmits the determined control command 41 to the controller 19. The control device 1A executes the other steps in the same manner as in the above-described embodiment. On the other hand, the processor of the controller 19 that has received the control command 41 operates as the operation control unit 108, and executes the process in the same manner as in step S308 according to the above-described embodiment. That is, the processor of the controller 19 controls the operation of the manipulator 3 on the basis of the control command 41. In the present modified example, a conventional controller can be used for the controller 19. Therefore, according to the present modified example, the introduction cost of the present invention can be reduced. In the present modified example, the control device 1A may be referred to as an upper controller, and the controller 19 may be referred to as a lower controller.

<4.5>

In the embodiment, the control device 1 retains the control program 81 and the learning program 82, and executes both the control process and the learning process. However, the computers that perform each process may be separate. In particular, the learning process may be executed by another computer.

Figure 14A:
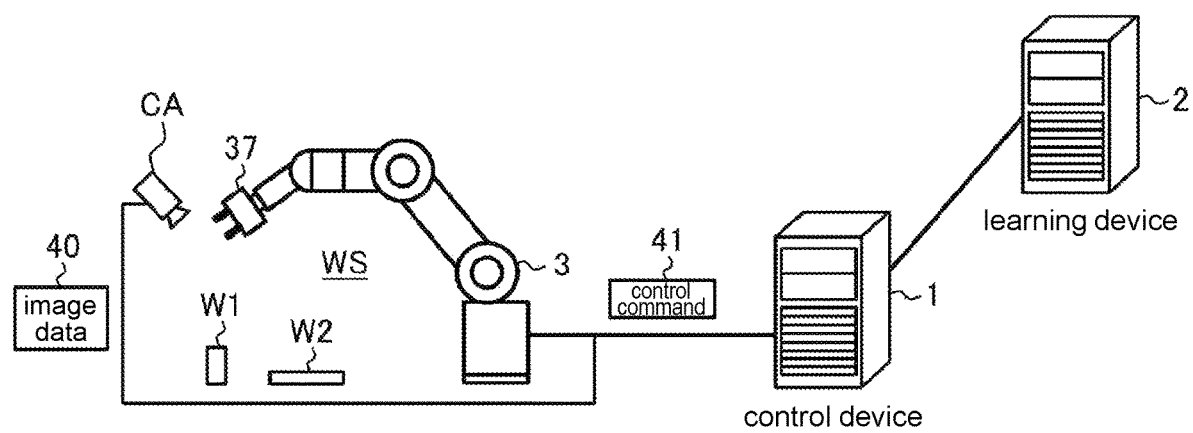
FIG. 14A schematically illustrates an example of a scene in which a learning device according to the modified example is applied.
Figure 14B:
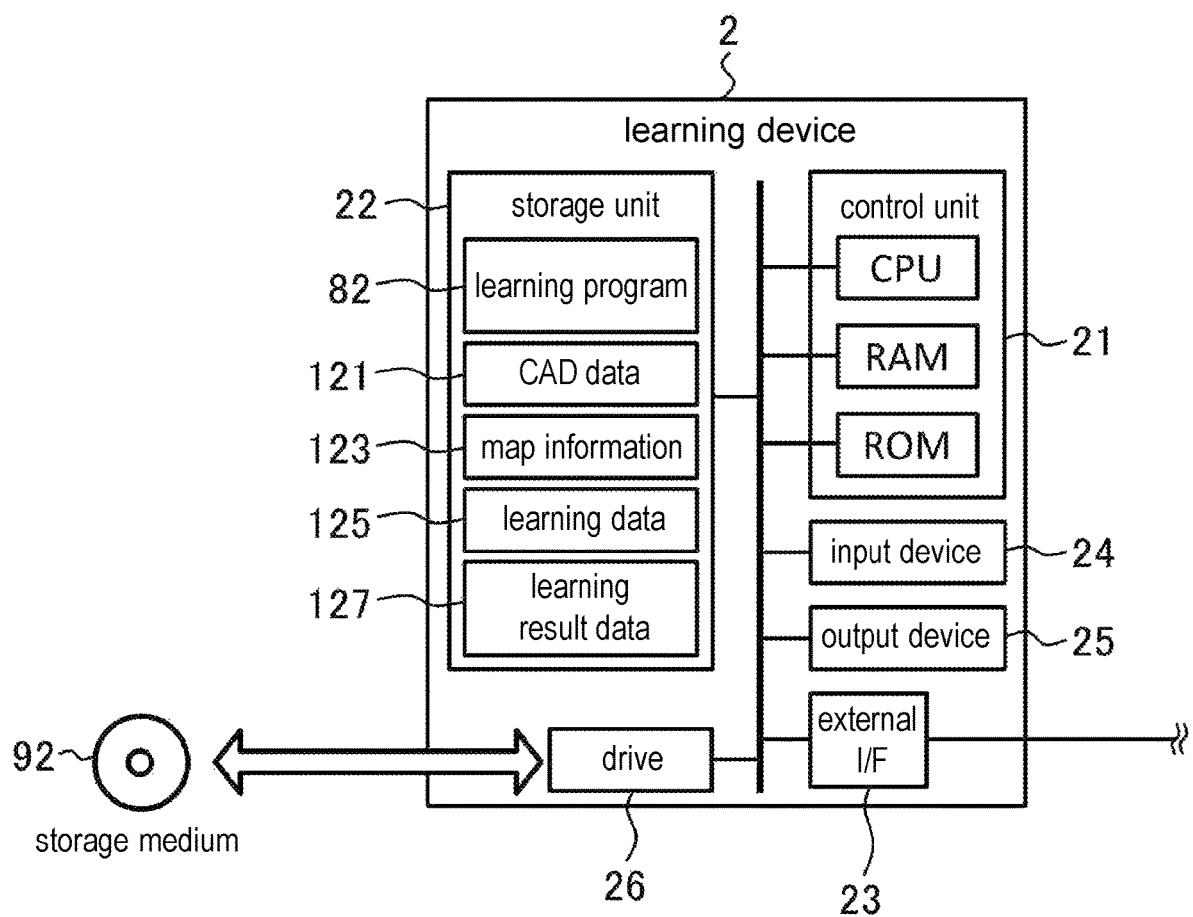
FIG. 14B schematically illustrates an example of the hardware configuration of the learning device according to the modified example.

FIG. 14A schematically illustrates an example of a scene in which the learning device 2 according to the present modified example is applied. FIG. 14B schematically illustrates an example of the hardware configuration of the learning device 2 according to the present modified example. The present modified example is the same as the embodiment except that the learning device 2 executes the processes of steps S101 to S106 and steps S201 to S203. That is, in the control device 1 according to the present modified example, the learning program 82 is omitted. In the software configuration of the control device 1, the software module related to the learning program 82 is omitted. The control device 1 and the learning device 2 may be connected via a network or the like, or data may be exchanged via a storage medium.

As illustrated in FIG. 14B, the learning device 2 according to the present modified example is a computer in which a control unit 21, a storage unit 22, an external interface 23, an input device 24, an output device 25, and a drive 26 are electrically connected. The control units 21 to drive 26 of the learning device 2 may be configured in the same manner as the control units 11 to drive 16 of the control device 1.

The storage unit 22 stores various pieces of information such as the learning program 82, the CAD data 121, the map information 123, the learning data 125, and the learning result data 127. The drive 26 is, for example, a CD drive, a DVD drive, or the like, and is a drive device for reading a program stored in the storage medium 92. At least one of the learning program 82, the CAD data 121, and the learning data 125 may be stored in the storage medium 92. Further, the learning device 2 may acquire at least one of the learning program 82, the CAD data 121, and the learning data 125 from the storage medium 92.

The control unit 21 of the learning device 2 loads the learning program 82 stored in the storage unit 22 onto the RAM. Then, the control unit 21 interprets and executes the learning program 82 loaded onto the RAM by the CPU to control each component. As a result, the learning device 2 according to the present modified example operates as a computer provided with a software module similar to the software configuration of the control device 1 related to the learning process illustrated in FIG. 5B.

That is, the control unit 21 of the learning device 2 generates the map information 123 used for the process (action plan) of determining the series RS of relative relationship amounts by executing the processes of steps S101 to S106. Further, the control unit 21 constructs the learned neural network 51 used for the process of determining the control command 41 according to the amount of change in the relative relationship amount by executing the processes of steps S201 to S203.

The learning device 2 appropriately delivers the generated map information 123 and the learning result data 127 to the control device 1 via a network, a storage medium, or the like. Alternatively, in the present modified example, the map information 123 and the learning result data 127 generated by the learning device 2 may be incorporated in the control device 1 in advance.

According to the present modified example, the computer that executes the control process and the computer that executes the learning process can be separated from each other. As a result, the speed of each process can be increased. In the present modified example, the learning device 2 executes both the process of creating the map information 123 and the process of constructing the learned neural network 51. However, these processes may also be performed on separate computers.

<4.6>

In the embodiment, the learned neural network 51 is used in the process of determining the control command 41. However, the process of determining the control command 41 may not be limited to such an example. The learned learning model may not be used in the process of determining the control command 41. For example, the control device 1 may use reference information such as a table format indicating the correspondence between the change amount of the relative relationship amount and the control command in the process of determining the control command 41. This reference information may be stored in the storage unit 12. In this case, in step S307, the control unit 11 may determine the control command 41 on the basis of the reference information.

Further, in the embodiment, a neural network is used as a learning model. However, the type of the learning model may not be limited to the neural network as long as the inference ability for determining the control command can be acquired by machine learning, and the learning model may be appropriately selected depending on an embodiment. The type of machine learning may not be limited to supervised learning, and may be appropriately selected depending on an embodiment. For example, reinforcement learning may be adopted as machine learning. In this case, the learning model may be composed of value functions such as a state value function and an action value function.

Further, in the embodiment, the relative relationship amount in the current state and the relative relationship amount in the state of the next transition target are input to the learned neural network 51. However, the information input to the learned neural network 51 may not be limited to them. For example, the neural network 51 may be configured to further receive the input other information that may be related to the operation of the manipulator 3.

Figure 15:
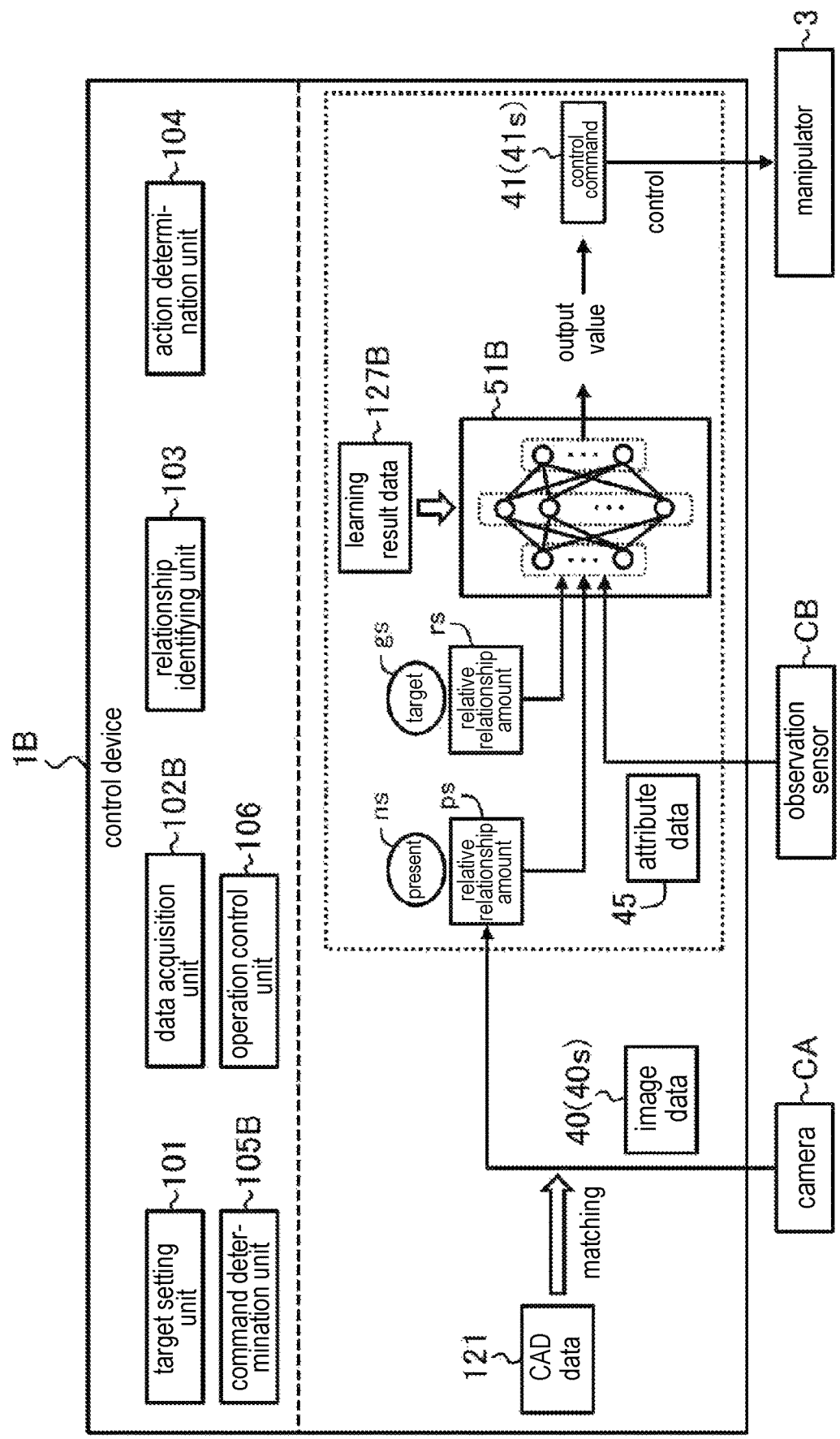
FIG. 15 schematically illustrates an example of the software configuration related to a control process of a control device according to a modified example.

FIG. 15 schematically illustrates an example of the software configuration of a control device 1B according to the present modified example. The present modified example is the same as the embodiment except that the manipulator 3 includes an observation sensor CB and a neural network 51B is configured to further receive attribute data 45 obtained by the observation sensor CB. That is, except for this point, the hardware configuration and software configuration of the control device 1B are the same as those of the control device 1 according to the above-described embodiment.

The observation sensor CB is configured to observe the attributes of the manipulator 3. The type of the observation sensor CB may not be particularly limited as long as it can observe some attribute of the manipulator 3, and may be appropriately selected depending on an embodiment. The observation sensor CB may be, for example, a proximity sensor, a tactile sensor, a force sensor, an encoder, or the like. As the observation sensor CB, an encoder built in the force sensor 38 or each of the joint portions 31 to 36 may be adopted. The attribute data 45 may be, for example, measurement data of a proximity sensor, a tactile sensor, a force sensor, an encoder, or the like, or a feature amount calculated from the measurement data.

The neural network 51B is configured in the same manner as the neural network 51, except that it is configured to further receive the input of the attribute data 45 obtained by the observation sensor CB. For example, the neural network 51B is set so that the number of neurons in the input layer or the like is larger than that of the neural network 51 in order to receive the input of the attribute data 45 and incorporate the received attribute data 45 into the arithmetic processing. Except for this point, the neural network 51B may be configured in the same manner as the neural network 51.

The learning process of the neural network 51B may be executed in the same manner as in the above-described embodiment, except that the learning data to be used includes the data corresponding to the attribute data 45 as the training data. Specifically, in step S201, the control unit 11 of the control device 1B acquires learning data including a plurality of learning data sets each composed of a combination of the relative relationship amount 1251, the relative relationship amount 1252, the attribute data, and the control command 1253. Each learning data set can be generated by adding the attribute data obtained in the first state (that is, the current state for training) to each of the learning data sets 1250.

In step S202, the control unit 11 of the control device 1B uses this learning data to perform machine learning of the neural network 51B. As a result, it is possible to construct a learned neural network 51B trained to output an output value that matches the corresponding control command 1253 with respect to the input of the relative relationship amount 1251, the relative relationship amount 1252, and the attribute data. In step S203, the control unit 11 of the control device 1B generates information indicating the configuration and arithmetic parameters of the constructed learned neural network 51B as learning result data 127B, and stores the generated learning result data 127B in a predetermined storage area.

Further, the control process according to the present modified example may be executed in the same manner as in the above-described embodiment, except for the point that the attribute data 45 is repeatedly acquired together with the image data 40 and the latest attribute data 45 acquired from the observation sensor CB is further input to the learned neural network 51B. Specifically, the control unit 11 of the control device 1B operates as a data acquisition unit 102B before executing the process of step S307, and further acquires the attribute data 45 from the observation sensor CB.

The time point at which the attribute data 45 is acquired is when the operation is controlled by the control command, and is the time point immediately before the control command is determined. The timing of acquiring the attribute data 45 may be the same as the timing of acquiring the image data 40, for example. However, the timing of acquiring the attribute data 45 and the timing of acquiring the image data 40 may not necessarily be exactly the same. The timing of acquiring the attribute data 45 and the timing of acquiring the image data 40 may be different.

In step S307, the control unit 11 of the control device 1B operates as a command determination unit 105B, and further inputs the latest attribute data 45 obtained by the observation sensor CB to the learned neural network 51B. Specifically, the control unit 11 sets the learned neural network 51B with reference to the learning result data 127B. Subsequently, the control unit 11 inputs the relative relationship amount in the current state calculated from the latest image data 40, the relative relationship amount in the state of the next transition target, and the latest attribute data 45 to the neural network 51B, and executes the arithmetic processing of the neural network 51B. As a result, the control unit 11 acquires an output value corresponding to the result of determining the control command 41 from the neural network 51B. Other processes related to the operation control of the manipulator 3 may be executed in the same manner as in the above-described embodiment.

According to the present modified example, the control command 41 can be appropriately determined by further using the attribute data 45. As another form of the control device 1B according to the present modified example, the computers that execute the learning process and the control process may be separated from each other as in the modified example <4.5>. Further, similarly to the above-mentioned "acquiring the observation data from the sensor", acquiring the attribute data 45 from the observation sensor CB may include that the control device 1B and the observation sensor CB are connected to obtain the attribute data 45 directly from the observation sensor CB and that the attribute data 45 is acquired indirectly from the observation sensor CB via another device.

Further, in the embodiment, the neural network 51 is a fully-coupled neural network having a three-layer structure. However, the configuration of the neural network 51 may not be limited to such an example, and may be appropriately selected depending on an embodiment. For example, the neural network 51 may have a recursive structure such as an LSTM block.

Figure 16:
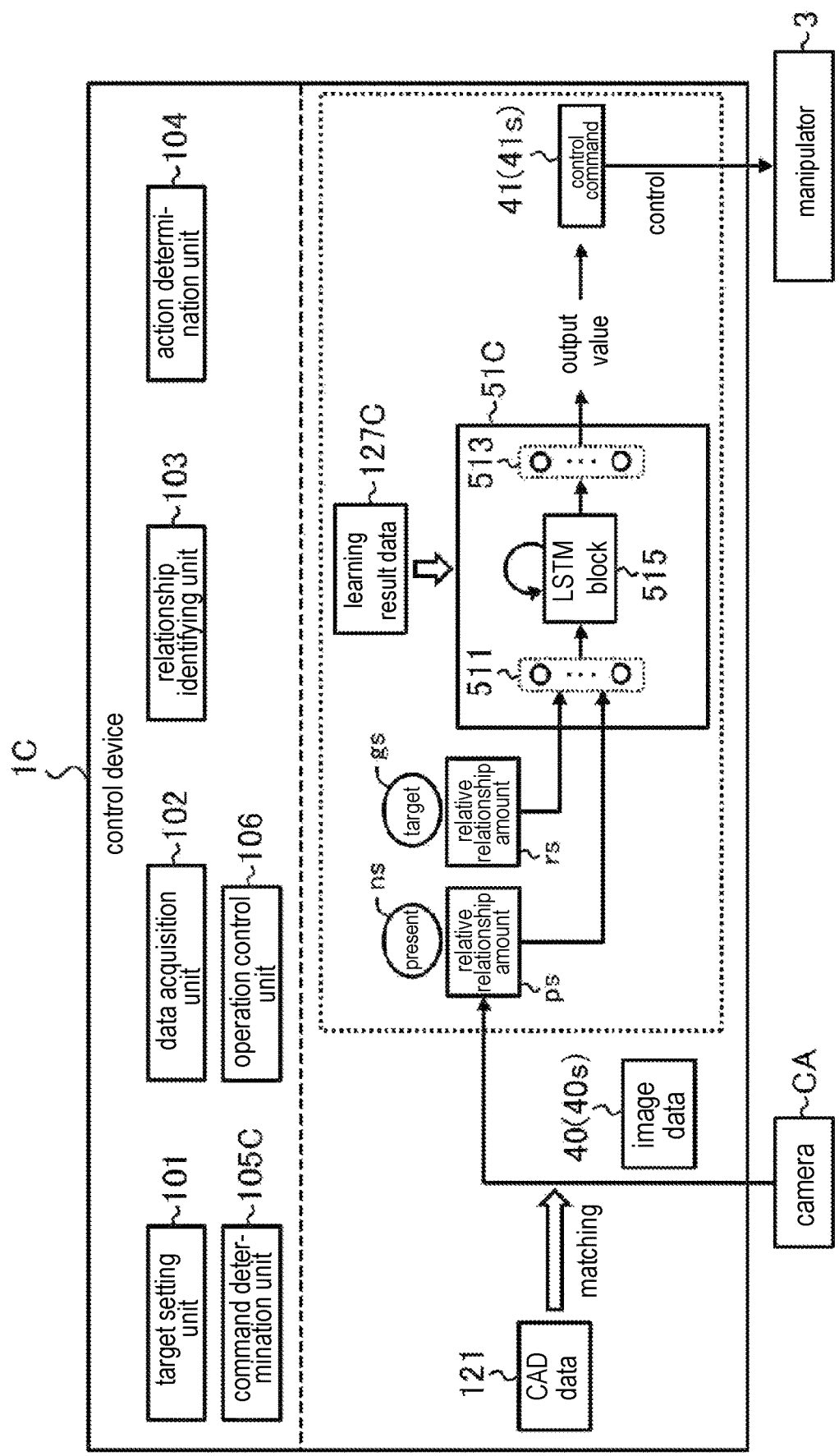
FIG. 16 schematically illustrates an example of the software configuration related to a control process of a control device according to a modified example.

FIG. 16 schematically illustrates an example of the software configuration of a control device 1C according to the present modified example. The present modified example is the same as the embodiment except that the configuration of the neural network 51C is different from that of the neural network 51 according to the above-described embodiment. That is, except for this point, the hardware configuration and software configuration of the control device 1C are the same as those of the control device 1 according to the above-described embodiment.

The neural network 51C according to the present modified example has a configuration in which the intermediate layer 512 of the neural network 51 is replaced with an LSTM block 515. The LSTM block 515 is a block provided with an input gate and an output gate so that the timings of storing and outputting information can be learned (S. Hochreiter and J. Schmidhuber, "Long short-term memory" Neural Computation, 9(8): 1735-1780, Nov. 15, 1997). The LSTM block 515 may further include a forgetting gate that adjusts the timing of forgetting information (Felix A. Gers, Jurgen Schmidhuber and Fred Cummins, "Learning to Forget: Continual Prediction with LSTM" Neural Computation, pages 2451-2471, October 2000). The configuration of the LSTM block 515 may be appropriately set according to the above-described embodiment.

The learning process and the control process according to the present modified example may be executed in the same manner as in the above-described embodiment except that the configuration of the neural network 51C is different from the embodiment. That is, the control unit 11 of the control device 1C constructs a learned neural network 51C by executing the processes of steps S201 to S203, and stores learning result data 127C in a predetermined storage area. Further, the control unit 11 of the control device 1C operates as a command determination unit 105C, and sets the learned neural network 51C with reference to the learning result data 127C. Subsequently, the control unit 11 inputs the relative relationship amount in the current state calculated from the latest image data 40 and the relative relationship amount in the state of the next transition target to the neural network 51C, and executes arithmetic processing of the neural network 51C. As a result, the control unit 11 acquires an output value corresponding to the result of determining the control command 41 from the neural network 51C. Other processes related to the operation control of the manipulator 3 may be executed in the same manner as in the above-described embodiment.

According to the present modified example, the control command 41 can be appropriately determined in consideration of the time-series context of the relative relationship amount using the neural network 51C having a recursive configuration. As another form of the control device 1C according to the present modified example, the computers that execute the learning process and the control process may be separated from each other as in the modified example <4.5>.

<4.7>

In the embodiment, the control device 1 uses the map information 123 to determine the series RS of relative relationship amounts from the starting time point st to the final target gn. However, the method for determining the series RS of relative relationship amounts may not be limited to such an example, and may be appropriately selected depending on an embodiment. For example, the learned learning model may be used for the determination process of the series RS of relative relationship amounts similarly to the determination process of the control command 41 according to the above-described embodiment.

Figure 17A:
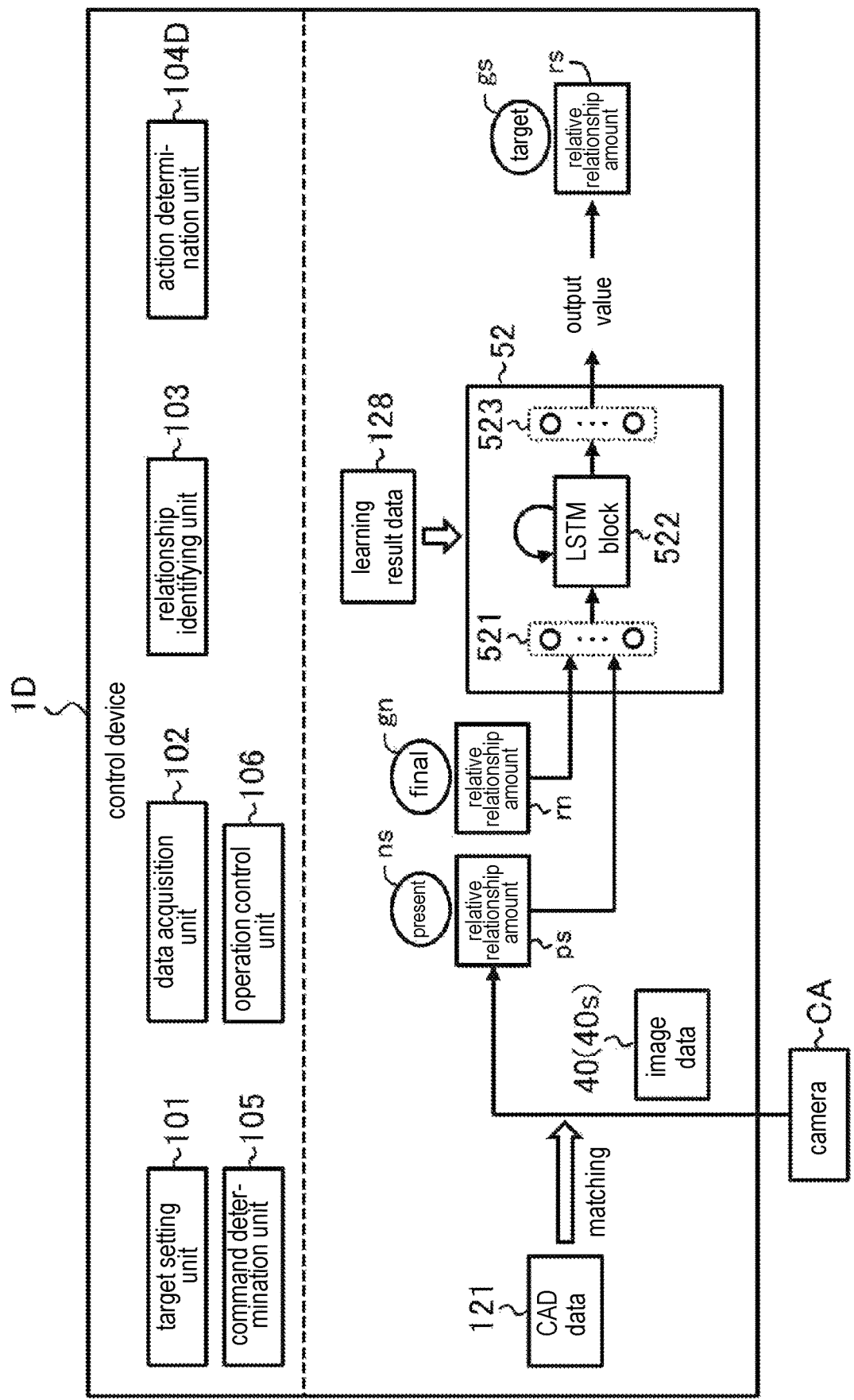
FIG. 17A schematically illustrates an example of the software configuration related to a control process of a control device according to a modified example.
Figure 17B:
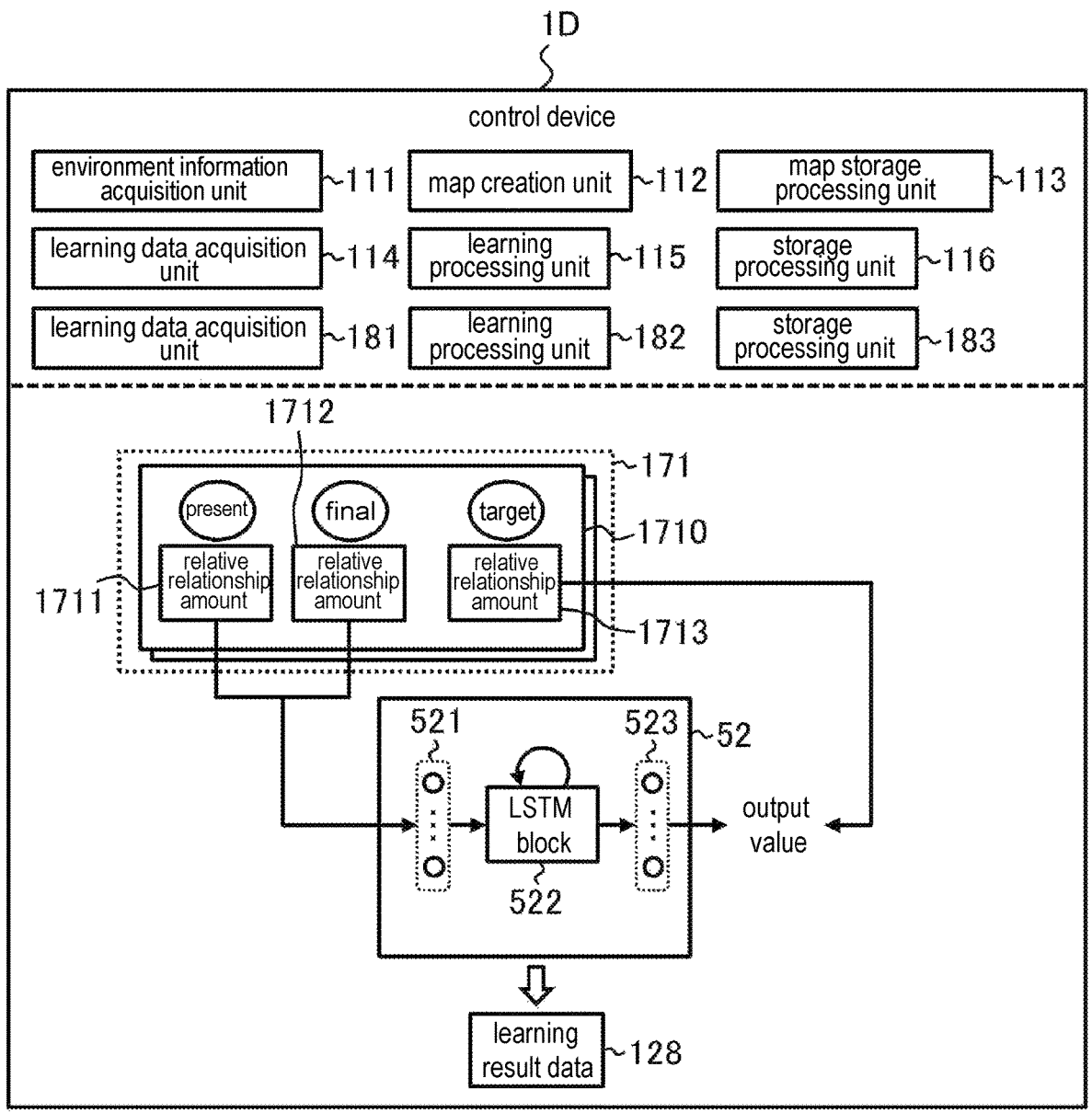
FIG. 17B schematically illustrates an example of the software configuration related to a learning process of a control device according to a modified example.

FIGS. 17A and 17B schematically illustrate an example of the software configuration for each of the control process and the learning process of a control device 1D according to the present modified example. The present modified example is the same as the embodiment except that the learned neural network 52 is used for the process of determining the series RS of relative relationship amounts. That is, except for this point, the hardware configuration and software configuration of the control device 1D are the same as those of the control device 1 according to the above-described embodiment.

As illustrated in FIG. 17A, an action determination unit 104D according to the present modified example includes the learned neural network 52 by retaining learning result data 128. The learning result data 128 may be stored in the storage unit 12. In order to distinguish between them, the learning result data 127 may be referred to as first learning result data, and the learning result data 128 may be referred to as second learning result data.

On the other hand, as illustrated in FIG. 17B, the control device 1D operates as a computer that further includes a learning data acquisition unit 181, a learning processing unit 182, and a storage processing unit 183 as software modules for the learning processing of the neural network 52. In order to distinguish them, the learning data acquisition unit 114, the learning processing unit 115, and the storage processing unit 116 may be referred to as a first learning data acquisition unit, a first learning processing unit, and a first storage processing unit, respectively, and the learning data acquisition unit 181, the learning processing unit 182, and the storage processing unit 183 may be referred to as a second learning data acquisition unit, a second learning processing unit, and a second storage processing unit, respectively.

The learned neural network 52 is an example of the "second learned learning model" of the present invention. The learned neural network 52 is trained to determine the relative relationship amount in the state of the next transition target of the current state for training with respect to the input of the relative relationship amount in the final target for training and the relative relationship amount in the current state for training. The neural network 52 according to the present modified example includes an input layer 521, an LSTM block 522, and an output layer 523 in this order from the input side. The configuration of the neural network 52 is the same as that of the neural network 51C according to the modified example.

The learning process of the neural network 52 may be executed in the same manner as the learning process of the neural network 51. That is, in the first step, the control unit 11 of the control device 1D operates as the learning data acquisition unit 181 and acquires the learning data 171 used for machine learning of the neural network 52. In the present modified example, the learning data 171 includes a plurality of learning data sets 1710, each composed of a combination of a relative relationship amount 1711 in the current state for training and a relative relationship amount 1712 in the state of the final target for training, and a relative relationship amount 1713 in the next transition target of the current state for training. The relative relationship amount 1711 and the relative relationship amount 1712 are used as training data (input data), and the relative relationship amount 1713 is used as teacher data (correct answer data).

The method for acquiring the learning data sets 1710 may not be particularly limited, and may be appropriately selected depending on an embodiment. Similar to the embodiment, for example, a simulator-based virtual environment or a real environment is prepared, and under the prepared environment, the manipulator 3 is appropriately driven under various conditions from the starting time point of executing the operation to the final target. Then, the obtained relative relationship amount 1711 in the current state, the obtained relative relationship amount 1712 in the state of the final target, and the obtained relative relationship amount 1713 in the next transition target of the current state are combined. As a result, the learning data sets 1710 can be generated.

The map information 123 may be used for generating the learning data sets 1710. Each learning data set 1710 may be automatically generated by the operation of a computer, or may be manually generated by the operation of an operator via the input device 14. Further, the generation of the learning data sets 1710 may be performed by the control device 1D, or may be performed by a computer other than the control device 1D. These points are the same as those in the above-described embodiment.

In the second step, the control unit 11 operates as a learning processing unit 182 and uses the learning data 171 to perform machine learning of the neural network 52. As a result, a learned neural network 52 trained to output an output value that matches the corresponding relative relationship amount 1713 in the next transition target state can be constructed with respect to the input of the relative relationship amount 1711 in the current state for training and the relative relationship amount 1722 in the state of the final target for training.

In the third step, the control unit 11 operates as the storage processing unit 183, generates information indicating the configuration and arithmetic parameters of the constructed learned neural network 52 as the learning result data 128, and stores the generated learning result data 128 in a predetermined storage area. The predetermined storage area may be, for example, a RAM in the control unit 11, the storage unit 12, an external storage device, a storage medium, or a combination thereof. As described above, the control unit 11 ends the series of processes related to the construction of the learned neural network 52.

Further, the control process according to the present modified example may be executed in the same manner as in the above-described embodiment except that rather than determining the series RS of relative relationship amounts at once, the relative relationship amount included in the series RS is determined sequentially using the learned neural network 52. Specifically, the control unit 11 of the control device 1D operates as the action determination unit 104D instead of the steps S305 and S306, and determines relative relationship amounts in the state of the next transition target included in the series RS of relative relationship amounts using the learned neural network 52 (hereinafter, this step is also referred to as an "alternative step").

That is, the control unit 11 of the control device 1D sets the learned neural network 52 with reference to the learning result data 128. Subsequently, the control unit 11 inputs the relative relationship amount in the current state calculated from the latest image data 40 and the relative relationship amount rn of the final target gn to the learned neural network 52, and executes the arithmetic processing of the learned neural network 52. As a result, the control unit 11 acquires an output value corresponding to the result of determining the relative relationship amount in the state of the next transition target from the neural network 52. Then, the control unit 11 executes the processes of step S307 and the subsequent steps.

In the present modified example, the control unit 11 determines the series RS of relative relationship amounts by repeating the processes of the alternative step and steps S307 to S311. In the example of FIG. 17A, as the s-th processing of this repetition, a scene in which the relative relationship amount rs of the next target gs is derived from the relative relationship amount ps in the current state ns calculated from the latest image data 40s and the relative relationship amount rn of the final target gn is illustrated. Other processes related to the operation control of the manipulator 3 may be executed in the same manner as in the above-described embodiment.

According to the present modified example, it is possible to improve the accuracy of determining the target state from the starting point to the final target using the learned learning model. As another form of the control device 1D according to the present modified example, the computers that execute the learning process and the control process may be separated from each other as in the modified example <4.5>. The computers that execute the learning processes may also be separated from each other.

In the modified example, a neural network is used as a learning model for learning the inference ability for determining the relative relationship amount in the state of the next transition target. However, the type of the learning model may not be limited to the neural network as long as the inference ability can be acquired by machine learning, and may be appropriately selected depending on an embodiment. The type of machine learning may not be limited to supervised learning, and may be appropriately selected depending on an embodiment.

Further, in the modified example, the neural network 52 is a recursive neural network including the LSTM block 522. As a result, the neural network 52 can appropriately determine the relative relationship amount of the next transition target in consideration of the time-series context of the relative relationship amount. However, the configuration of the neural network 52 may not be limited to such an example, and may be appropriately selected depending on an embodiment. For example, as the neural network 52, a fully-coupled neural network having a multi-layer structure may be used as in the neural network 51 according to the above-described embodiment.

Further, in the modified example, the relative relationship amount in the current state and the relative relationship amount in the state of the final target are input to the learned neural network 52. However, the information input to the learned neural network 52 may not be limited to them. For example, the neural network 52 may be configured to further receive the input observation data acquired from sensors.

Figure 18:
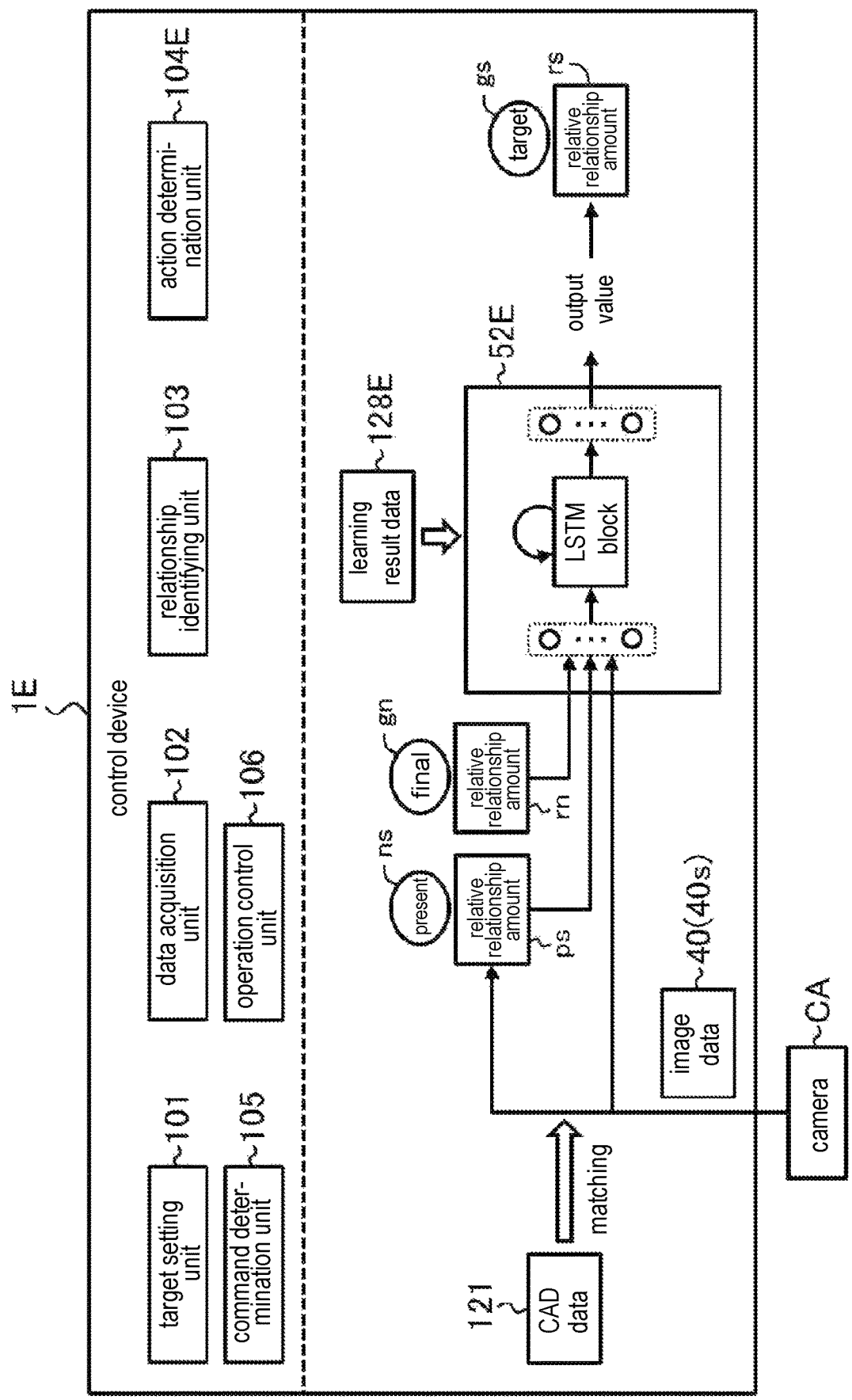
FIG. 18 schematically illustrates an example of the software configuration related to a control process of a control device according to a modified example.

FIG. 18 schematically illustrates an example of the software configuration of a control device 1E according to the present modified example. The present modified example is the same as the above-described modified example of FIGS. 17A and 17B, except that the neural network 52E is configured to further receive the latest image data 40. That is, except for this point, the hardware configuration and software configuration of the control device 1E are the same as those of the control device 1D according to the modified example.

The neural network 52E is configured in the same manner as the neural network 52, except that it is configured to further receive the input of the latest image data 40 obtained by the camera CA. For example, the neural network 52E is set so that the number of neurons in the input layer or the like is larger than that of the neural network 52 in order to receive the input of the image data 40 and incorporate the received image data 40 into the arithmetic processing. Except for this point, the neural network 52E may be configured in the same manner as the neural network 52.

The learning process of the neural network 52E may be executed in the same manner as the above-described modified example except that the learning data to be used includes the data corresponding to the image data 40 as the training data. Specifically, in the first step, the control unit 11 of the control device 1E acquires learning data including a plurality of learning data sets each composed of a combination of the relative relationship amount 1711 in the current state for training, the relative relationship amount 1712 in the state of the final target for training, the image data, and the relative relationship amount 1713 in the state of the next transition target. Each learning data set can be generated by adding the image data obtained in the current state for training to each of the learning data sets 1710.

In the second step, the control unit 11 of the control device 1E uses the learning data to perform machine learning of the neural network 52E. In this way, a learned neural network 52E trained to output an output value that matches the corresponding relative relationship amount 1713 can be constructed with respect to the input of the relative relationship amount 1711, the relative relationship amount 1712 and the image data. In the third step, the control unit 11 of the control device 1E generates information indicating the configuration and arithmetic parameters of the constructed learned neural network 52E as learning result data 128E, and stores the generated learning result data 128E in a predetermined storage area.

Further, the control process according to the present modified example may be executed in the same manner as the above-described modified example except that the latest image data 40 acquired from the camera CA is further input to the learned neural network 52E. Specifically, in the alternative step, the control unit 11 of the control device 1E operates as an action determination unit 104E, and sets the learned neural network 52E with reference to the learning result data 128E. Subsequently, the control unit 11 inputs the latest image data 40, the relative relationship amount in the current state calculated from the latest image data 40, and the relative relationship amount rn of the final target gn to the learned neural network 52E and executes the arithmetic processing of the learned neural network 52E. As a result, the control unit 11 acquires an output value corresponding to the result of determining the relative relationship amount in the state of the next transition target from the neural network 52E. Other processes related to the operation control of the manipulator 3 may be executed in the same manner as in the above-described modified example.

According to the present modified example, by further using the image data 40, the accuracy of determining the target state from the start time to the final target can be further improved. As another form of the control device 1E according to the present modified example, the computers that execute the learning process and the control process may be separated from each other as in the modified example <4.5>. The computers that execute the learning processes may also be separated from each other.

<4.8>

In the embodiment, the control device 1 calculates the relative relationship amount between the objects by matching the model of each object with the image data 40. However, the method of calculating the relative relationship amount from the observation data may not be limited to such an example, and may be appropriately selected depending on an embodiment. For example, as in the determination process of the control command 41 according to the above-described embodiment, the learned learning model may be used for the process of calculating the relative relationship amount from the observation data.

Figure 19A:
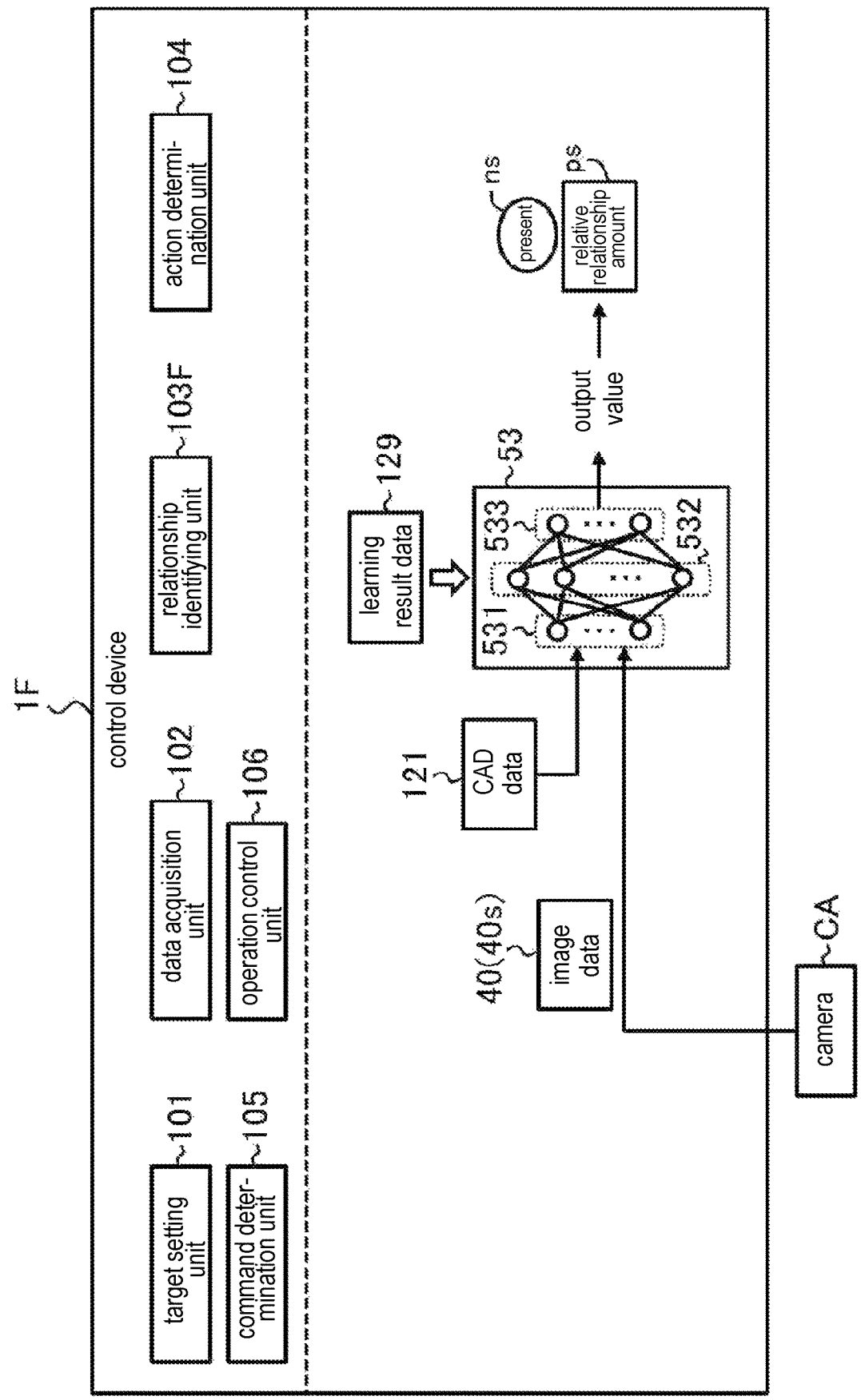
FIG. 19A schematically illustrates an example of the software configuration related to a control process of a control device according to a modified example.
Figure 19B:
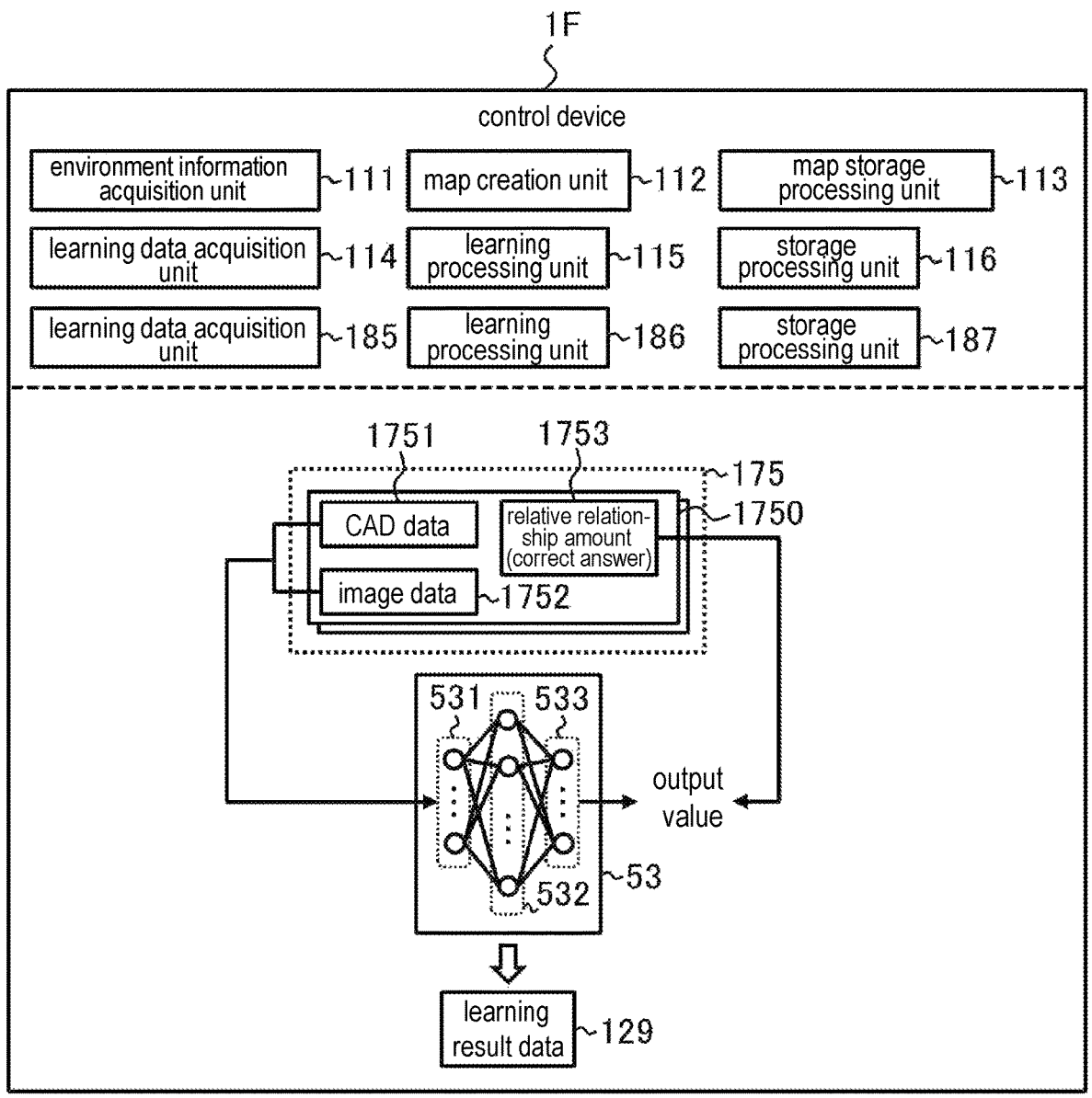
FIG. 19B schematically illustrates an example of the software configuration related to a learning process of a control device according to a modified example.

FIGS. 19A and 19B schematically illustrate an example of the software configuration related to the control process and the learning process of a control device 1F according to the present modified example, respectively. The present modified example is the same as the embodiment except that the learned neural network 53 is used for the process of calculating the relative relationship amount. That is, except for this point, the hardware configuration and software configuration of the control device 1F are the same as those of the control device 1 according to the above-described embodiment.

As illustrated in FIG. 19A, a relationship identifying unit F according to the present modified example includes a learned neural network 53 by retaining learning result data 129. The learning result data 129 may be stored in the storage unit 12. In order to distinguish from the above-mentioned learning result data (127, 128), the learning result data 129 may be referred to as third learning result data.

On the other hand, as illustrated in FIG. 19B, the control device 1F operates as a computer that further includes a learning data acquisition unit 185, a learning processing unit 186, and a storage processing unit 187 as software modules for the learning processing of the neural network 53. In order to distinguish from the learning data acquisition unit 114, the learning processing unit 115, the storage processing unit 116, and the like, the learning data acquisition unit 185, the learning processing unit 186, and the storage processing unit 187 may be referred to as a third learning data acquisition unit, a third learning processing unit, and a third storage processing unit, respectively.

The learned neural network 53 is an example of the "third learned learning model" of the present invention. The learned neural network 53 is trained to calculate the relative relationship amount between a plurality of objects appearing in image data for training in response to the input of the image data for training. The neural network 53 according to the present modified example includes an input layer 531, an intermediate (hidden) layer 532, and an output layer 533 in this order from the input side. The configuration of the neural network 53 is the same as that of the neural network 51 according to the above-described embodiment.

The learning process of the neural network 53 may be executed in the same manner as the learning process of the neural network 51. That is, in the first step, the control unit 11 of the control device 1F operates as the learning data acquisition unit 185 and acquires the learning data 175 used for machine learning of the neural network 53. In the present modified example, the learning data 175 includes a plurality of learning data sets 1750 each composed of a combination of CAD data 1751 including a model of each object, image data 1752 for training, and a relative relationship amount 1753. The CAD data 1751 and the image data 1752 are used as training data (input data), and the relative relationship amount 1753 is used as teacher data (correct answer data).

The method for acquiring the learning data sets 1750 may not be particularly limited, and may be appropriately selected depending on an embodiment. For example, the CAD data 1751 may be generated by known software. In addition, the image data 1752 can be obtained by preparing a camera and photographing a plurality of objects under various conditions with the prepared camera. Further, the relative relationship amount 1753 of the plurality of objects is appropriately measured. The relative relationship amount 1753 may be calculated from the image data 1752. Then, by associating the obtained CAD data 1751 and the image data 1752 with the relative relationship amount 1753, the learning data sets 1750 can be generated.

Each learning data set 1750 may be automatically generated by the operation of a computer, or may be manually generated by the operation of an operator via the input device 14. Further, the generation of the learning data sets 1750 may be performed by the control device 1F, or may be performed by a computer other than the control device 1F. These points are the same as those in the above-described embodiment.

In the second step, the control unit 11 operates as the learning processing unit 186 and uses the learning data 175 to perform machine learning of the neural network 53. As a result, it is possible to construct a learned neural network 53 trained to output an output value that matches the corresponding relative relationship amount 1753 with respect to the input of the CAD data 1751 and the image data 1752 for training.

In the third step, the control unit 11 operates as the storage processing unit 187, generates information indicating the construction and arithmetic parameters of the constructed learned neural network 53 as the learning result data 129, and stores the generated learning result data 129 in a predetermined storage area. The predetermined storage area may be, for example, a RAM in the control unit 11, the storage unit 12, an external storage device, a storage medium, or a combination thereof. As described above, the control unit 11 of the control device 1F ends the series of processes related to the construction of the learned neural network 53.

Further, the control process according to the present modified example may be executed in the same manner as in the above-described embodiment except that the learned neural network 53 is used for calculating the relative relationship amount. Specifically, in each of steps S304 and S310, the control unit 11 of the control device 1F operates as a relationship identifying unit 103F, and uses the learned neural network 53 to calculate the relative relationship amount in the current state from the latest image data 40 obtained from the camera CA.

That is, the control unit 11 of the control device 1F sets the learned neural network 53 with reference to the learning result data 129. Subsequently, the control unit 11 inputs the latest image data 40 and the CAD data 121 to the learned neural network 53, and executes arithmetic processing of the learned neural network 53. As a result, the control unit 11 acquires an output value corresponding to the result of calculating the relative relationship amount in the current state from the neural network 53. FIG. 19A illustrates a scene in which the relative relationship amount ps in the current state ns is calculated from the latest image data 40s and the CAD data 121 as the s-th processing of the repetition. Other processes related to the operation control of the manipulator 3 may be executed in the same manner as in the above-described embodiment.

According to the present modified example, the accuracy of calculating the relative relationship amount can be improved using the learned learning model. As another form of the control device 1F according to the present modified example, the computers that execute the learning process and the control process may be separated from each other in the modified example <4.5>. The computers that execute the learning processes may also be separated from each other.

In the modified example, the neural network is used as a learning model for learning the ability to calculate the relative relationship amount. However, the type of the learning model may not be limited to the neural network as long as the ability can be acquired by machine learning, and may be appropriately selected depending on an embodiment. The type of machine learning may not be limited to supervised learning, and may be appropriately selected depending on an embodiment.

Further, in the modified example, the neural network 53 is a fully-coupled neural network having a three-layer structure. However, the configuration of the neural network 53 may not be limited to such an example, and may be appropriately selected depending on an embodiment. For example, the neural network 53 may have a recursive structure such as an LSTM block.

Further, in the modified example, the latest image data 40 and the CAD data 121 are input to the learned neural network 53. However, the information input to the learned neural network 53 may not be limited to them. For example, the CAD data 121 may be omitted from the information input to the learned neural network 53. In this case, the CAD data 1751 is omitted from the learning data 175. Further, for example, the neural network 53 may be configured to further receive the input of the other information that may be related to the operation of the manipulator 3.

Figure 20:
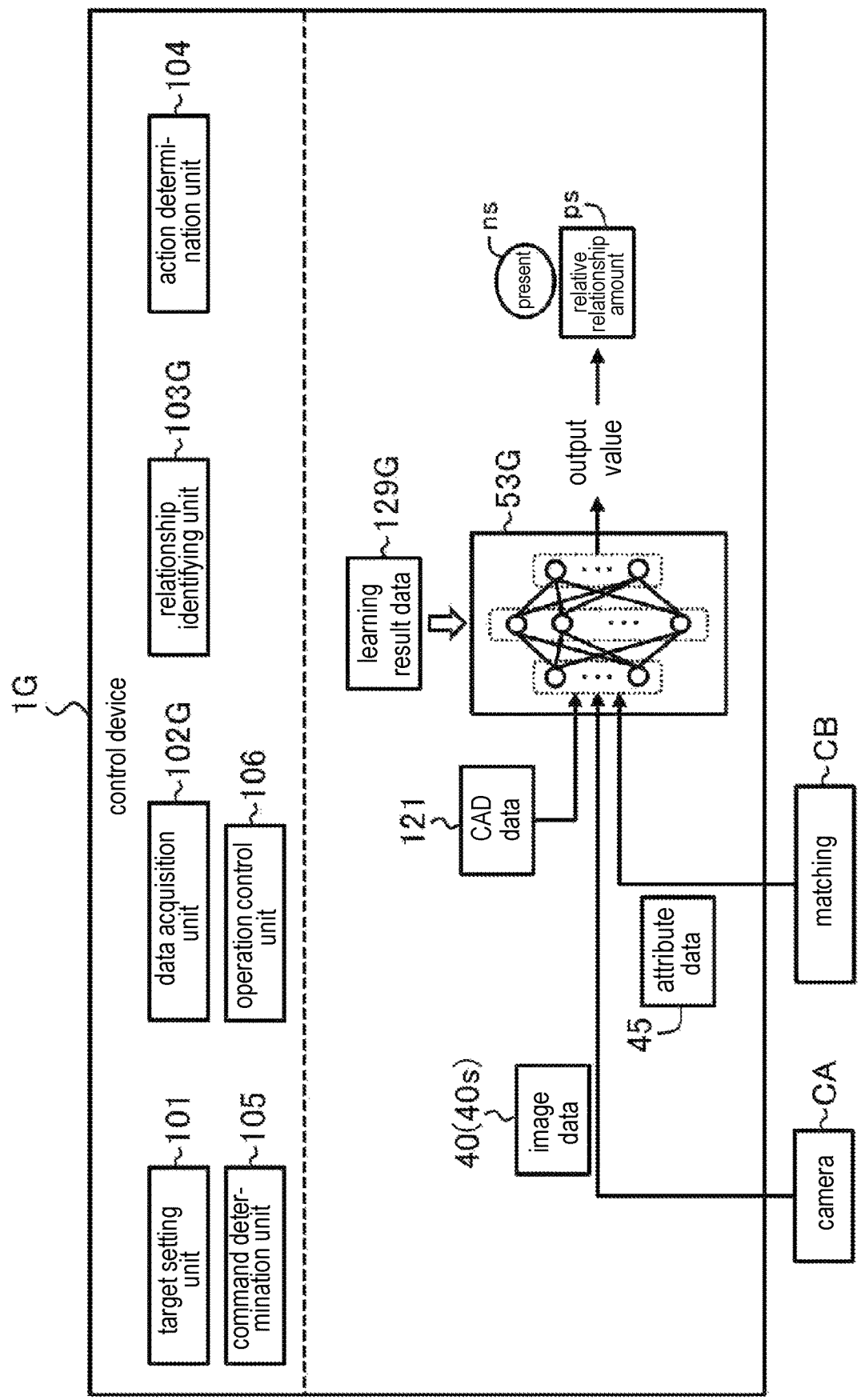
FIG. 20 schematically illustrates an example of the software configuration related to a control process of a control device according to a modified example.

FIG. 20 schematically illustrates an example of the software configuration of a control device 1G according to the present modified example. The present modified example is similar to the modified example of FIGS. 19A and 19B, except that the manipulator 3 is provided with the observation sensor CB and a neural network 53G is configured to further receive the attribute data 45 obtained by the observation sensor CB. That is, except for this point, the hardware configuration and software configuration of the control device 1G are the same as those of the control device 1F according to the above-described modified example. Further, the observation sensor CB and the attribute data 45 are the same as the above-described modified example of the control device 1B.

The neural network 53G is configured in the same manner as the neural network 53, except that it is configured to further receive the input of the attribute data 45 obtained by the observation sensor CB. For example, the neural network 53G is set so that the number of neurons in the input layer or the like is larger than that of the neural network 53 in order to receive the input of the attribute data 45 and incorporate the received attribute data 45 into the arithmetic processing. Except for this point, the neural network 53G may be configured in the same manner as the neural network 53.

The learning process of the neural network 53G may be executed in the same manner as the above-described modified example except that the learning data to be used includes the data corresponding to the attribute data 45 as the training data. Specifically, in the first step, the control unit 11 of the control device 1G acquires the learning data including a plurality of learning data sets each composed of a combination of the CAD data 1751, the image data 1752 for training, the attribute data, and the relative relationship amount 1753. An observation sensor is prepared, and the attribute data is acquired by the observation sensor when the image data 1752 is obtained. Each learning data set can be generated by adding the obtained attribute data to each of the learning data sets 1750.

In the second step, the control unit 11 of the control device 1G uses this learning data to perform machine learning of the neural network 53G. As a result, the learned neural network 53G trained to output an output value that matches the corresponding relative relationship amount 1753 with respect to the input of the CAD data 1751, the image data 1752 for training, and the attribute data can be constructed. In the third step, the control unit 11 of the control device 1G generates information indicating the configuration and arithmetic parameters of the constructed learned neural network 53G as learning result data 129G, and stores the generated learning result data 129G in a predetermined storage area.

Further, the control process according to the present modified example may be executed in the same manner as in the above-described modified example except that the attribute data 45 is repeatedly acquired together with the image data 40 and the latest attribute data 45 acquired from the observation sensor CB is further input to the learned neural network 53G. Specifically, the control unit 11 of the control device 1G operates as a data acquisition unit 102G before executing the processes of steps S304 and S310, and further acquires the attribute data 45 from the observation sensor CB. The timing of acquiring the attribute data 45 may be the same as that of the modified example of the control device 1B.

In each of steps S304 and S310, the control unit 11 of the control device 1G operates as a relationship identifying unit 103G, and further inputs the latest attribute data 45 obtained by the observation sensor CB to the learned neural network 53G. Specifically, the control unit 11 of the control device 1G sets the learned neural network 53G with reference to the learning result data 129G. Subsequently, the control unit 11 inputs the latest image data 40, CAD data 121, and the latest attribute data 45 to the learned neural network 53G, and executes arithmetic processing of the learned neural network 53G. As a result, the control unit 11 acquires an output value corresponding to the result of calculating the relative relationship amount in the current state from the neural network 53G. Other processes related to the operation control of the manipulator 3 may be executed in the same manner as in the above-described modified example.

According to the present modified example, the accuracy of calculating the relative relationship amount can be further improved by further using the attribute data 45. As another form of the control device 1G according to the present modified example, the computers that execute the learning process and the control process may be separated from each other as in the modified example <4.5>. The computers that execute the learning processes may also be separated from each other.

The invention claimed is:

1. A control device that generates a control command for controlling an operation of a robot device that operates in an environment where a plurality of objects associated with the operation of the robot device is present, the control device comprising:
   a processor configured to:
   set a relative relationship amount between the plurality of objects serving as a final target, the relative relationship amount indicating an attribute related to a relative and physical relationship between the plurality of objects, and the attribute comprises relative coordinates, a force acting, or a state between the plurality of objects;
   repeatedly acquire observation data from a sensor that observes the plurality of objects present in the environment;
   calculate a relative relationship amount between the plurality of objects from the observation data being acquired;
   determine a series of relative relationship amounts in a target state of the plurality of objects until a relative relationship amount of the final target being set is realized from a relative relationship amount between the plurality of objects at a starting time point of controlling the operation;
   repeatedly determine a control command to be provided to the robot device so that a relative relationship amount in a current state calculated from latest observation data acquired from the sensor is changed to a relative relationship amount in a state of a next transition target of the current state, included in the series of relative relationship amounts until the relative relationship amount of the final target is realized; and
   output the control command being determined to the robot device.

2. The control device according to claim 1, wherein the relative relationship amount includes a relative coordinate between the plurality of objects.

3. The control device according to claim 2, wherein the sensor includes a camera,
   the observation data includes image data obtained by the camera, and
   the processor matches a model of each of the objects with the image data obtained by the camera and calculates a relative coordinate between the plurality of objects on the basis of a result of the matching.

4. The control device according to claim 1, wherein the processor includes a first learned learning model trained to determine a control command for controlling the operation of the robot device so that a relative relationship amount in a first state is changed to a relative relationship amount in a second state with respect to the input of the relative relationship amount in the first state and the relative relationship amount in the second state, and
   the determining of the control command includes:
   inputting the relative relationship amount in the current state and the relative relationship amount in the state of the next transition target to the first learned learning model;
   executing arithmetic processing of the first learned learning model; and
   acquiring an output value output from the first learned learning model as a result of determining the control command.

5. The control device according to claim 4, wherein the robot device includes an observation sensor that observes an attribute of the robot device,
   the first learned learning model is configured to further receive the input of attribute data obtained by the observation sensor, and
   the determining of the control command includes further inputting the attribute data obtained by the observation sensor to the first learned learning model.

6. The control device according to claim 1, wherein the processor retains map information indicating an arrangement space in which a plurality of nodes each corresponding to relative relationship amounts in candidate states for the target state are disposed, the arrangement space representing a set of relative relationship amounts between the plurality of objects, and
   the determining of the series of relative relationship amounts includes:
   searching for a route from a node corresponding to the relative relationship amount in the state of the starting time point to a node corresponding to the relative relationship amount in the state of the final target by selecting a waypoint node from the plurality of nodes in the arrangement space indicated by the map information; and generating the series of relative relationship amounts using the relative relationship amount corresponding to the node included in the searched route.

7. The control device according to claim 1, wherein
the processor includes a second learned learning model trained to determine a relative relationship amount in the state of the next transition target of a current state for training with respect to the input of a relative relationship amount in a final target for training and a relative relationship amount in the current state for training, and
the determining of the series of relative relationship amounts includes repeatedly executing:
inputting the relative relationship amount in the current state and the relative relationship amount in the final target being set to the second learned learning model;
executing arithmetic processing of the second learned learning model; and
acquiring an output value output from the second learned learning model as a result of determining the relative relationship amount in the state of the next transition target.

8. The control device according to claim 7, wherein
the second learned learning model is configured to further receive the input of the observation data acquired from the sensor, and
the determining of the series of relative relationship amounts further includes inputting the latest observation data to the second learned learning model.

9. The control device according to claim 1, wherein
the processor includes a third learned learning model trained to calculate a relative relationship amount between the plurality of objects appearing in observation data for training with respect to the input of the observation data for training, and
the calculating of the relative relationship amount includes:
inputting the observation data being acquired to the third learned learning model;
executing arithmetic processing of the third learned learning model; and
acquiring an output value output from the third learned learning model as a result of calculating the relative relationship amount.

10. The control device according to claim 9, wherein
the robot device includes an observation sensor that observes an attribute of the robot device,
the third learned learning model is configured to further receive the input of attribute data obtained by the observation sensor, and
the calculating of the relative relationship amount includes further inputting the attribute data obtained by the observation sensor to the third learned learning model.

11. The control device according to claim 1, wherein
the robot device is a manipulator including an end effector,
the plurality of objects includes the end effector,
the processor determines a control command related to the end effector, and
the processor outputs the control command being determined to the manipulator.

12. A control method for generating a control command for controlling an operation of a robot device that operates in an environment where a plurality of objects associated with the operation of the robot device is present, the control method causing a computer to execute:

setting a relative relationship amount between the plurality of objects serving as a final target, the relative relationship amount indicating an attribute related to a relative and physical relationship between the plurality of objects, and the attribute comprises relative coordinates, a force acting, or a state between the plurality of objects;

repeatedly acquiring observation data from a sensor that observes the plurality of objects present in the environment;

calculating a relative relationship amount between the plurality of objects from the observation data being acquired;

determining a series of relative relationship amounts in a target state of the plurality of objects until a relative relationship amount of the final target being set is realized from a relative relationship amount between the plurality of objects at a starting time point of controlling the operation;

repeatedly determining a control command to be provided to the robot device so that a relative relationship amount in a current state calculated from latest observation data acquired from the sensor is changed to a relative relationship amount in a state of a next transition target of the current state, included in the series of relative relationship amounts until the relative relationship amount of the final target is realized; and outputting the control command being determined to the robot device.

13. A non-transitory computer-readable storage medium recording a control program for generating a control command for controlling an operation of a robot device that operates in an environment where a plurality of objects associated with the operation of the robot device is present, the control program causing a computer to execute:

setting a relative relationship amount between the plurality of objects serving as a final target, the relative relationship amount indicating an attribute related to a relative and physical relationship between the plurality of objects, and the attribute comprises relative coordinates, a force acting, or a state between the plurality of objects;

repeatedly acquiring observation data from a sensor that observes the plurality of objects present in the environment;

calculating a relative relationship amount between the plurality of objects from the observation data being acquired;

determining a series of relative relationship amounts in a target state of the plurality of objects until a relative relationship amount of the final target being set is realized from a relative relationship amount between the plurality of objects at a starting time point of controlling the operation;

repeatedly determining a control command to be provided to the robot device so that a relative relationship amount in a current state calculated from latest observation data acquired from the sensor is changed to a relative relationship amount in a state of a next transition target of the current state, included in the series of relative relationship amounts until the relative relationship amount of the final target is realized; and outputting the control command being determined to the robot device.

* * * * *